(12) United States Patent
Holman et al.

(10) Patent No.: US 11,054,367 B2
(45) Date of Patent: Jul. 6, 2021

(54) SPECTROSCOPY IMAGING AND ANALYSIS OF LIVE CELLS

(71) Applicant: The Regents of the University of California, Oakland, CA (US)

(72) Inventors: Hoi-Ying N. Holman, Oakland, CA (US); Kevin Loutherback, Berkeley, CA (US); Liang Chen, Walnut Creek, CA (US)

(73) Assignee: The Regents of the University of California, Oakland, CA (US)

( * ) Notice: Subject to any disclaimer, the term of this patent is extended or adjusted under 35 U.S.C. 154(b) by 377 days.

(21) Appl. No.: 15/766,594

(22) PCT Filed: Oct. 11, 2016

(86) PCT No.: PCT/US2016/056454
§ 371 (c)(1),
(2) Date: Apr. 6, 2018

(87) PCT Pub. No.: WO2017/066198
PCT Pub. Date: Apr. 20, 2017

(65) Prior Publication Data
US 2018/0299374 A1 Oct. 18, 2018

Related U.S. Application Data

(60) Provisional application No. 62/240,459, filed on Oct. 12, 2015.

(51) Int. Cl.
*G01N 21/3563* (2014.01)
*G01N 21/35* (2014.01)
(Continued)

(52) U.S. Cl.
CPC ........ *G01N 21/3563* (2013.01); *B01L 3/5027* (2013.01); *G01N 21/35* (2013.01);
(Continued)

(58) Field of Classification Search
CPC .. G01N 21/3563; G01N 21/35; G01N 21/031; G01N 27/026; G01N 2021/3595;
(Continued)

(56) References Cited

U.S. PATENT DOCUMENTS 5,596,992 A * 1/1997 Haaland ............... A61B 5/0086
250/339.01
2003/0008308 A1 1/2003 Enzelberger et al.
(Continued)

FOREIGN PATENT DOCUMENTS

WO WO 2009/020982 2/2009
WO WO 2014/134228 9/2014

OTHER PUBLICATIONS

Cameron et al., "Membrane isolation alters the gel to liquid crystal transition of Acholeplasma laidlawii B.", Science (Jan. 1983) 219(4581):180-182.
(Continued)

*Primary Examiner* — Manuel L Barbee
(74) *Attorney, Agent, or Firm* — Sheppard, Mullin, Richter & Hampton LLP

(57) ABSTRACT

Disclosed herein are systems, methods, systems and devices for measurement and visualization of chemical dynamics in living cells or tissues for diagnostic pathology. Devices can be open- or closed-channel microfluidic membrane devices for long-term IR spectroscopy of live adherent cells and ultimately for rapidly identifying time-dependent spectral features indicative of chemical abnormality in individual cells.

18 Claims, 43 Drawing Sheets

(51) Int. Cl.
  *G01N 21/03*    (2006.01)
  *G01N 27/02*    (2006.01)
  *B01L 3/00*     (2006.01)
(52) U.S. Cl.
  CPC .... *G01N 27/026* (2013.01); *B01L 2200/0647* (2013.01); *B01L 2300/0877* (2013.01); *B01L 2300/161* (2013.01); *G01N 21/031* (2013.01); *G01N 2021/3595* (2013.01); *G01N 2201/129* (2013.01)
(58) Field of Classification Search
  CPC ............... G01N 2201/129; B01L 3/353; B01L 2300/0877; B01L 2300/161
  See application file for complete search history.

(56) References Cited

U.S. PATENT DOCUMENTS

| | | | |
|---|---|---|---|
| 2007/0078348 | A1 | 4/2007 | Holman |
| 2007/0178534 | A1 | 8/2007 | Murphy et al. |
| 2011/0223654 | A1 | 9/2011 | Holman et al. |
| 2011/0253629 | A1* | 10/2011 | Jovanovic ............ B01D 63/088 210/646 |
| 2015/0268226 | A1 | 9/2015 | Bhargava et al. |

OTHER PUBLICATIONS

Holman et al., Real-time characterization of biogeochemical reduction of Cr(VI) on basalt surfaces by SR-FTIR imaging, Geomicrobiology Journal (Nov. 1999) 16(4):307-324.

Holman et al., "Low-dose responses to 2, 3, 7, 8-tetrachlorodibenzo-p-dioxin in single living human cells measured by synchrotron IR spectromicroscopy", Environ. Sci. Technol. (Jun. 2000) 34(12): 2513-2517.

Holman et al., "Catalysis of PAH biodegradation by humic acid shown in synchrotron infrared studes", Environ. Sci. Technol. (Mar. 2002) 36(6):1276-1280.

Holman et al., "Synchrotron radiation IR spectromicroscopy: a non-invasive molecular probe for biogeochemical processes", Advances in Agronomy (Jan. 2006) 90:79-127.

Loutherback et al., "Open-channel microfluidic membrane device for long-term FT-IR spectromicroscopy of live adherent cells", Analytical Chemistry (Apr. 2015) 87(9):4601-4606.

Maeda et al., "Effect of silica addition of crystallinity and photo-induced hydrophilicity of titania-silica mixed films prepared by sol-gel process", Thin Solid Films (Jul. 2005) 483(1-2):102-106.

Mantsch et al., "IR Spectroscopy of Biomolecules", New York, Wiley-Liss (Mar. 1996).

Newo et al., "Deuterium oxide as a stress factor to the methylotrophic bacterium *Methylophilus* sp. B-7741", Microbiology (Mar. 2004) 73(2):139-142.

Parker, "Applications of Infrared Spectroscopy in Biochemistry, Biology, and Medicine", Plenum Press, New York (Aug. 1971).

Premkumar, "Highly hydrophilic $TiO_2$ surface induced by anodic potential", Chem. Mater. (Mar. 2005) 17:944-946.

Pshenichnikova et al., "Effect of deuteration on the activity of methanol dehydrogenase from *Methylophilus* sp B-7741", Appl. Biochem. Microbiol. (Jan. 2004) 40:18-21.

Stuart et al., "Biological applications of IR spectroscopy", Chichester, New York, Published on behalf of ACOL (University of Greenwich) by John Wiley (Jul. 1997).

Yang et al., "Structure and hydrophilicity of titanium oxide films prepared by electron beam evaporation" Surface Science (Jan. 2004) 548:75-82.

International Search Report and Written Opinion dated Oct. 22, 2008 for International Patent Application No. PCT/US2008/72253, filed Aug. 5, 2008.

International Preliminary Report on Patentability dated Feb. 9, 2010 for International Patent Application No. PCT/US2008/72253, filed Aug. 5, 2008.

International Search Report and Written Opinion dated Feb. 16, 2017 for International Patent Application No. PCT/US2016/056454, filed Oct. 11, 2016.

* cited by examiner

Components of Device for Spectroscopic Imaging of Live Cells

1. Upper Piece

2. Lower Piece

3. Infrared-Transparent Window

4. Infrared-Reflective, Porous Membrane

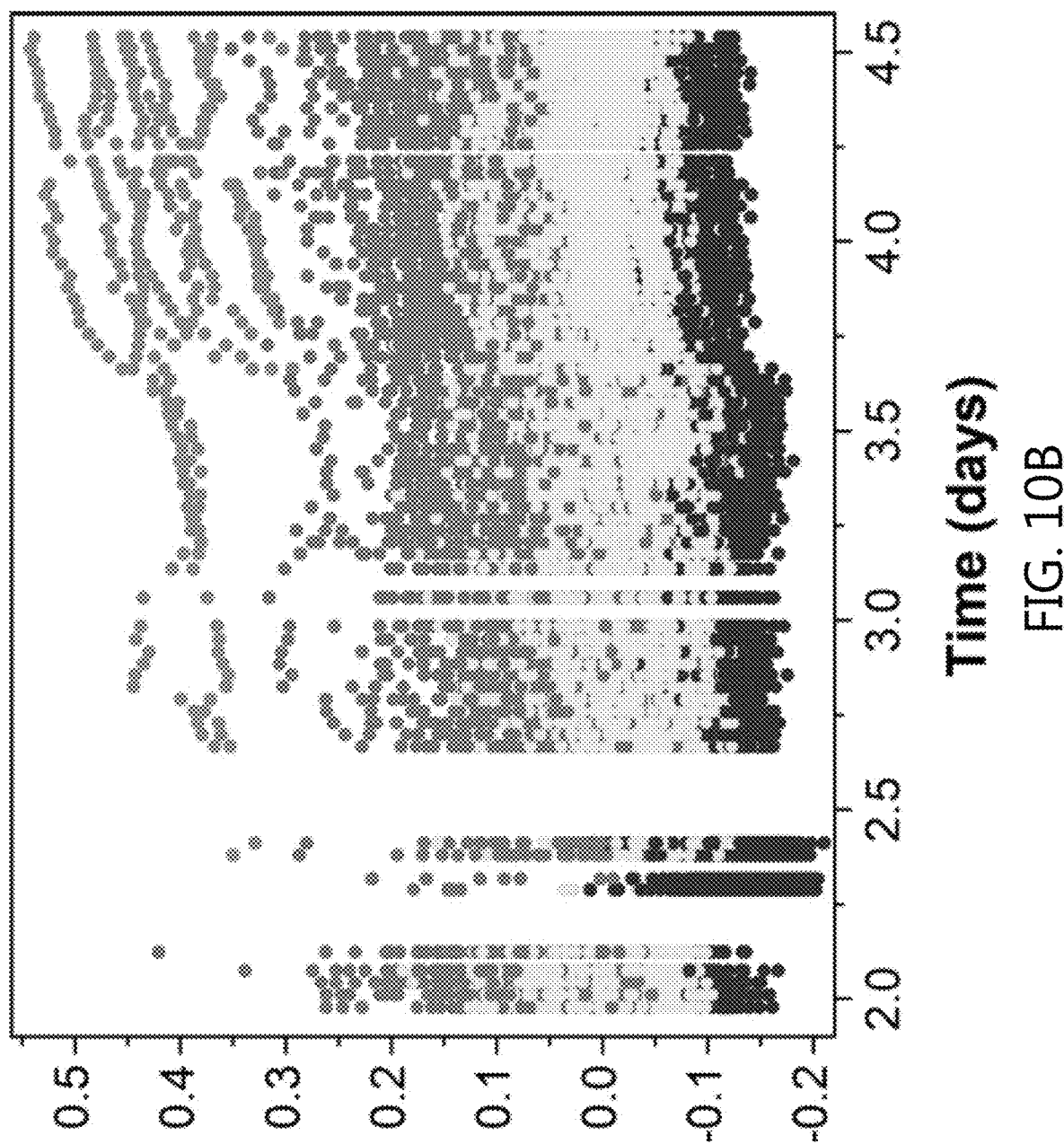

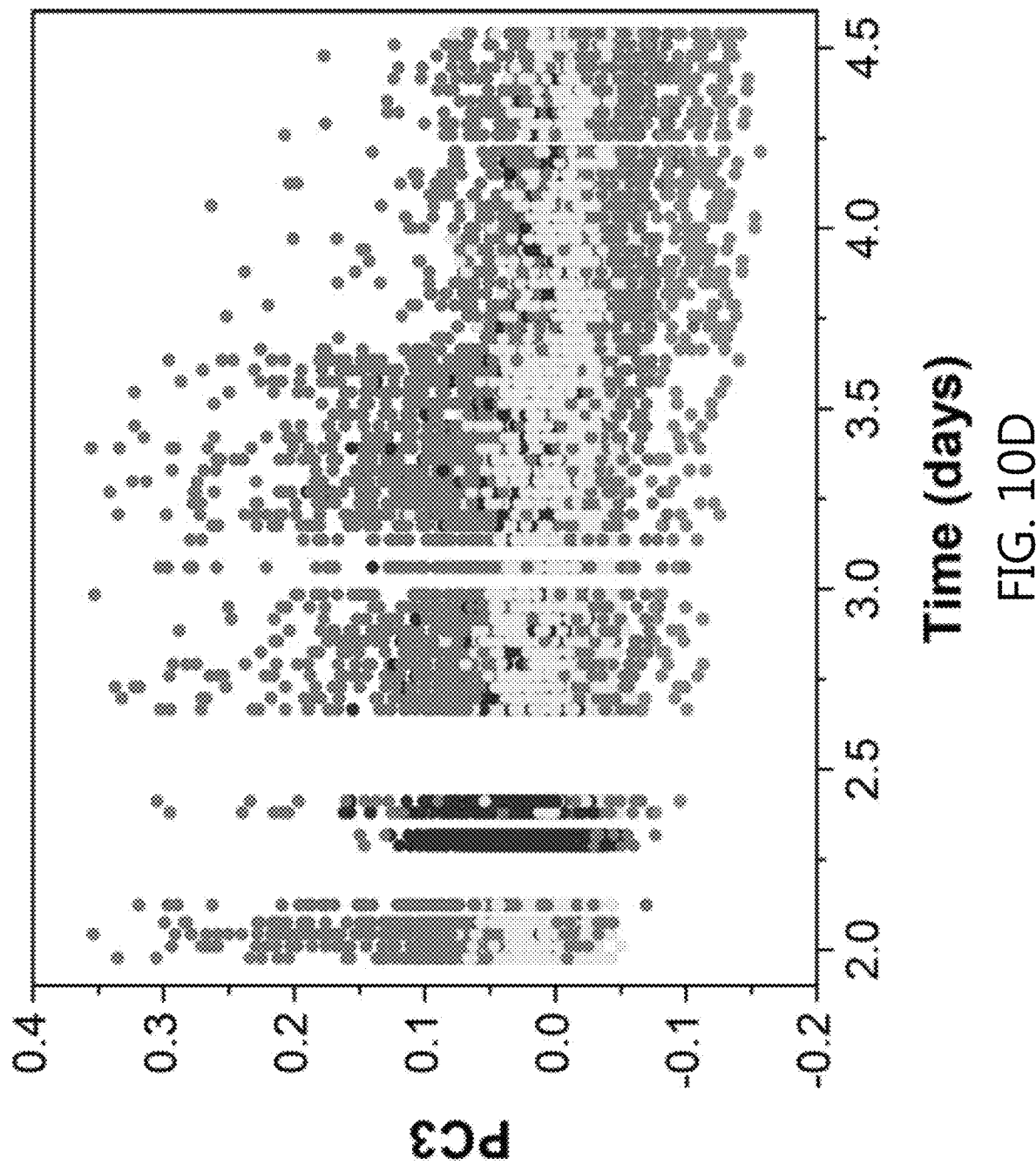

(a)

(b)

(b)

SPECTROSCOPY IMAGING AND ANALYSIS OF LIVE CELLS

RELATED APPLICATIONS

The present application is a U.S. national phase application under 35 U.S.C. § 371 of International Application No. PCT/US2016/056454, filed on Oct. 11, 2016, and published on Apr. 20, 2017; which claims priority to U.S. Provisional Application No. 62/240,459, filed on Oct. 12, 2015. The content of each of these related applications is hereby incorporated by reference herein in its entirety. This application relates to U.S. patent application Ser. No. 12/672,251 filed Feb. 4, 2010, the content of which is hereby incorporated by reference in its entirety.

STATEMENT REGARDING FEDERALLY SPONSORED R&D

This invention was made with government support under grant No. DE-AC02-05CH11231 awarded by the U.S. Department of Energy. The government has certain rights in the invention.

BACKGROUND

Field

The present disclosure relates to measurement, visualization, and analysis of chemical dynamics in living cells or tissues for diagnostic pathology. More specifically, the disclosure relates to closed- or open-channel microfluidic membrane devices for long-term IR spectroscopy of live adherent cells and ultimately and analysis of the long-term IR spectroscopy data for rapidly identifying time-dependent spectral features indicative of chemical abnormality in individual cells.

Description of the Related Art

Spatially resolved infrared spectroscopy is a label-free (Lewis E N et al., Anal. Chem. 1995, 67, 3377-3381) and nondestructive (Holman H Y et al., J. of Biomedical Optics, 2002, 7(3), 417-424, 2002; Homan H Y et al., J. Biol Phys. 2003, 29, 275-286) diagnostic technique that can provide spatiotemporal distribution information of functional groups in families of small molecules or classes of biomolecules in a sample by their characteristic vibrational modes (Jamin N et al., Proc. Natl. Acad. Sci. U.S.A. 1998, 95, 4837-4840; Holman H Y et al. Geomicrobiology J. 1999 16(4), 307-323; Holman H Y N et al. Biopolymers: Biospectroscopy 2000, 57(6), 329-335; Holman H Y et al. Environ. Sci. & Tech. 2000, 34 (12), 2513-2517; Holman H Y et al. Environ. Sci. & Tech. 2002, 36(6), 1276-1280; Lasch P et al. Vib. Spectrosc. 2002, 28, 147-157). It had been used extensively for tissue pathology (Lasch P et al. Biochim. Biophys. Acta, Mol. Basis Dis. 2004, 1688, 176-186; Travo A et al. Histopathology 2010, 56, 921-931; Holman H Y et al. J. of Biomedical Optics 2008, 13, 1-3; Birarda G et al. Biomed. Spectr. & Imaging 2013, 4, 301-315) and is increasingly employed in studying the chemical response in live cells to environmental perturbations (Holman H Y N et al. Anal. Chem. 2009, 81, 8564-8570; Holman H Y N et al. Proc. Natl. Acad. Sci. U.S.A. 2009, 106, 12599-12604; Holman H Y N et al. Anal. Chem. 2010, 82, 8757-8765; Chen L et al. Anal. Chem. 2012, 84, 4118-4125; Mason O U et al. ISEM 2012, 6, 1715-1727; Kamanaya N A et al. Metabolic Engr 2015, 29, 76-85; Loutherback K et al. Anal. Chem. 2015, 87(9) 4601-4606). There is a strong recent interest to use this technique for noninvasive study of live mammalian cell systems to gain insight into disease progression (Kuimova M K et al. Appl. Spectrosc. 2009, 63, 164-171; Miller L et al. Biochim. Biophys. Acta, Biomembr. 2013, 1828, 2339-2346; Birarda G et al. Analyst 2014, 139, 3097-3106), drug discovery (Flower K R et al. Analyst 2011, 136, 498-507), cell regulation and development (Heraud P et al. Stem Cell Res. 2010, 4, 140-147; Chen L et al. Anal. Chem. 2012, 84, 4118-4125).

Currently adherent mammalian cells in thin film require frequent feeding that introduces shear stress, adversely affecting cell attachment and proliferation, and the current live mammalian cell measurement limit is about 48 hours. Thus there is a need for methods and device which can provide for long-term IR spectroscopy of live adherent cells.

Another challenge in performing Fourier transform infrared spectroscopy (FT-IR) measurements on live cells is the competition between water film thickness and the needs to supply nutrients and remove waste (Holman H Y et al., Anal. Chem. 2009, 81, 8564-8570; Birarda G et al. Vib. Spectrosc. 2010, 53, 6-11). Absorption from water can quickly saturate the IR signal for thickness greater than about 10 μm, obscuring chemical bands associated with protein secondary structure (amide I) and membrane integrity (C—H). A common approach for live-cell study is to sandwich two IR-transparent windows between a thin spacer or patterned microstructures to form a closed chamber (Birarda G et al. Vib. Spectrosc. 2010, 53, 6-11; Moss D et al. Vib. Spectrosc. 2005, 38, 185-191; Heraud P et al. FEMS Microbiol. Lett. 2005, 249, 219-225; Nasse M, et al. Appl. Spectrosc. 2009, 63, 1181-1186; Birarda G et al. Microelectron. Eng. 2010, 87, 806-809; Tobin M J et al. Vib. Spectrosc. 2010, 53, 34-38). The problem with this approach for adherent mammalian cells is the small space requires frequent feeding that introduces shear stress, adversely affecting cell attachment and proliferation (Young E W and Beebe D J Chem. Soc. Rev. 2010, 39, 1036-1048). As a result, these devices have been limited to measurements of around 48 hours for adherent mammalian cells.

Another challenge is large-scale multidimensional data processing, visualization, and analysis. Infrared mapping or imaging produce an array of massive spectra, or called hyperspectral data cube. It contains spectral information at each small area called "a pixel" of the samples. The data cube consists of four dimensions: the x- and y-coordinate of each pixel, the wavenumber, and intensity of the spectral vector. In order to extract the molecular information and display the image, the data cube must be reduced to three dimensions (3D), with the first two being the x- and y-coordinates. Univariate analysis and multivariate analysis (see references Holman H Y and Chen L 2012 Imaging Life Chapter 12) are used for identifying profiles of infrared spectral markers for diagnostic pathology.

SUMMARY

The present disclosure relates to an open- or closed-channel microfluidic device or system that allows for long-term continuous IR measurement of live, adherent mammalian cells. Some embodiments provide an IR spectral microscope stage device, comprising an open-channel microfluidic membrane device designed to produce a continuous flow of media below a membrane having living cells in a thin layer of fluid on top. The flow of media is beneath the membrane, thus maintaining cellular biological activities without masking IR signals from the cells. This allows one to perform IR spectroscopy/spectromicroscopy over an extended period of time to collect data on chemical changes within living cells.

In one aspect, the present methods and systems disclosed herein allow for long-term continuous high-resolution IR chemical imaging of live adherent mammalian cells that are maintained in a thin layer of fluid. The methods and systems disclosed herein overcome technical challenges in the application of IR spectroscopy to chemical/molecular imaging of living cells in a sustainable aqueous environment.

In a further aspect, the device can be used by researchers for the study of living cells. In another aspect, drug development researchers working on tissues that grow at an air-liquid interface will be particularly interested in this device as a noninvasive method to test the efficacy of various drugs and treatments.

One object of the disclosure is to provide devices, methods, and procedures for performing IR measurements and analyses of live cells for identifying diagnostic spectral features indicative of the presence of chemical abnormalities. Viability and function of live cells are maintained in a thin layer of liquid using the open channel membrane device, thus allowing for continuous IR measurement of live cells without the IR signals being masked by a thick layer of fluid. Using IR measurements together with an integrated package of data mining, data pattern recognition and analysis, chemical changes and abnormalities in living cells can be identified. Such a device and methods could be used for the noninvasive study of live mammalian cell systems, providing insight into disease progression, drug discovery, and cell regulation and development.

Disclosed herein are methods for infrared chemical mapping. In some embodiments, a method comprises: receiving Fourier Transform Infrared Spectroscopy (FTIR) data comprising FTIR spectra of samples collected over a time duration; correcting scattering effects in the FTIR data; evaluating the FTIR spectra by performing an univariate analysis of the FTIR spectra or performing a multivariate analysis of the FTIR spectra.

In some embodiments, the FTIR data comprises FTIR hyperspectral data cube. Receiving the FTIR data comprises obtaining the FTIR data using a microfluidic system, wherein the microfluidic system comprises: (a) a platform comprising: (i) a polymer membrane; (ii) two polymer pieces comprising at least one fluid channel; (iii) at least one inlet in fluid communication with the aqueous layer; and (iv) at least one outlet in fluid communication with the aqueous layer; and (b) an aqueous layer in fluid contact with the polymer membrane wherein the aqueous layer comprises a fluid that flows beneath the polymer membrane, wherein the aqueous layer comprises a fluid that flows from at least one inlet to at least one outlet.

In some embodiments, the polymer membrane comprises a porous material. The pores can be at least 200-800 nm in size. The porous polymer membrane can comprise pores that are at least 400 nm in size. The porous polymer membrane can comprise pores that are at least 800 nm in size.

In some embodiments, the microfluidic system comprises a coating on the polymer membrane. The coating can comprise a material selected from the group consisting of titanium, gold, platinum, silver, cooper or tungsten metal, or any alloy thereof.

In some embodiments, the first polymer piece and the second polymer piece comprise any polymer capable of holding fluid. The first polymer piece and the second polymer piece comprise polycarbonate. At least one of the polymer pieces comprises a transparent window. The IR transparent window comprises any material transparent to IR frequencies. The IR transparent window comprises calcium fluoride.

In some embodiments, the polymer membrane is affixed between at least two of the polymer pieces with an affixing substance. The polymer membrane is affixing substance is a medical-grade epoxy.

In some embodiments, the platform comprises at least one cell chamber. The cell chamber can be sealed by an IR transparent window. The inlet channel and the outlet channels can be fluidly connected to the fluid channel. The platform can be coupled with an incubating device. The incubating device can be a heated microscope stage.

In some embodiments, receiving the FTIR data comprises obtaining the FTIR data using a microfluidic system, wherein the microfluidic system comprises: (a) a platform comprising: (i) a polymer membrane; (ii) an upper polymer piece and a lower polymer piece comprising at least one fluid channel and at least one fluid inlet and at least one fluid outlet in fluid communication with the fluid channel, wherein the polymer membrane is between the upper piece and the lower piece; and (b) an aqueous layer in fluid contact with the polymer membrane, wherein the aqueous layer comprises a fluid that flows beneath the polymer membrane from the inlet to the outlet.

In some embodiments, the polymer membrane comprises a porous material. The pores can be at least 200-1000 nm in size. The pores can be at least 400 nm in size.

In some embodiments, the microfluidic system comprises a coating on the polymer membrane. The coating comprises a material selected from the group consisting of titanium, gold, platinum, silver, cooper, or tungsten metal, or any allow thereof.

In some embodiments, the upper polymer piece and the lower polymer piece comprise any polymer capable of holding fluid. The upper polymer piece and the lower polymer piece can comprise polycarbonate. The polymer membrane can be affixed between the upper piece and the lower piece with an affixing substance. The affixing substance can be medical-grade epoxy.

In some embodiments, a continuous flow of fluid is maintained through the fluid channel. The continuous flow of fluid can be maintained via syringe pump. The fluid flow can be at a rate of at least 50-1000 nL/min. The fluid flows can be at a rate of at least 100 nL/min.

In some embodiments, the platform is coupled with an electric cell-substrate impedance sensing (ECIS) electrode. In some embodiments, the platform is coupled with electronics for generating physiologically relevant electric fields.

In some embodiments, correcting the scattering effects in the FTIR data comprises: subtracting a multipoint piecewise linear baseline with anchoring points at minima from the FTIR spectra. Subtracting the multipoint piecewise linear baseline with anchoring points at minima from the FTIR spectra comprises: searching and adjusting new anchoring points for one of the FTIR spectra. The minima can be located around 800, 1800, 2450, 3800 or 4000 $cm^{-1}$.

In some embodiments, correcting the scattering effects in the FTIR data comprises: normalizing the FTIR spectra to an amide II band located around or 1550 cm-1 based on molecular weights of the samples. Normalizing the FTIR spectra to the amide II band located around 1550 $cm^{-1}$ based on the molecular weights of the samples comprises: receiving a user-set threshold of a strength of the amide II band; and normalizing the FTIR spectra to the amide II band located around 1550 cm-1 based on the molecular weights of the samples using the user-set threshold for the strength of the amide II band and a range of the amide II band over an amide I band ratios, wherein the amide I band is located around 1650 cm-1.

In some embodiments, performing the univariate analysis comprises displaying a map of intensity distributions of the FTIR spectra at a single wavelength. Performing the univariate analysis can comprise performing peak integration of the FTIR spectra. Performing the univariate analysis can comprise determining peak ratios of the FTIR spectra.

In some embodiments, performing the multivariate analysis of the FTIR spectra comprises performing an unsupervised classification of the FTIR spectra. Performing the unsupervised classification of the FTIR spectra comprises: performing a principal component analysis (PCA) of the FTIR spectra. Performing the principal component analysis of the FTIR spectra can comprise: pooling a plurality of wavenumbers of interest of the FTIR spectra into a data matrix; determining a covariance matrix of the data matrix; determining eigenvectors and corresponding eigenvalues of the covariance matrix using matrix eigenvalue decomposition; sorting the eigenvectors in descending order based on the corresponding eigenvalues; assigning an eigenvector of the eigenvectors with a highest eigenvalue of the corresponding eigenvalues to be a first principal component; generating a loading plot of the first principal component; assigning an eigenvector of the eigenvectors with a second highest eigenvalue of the corresponding eigenvalues to be a second principal component; generating a loading plot of the second principal component; and generating PCA score plot comprising a scatter plot using the coefficients of the first principal component and the coefficients of the second principal component. In some embodiments, generating the loading plot of the first principal component comprises determining a curve connecting points of the first principal component in a first x-y coordinate system, wherein the x coordinate of the first x-y coordinate system corresponds to the wavenumbers of interest, and wherein the y coordinate of the first x-y coordinate system corresponds to coefficients of the first principal component. In some embodiments, generating the loading plot of the second principal component comprises determining a curve connecting points of the second principal component in a second x-y coordinate system, wherein the x coordinate of the second x-y coordinate system corresponds to the wavenumbers of interest, and wherein the y coordinate of the second x-y coordinate system corresponds to coefficients of the second principal component.

In some embodiments, performing the unsupervised classification of the FTIR spectra comprises: performing a trajectory pattern analysis (TPA) of the FTIR spectra. Performing the trajectory pattern analysis of the FTIR spectra comprises: performing a principal component analysis (PCA) of the FTIR spectra to determine loading vectors of principal components of the FTIR spectra; determining scores of the FTIR spectra using the loading vectors; generating score plots for the FTIR spectra for time points of the time duration; generating 2D confidence-ellipses from the score plots using a predetermined confidence threshold; determining centers of mass of the 2D confidence-ellipses; and connecting the centers of mass of the 2D confidence-ellipses to determine a trajectory pattern. The score plots comprise 2D or 3D score plots. The confidence threshold can be at least 90%. The confidence threshold can have a value in the range of 90%-99%.

In some embodiments, performing the unsupervised classification of the FTIR spectra comprises: performing a hierarchical cluster analysis (HCA) of the FTIR spectra. Performing the hierarchical cluster analysis of the FTIR spectra can comprise: receiving a distance measure of the FTIR spectra of the samples; receiving a linkage method of clusters; and linking clusters of spectra based on the distance measure and the linkage method to generate a dendrogram comprising a hierarchical tree of the samples. The distance measure of the FTIR spectra comprises an Euclidean distance, a cosine distance, a Pearson correlation distance, or a combination thereof. The linkage method comprises a nearest neighbor linkage method, a centroid linkage method, a minimum variance linkage method, or a combination thereof. In some embodiments, a centroid of a cluster of the dendrogram comprises a mean spectrum of spectra of the cluster, and wherein a standard deviation spectrum of the cluster of the dendrogram comprises standard deviation spectra of the cluster.

In some embodiments, performing the multivariate analysis of the FTIR spectra comprises performing a supervised classification of the FTIR spectra. In some embodiments, performing the supervised classification of the FTIR spectra comprises: performing a linear discriminant analysis (LDA) of the FTIR spectra. Performing the linear discriminant analysis of the FTIR spectra can comprise: performing a principal component analysis (PCA) of the FTIR spectra of the samples to determine principal components; receiving a number of scores from the principal component analysis of the FTIR spectra of the samples; determining a between-class covariance matrix; determining a within-class covariance matrix; determining eigenvectors and corresponding eigenvalues of a matrix comprising the between-class covariance matrix and the within-class covariance matrix; sorting the eigenvectors in descending order based on the corresponding eigenvalues; assigning eigenvectors to be loading vectors based on the corresponding eigenvalues; determining cluster vectors comprising multiplying the principal components with coefficients of the loading vectors; generating loading plots of the cluster vectors, wherein a loading plot comprises a curve connecting points of the cluster vector in a x-y coordinate system, wherein the x coordinate of the x-y coordinate system corresponds to wavenumbers of interest, and wherein the y coordinate of the x-y coordinate system corresponds to coefficients of the cluster vector; and generating score plots of the linear discriminant analysis using projection coefficients of the loading plots onto the cluster vectors.

Disclosed herein are methods for creating a cell chamber for continuous IR imaging of live cells using a microfluidic system. In some embodiments, the microfluidic system comprises: (a) a platform comprising: (i) a polymer membrane; (ii) two polymer pieces comprising at least one fluid channel; (iii) at least one inlet in fluid communication with the aqueous layer; and (iv) at least one outlet in fluid communication with the aqueous layer; and (b) an aqueous layer in fluid contact with the polymer membrane wherein the aqueous layer comprises a fluid that flows beneath the polymer membrane, wherein the aqueous layer comprises a fluid that flows from at least one inlet to at least one outlet. In some embodiments, receiving the FTIR data comprises obtaining the FTIR data using a microfluidic system comprising: (a) a platform comprising: (i) a polymer membrane; (ii) an upper polymer piece and a lower polymer piece comprising at least one fluid channel and at least one fluid inlet and at least one fluid outlet in fluid communication with the fluid channel, wherein the polymer membrane is between the upper piece and the lower piece; and (b) an aqueous layer in fluid contact with the polymer membrane, wherein the aqueous layer comprises a fluid that flows beneath the polymer membrane from the inlet to the outlet.

In some embodiments, the upper piece has at least one channel that forms a cell chamber when sealed against the polymer membrane. In some embodiments, cells are plated onto the polymer membrane of the cell chamber and incubated to allow cells to attach to the polymer membrane.

In some embodiments, the cell chamber is sealed with an IR transparent window. The cell chamber can be sealed with an IR transparent window by pressing the window onto a rubber gasket to maintain a humid environment. The IR transparent window comprises any material transparent to IR frequencies. The IR transparent window comprises calcium fluoride. The microfluidic system can be coupled with an incubating device. The incubating device can be a heated microscope stage.

In some embodiments, living cells are continuously imaged with an IR light source for at least 12-168 hours. The living cells can be imaged for at least 108 hours or at least 168 hours.

In some embodiments, the IR light source is a globar. The IR light source can be a synchrotron-radiation IR illuminator.

Disclosed herein are systems for infrared chemical mapping. In some embodiments, the system comprises: (a) non-transitory computer storage configured to store evaluation records for objects; and (b) a hardware processor in communication with the non-transitory computer storage, the hardware processor programmed to: receive Fourier Transform Infrared Spectroscopy (FTIR) data comprising FTIR spectra of samples collected over a time duration; correct scattering effects in the FTIR data; evaluate the FTIR spectra by performing an univariate analysis of the FTIR spectra or performing a multivariate analysis of the FTIR spectra. The FTIR data can comprise FTIR hyperspectral data cube.

In some embodiments, to receive the FTIR data, the processor is programmed to obtain the FTIR data using a microfluidic system, wherein the microfluidic system comprises: (c) a platform comprising: (i) a polymer membrane; (ii) two polymer pieces comprising at least one fluid channel; (iii) at least one inlet in fluid communication with the aqueous layer; and (iv) at least one outlet in fluid communication with the aqueous layer; and (d) an aqueous layer in fluid contact with the polymer membrane wherein the aqueous layer comprises a fluid that flows beneath the polymer membrane, wherein the aqueous layer comprises a fluid that flows from at least one inlet to at least one outlet.

In some embodiments, to receive the FTIR data, the processor is programmed to obtain the FTIR data using a microfluidic system, wherein the microfluidic system comprises: (c) a platform comprising: (i) a polymer membrane; (ii) an upper polymer piece and a lower polymer piece comprising at least one fluid channel and at least one fluid inlet and at least one fluid outlet in fluid communication with the fluid channel, wherein the polymer membrane is between the upper piece and the lower piece; and (d) an aqueous layer in fluid contact with the polymer membrane, wherein the aqueous layer comprises a fluid that flows beneath the polymer membrane from the inlet to the outlet.

In some embodiments, the platform is coupled with an electric cell-substrate impedance sensing (ECIS) electrode. In some embodiments, the platform is coupled with electronics for generating physiologically relevant electric fields.

In some embodiments, to correct the scattering effects in the FTIR data, the processor is programmed to: subtract a multipoint piecewise linear baseline with anchoring points at minima from the FTIR spectra. To subtract the multipoint piecewise linear baseline with anchoring points at minima from the FTIR spectra, the processor is programmed to: search and adjusting new anchoring points for one of the FTIR spectra. The minima can be located around 800, 1800, 2450, 3800 or 4000 $cm^{-1}$.

In some embodiments, to correct the scattering effects in the FTIR data, the processor is programmed to: normalize the FTIR spectra to an amide II band located around or 1550 $cm^{-1}$ based on molecular weights of the samples. To normalize the FTIR spectra to the amide II band located around 1550 $cm^{-1}$ based on the molecular weights of the samples, the processor is programmed to: receive a user-set threshold of a strength of the amide II band; and normalize the FTIR spectra to the amide II band located around 1550 cm-1 based on the molecular weights of the samples using the user-set threshold for the strength of the amide II band and a range of the amide II band over an amide I band ratios, wherein the amide I band is located around 1650 $cm^{-1}$.

In some embodiments, to perform the univariate analysis, the processor is programmed to display a map of intensity distributions of the FTIR spectra at a single wavelength. In some embodiments, to perform the univariate analysis, the processor is programmed to perform peak integration of the FTIR spectra. To perform the univariate analysis, the processor is programmed to determine peak ratios of the FTIR spectra.

In some embodiments, to perform the multivariate analysis of the FTIR spectra, the processor is programmed to perform an unsupervised classification of the FTIR spectra. In some embodiments, to perform the multivariate analysis of the FTIR spectra, the processor is programmed to perform a supervised classification of the FTIR spectra.

In some embodiments, to perform the unsupervised classification of the FTIR spectra, the processor is programmed to: perform a principal component analysis (PCA) of the FTIR spectra. To perform the principal component analysis of the FTIR spectra, the processor is programmed to: pool a plurality of wavenumbers of interest of the FTIR spectra into a data matrix; determine a covariance matrix of the data matrix; determine eigenvectors and corresponding eigenvalues of the covariance matrix using matrix eigenvalue decomposition; sort the eigenvectors in descending order based on the corresponding eigenvalues; assign an eigenvector of the eigenvectors with a highest eigenvalue of the corresponding eigenvalues to be a first principal component; generate a loading plot of the first principal component; assigning an eigenvector of the eigenvectors with a second highest eigenvalue of the corresponding eigenvalues to be a second principal component; generate a loading plot of the second principal component; and generate PCA score plot comprising a scatter plot using the coefficients of the first principal component and the coefficients of the second principal component.

In some embodiments, to generate the loading plot of the first principal component, the processor is programmed to determine a curve connecting points of the first principal component in a first x-y coordinate system, wherein the x coordinate of the first x-y coordinate system corresponds to the wavenumbers of interest, and wherein the y coordinate of the first x-y coordinate system corresponds to coefficients of the first principal component. In some embodiments, to generate the loading plot of the second principal component, the processor is programmed to determine a curve connecting points of the second principal component in a second x-y coordinate system, wherein the x coordinate of the second x-y coordinate system corresponds to the wavenumbers of interest, and wherein the y coordinate of the second x-y coordinate system corresponds to coefficients of the second principal component.

In some embodiments, to perform the unsupervised classification of the FTIR spectra, the processor is programmed to: perform a trajectory pattern analysis (TPA) of the FTIR spectra. To perform the trajectory pattern analysis of the FTIR spectra, the processor is programmed to: perform a principal component analysis (PCA) of the FTIR spectra to determine loading vectors of principal components of the FTIR spectra; determine scores of the FTIR spectra using the loading vectors; generate score plots for the FTIR spectra for time points of the time duration; generate 2D confidence-ellipses from the score plots using a predetermined confidence threshold; determine centers of mass of the 2D confidence-ellipses; and connect the centers of mass of the 2D confidence-ellipses to determine a trajectory pattern. The score plots can comprise 2D or 3D score plots. The confidence threshold can be at least 90%.

In some embodiments, to perform the unsupervised classification of the FTIR spectra, the processor is programmed to: perform a hierarchical cluster analysis (HCA) of the FTIR spectra. To perform the hierarchical cluster analysis of the FTIR spectra, the processor is programmed to: receive a distance measure of the FTIR spectra of the samples; receive a linkage system of clusters; and link clusters of spectra based on the distance measure and the linkage system to generate a dendrogram comprising a hierarchical tree of the samples. The distance measure of the FTIR spectra comprises an Euclidean distance, a cosine distance, a Pearson correlation distance, or a combination thereof. The linkage system comprises a nearest neighbor linkage system, a centroid linkage system, a minimum variance linkage system, or a combination thereof. A centroid of a cluster of the dendrogram comprises a mean spectrum of spectra of the cluster, and wherein a standard deviation spectrum of the cluster of the dendrogram comprises standard deviation spectra of the cluster.

In some embodiments, to perform the supervised classification of the FTIR spectra, the processor is programmed to: performing a linear discriminant analysis (LDA) of the FTIR spectra. To perform the linear discriminant analysis of the FTIR spectra, the processor is programmed to: perform a principal component analysis (PCA) of the FTIR spectra of the samples to determine principal components; receive a number of scores from the principal component analysis of the FTIR spectra of the samples; determine a between-class covariance matrix; determine a within-class covariance matrix; determine eigenvectors and corresponding eigenvalues of a matrix comprising the between-class covariance matrix and the within-class covariance matrix; sort the eigenvectors in descending order based on the corresponding eigenvalues; assign eigenvectors to be loading vectors based on the corresponding eigenvalues; determine cluster vectors comprising multiplying the principal components with coefficients of the loading vectors; generate loading plots of the cluster vectors, wherein a loading plot comprises a curve connecting points of the cluster vector in a x-y coordinate system, wherein the x coordinate of the x-y coordinate system corresponds to wavenumbers of interest, and wherein the y coordinate of the x-y coordinate system corresponds to coefficients of the cluster vector; and generate score plots of the linear discriminant analysis using projection coefficients of the loading plots onto the cluster vectors.

Disclosed herein are microfluidic systems. In some embodiments, a microfluidic system comprises: (a) a platform comprising: (i) a polymer membrane; (ii) two polymer pieces comprising at least one fluid channel; (iii) at least one inlet in fluid communication with the aqueous layer; and (iv) at least one outlet in fluid communication with the aqueous layer; and (b) an aqueous layer in fluid contact with the polymer membrane wherein the aqueous layer comprises a fluid that flows beneath the polymer membrane, wherein the aqueous layer comprises a fluid that flows from at least one inlet to at least one outlet.

In some embodiments, the polymer membrane comprises a porous material. The pores can be at least 200-800 nm in size. The porous polymer membrane can comprise pores that are at least 400 nm in size. The porous polymer membrane can comprise pores that are at least 800 nm in size.

In some embodiments, the microfluidic system comprises a coating on the polymer membrane. The coating can comprise a material selected from the group consisting of titanium, gold, platinum, silver, cooper or tungsten metal, or any alloy thereof.

In some embodiments, the first polymer piece and the second polymer piece comprise any polymer capable of holding fluid. The first polymer piece and the second polymer piece comprise polycarbonate. At least one of the polymer pieces comprises a transparent window. The IR transparent window comprises any material transparent to IR frequencies. The IR transparent window comprises calcium fluoride.

In some embodiments, the polymer membrane is affixed between at least two of the polymer pieces with an affixing substance. The polymer membrane is affixing substance is a medical-grade epoxy.

In some embodiments, the platform comprises at least one cell chamber. The cell chamber can be sealed by an IR transparent window. The inlet channel and the outlet channels can be fluidly connected to the fluid channel. The platform can be coupled with an incubating device. The incubating device can be a heated microscope stage.

Disclosed herein are microfluidic systems. In some embodiments, a microfluidic system comprises: (a) a platform comprising: (i) a polymer membrane; (ii) an upper polymer piece and a lower polymer piece comprising at least one fluid channel and at least one fluid inlet and at least one fluid outlet in fluid communication with the fluid channel, wherein the polymer membrane is between the upper piece and the lower piece; and (b) an aqueous layer in fluid contact with the polymer membrane, wherein the aqueous layer comprises a fluid that flows beneath the polymer membrane from the inlet to the outlet.

In some embodiments, the polymer membrane comprises a porous material. The pores can be at least 200-1000 nm in size. The pores can be at least 400 nm in size.

In some embodiments, the microfluidic system comprises a coating on the polymer membrane. The coating comprises a material selected from the group consisting of titanium, gold, platinum, silver, cooper, or tungsten metal, or any allow thereof.

In some embodiments, the upper polymer piece and the lower polymer piece comprise any polymer capable of holding fluid. The upper polymer piece and the lower polymer piece can comprise polycarbonate. The polymer membrane can be affixed between the upper piece and the lower piece with an affixing substance. The affixing substance can be medical-grade epoxy.

In some embodiments, a continuous flow of fluid is maintained through the fluid channel. The continuous flow of fluid can be maintained via syringe pump. The fluid flow can be at a rate of at least 50-1000 nL/min. The fluid flows can be at a rate of at least 100 nL/min.

In some embodiments, the platform is coupled with an electric cell-substrate impedance sensing (ECIS) electrode. In some embodiments, the platform is coupled with electronics for generating physiologically relevant electric fields.

In some embodiments, the upper piece has at least one channel that forms a cell chamber when sealed against the polymer membrane. In some embodiments, cells are plated onto the polymer membrane of the cell chamber and incubated to allow cells to attach to the polymer membrane.

In some embodiments, the cell chamber is sealed with an IR transparent window. The cell chamber can be sealed with an IR transparent window by pressing the window onto a rubber gasket to maintain a humid environment. The IR transparent window comprises any material transparent to IR frequencies. The IR transparent window comprises calcium fluoride. The microfluidic system can be coupled with an incubating device. The incubating device can be a heated microscope stage.

In some embodiments, living cells are continuously imaged with an IR light source for at least 12-168 hours. The living cells can be imaged for at least 108 hours or at least 168 hours.

In some embodiments, the IR light source is a globar. The IR light source can be a synchrotron-radiation IR illuminator.

BRIEF DESCRIPTION OF THE DRAWINGS

FIGS. 10A-D summarize the time evolution of component score as indicator of chemical changes in multiday synchrotron measurements. Principal component (PC) analysis vectors for the region 1800-950 $cm^{-1}$ for all spatial and time points offset on a common scale are shown in FIG. 10A. FIG. 10B-D demonstrate PC scores versus time for each pixel on all maps with color assignment from HCA in FIG. 8A.

FIG. 16, panel (b) shows half-times $t_{1/2}$ and apparent spreading rates as determined from the data shown in FIG. 16, panel (a).

FIG. 24, panel (a), at 1800-1000 $cm^{-1}$, shows protein phosphorylation via increases in $vPO2^{2-}$ absorption intensity and a blue shift of amide I peak location. FIG. 24, panel (b), at 3000-2800 $cm^{-1}$, increases in the degree of membrane lipid orderedness via a red shift of vsCH2 peak position. (cells in EF for 30 minutes, and cells in the absence of EF).

FIG. 25, panel (a) shows typical time-lapse heat maps of protein phosphorylation constructed from the $v_sPO2^{2-}$ absorption intensity at 1080 $cm^{-1}$ for cathode-migrating HCE cells in the EpiLife medium. FIG. 25, panel (b) shows a typical time course of integrated $v_{total}PO2^{2-}$ absorption intensity per HCE cell and killed-control cells.

FIG. 26, panel (a) shows typical time-series of SR-FTIR spectra of protein phosphorylation at the front (#1) and rear (#2) edge orthogonal to the migration front-rear axis (dark dashed lines) of a single cathode-migrating cell (grey). FIG. 26, panel (b) shows typical time-course comparisons of mean integrated $v_sPO_2^{2-}$ (left) and $v_{as}PO_2^{2-}$ (right) absorption intensity over a 10-µm wide strip along the front versus trailing rear for live cells. Killed controls are shown for left or front-equivalent or right or rear-equivalent.

FIG. 27, panel (a) shows typical time-lapse $2^{nd}$ derivative spectra centered at the $v_sCH2$ absorption region (dashed line) along the front (red spectra) versus the trailing rear (blue spectra). Left, live cells; and right, killed-control. FIG. 27, panel (b) shows time course of the peak position of vsCH2 along the front or trailing rear of cathode-migrating (top) versus killed control cells (bottom). Dotted lines are visual aids indicating the trend of peak position shift of vsCH2.

DETAILED DESCRIPTION

Figure 1:
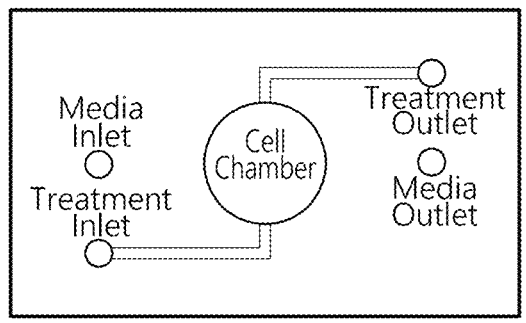
FIG. 1 is a schematic showing upper and lower pieces, the IR-transparent window, and the IR-reflective porous membrane of a device for spectroscopic imaging of live cells for the purpose of taking data on cellular chemical changes.
Figure 1:
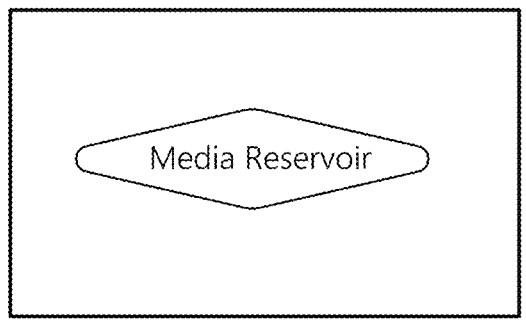
Figure 1:
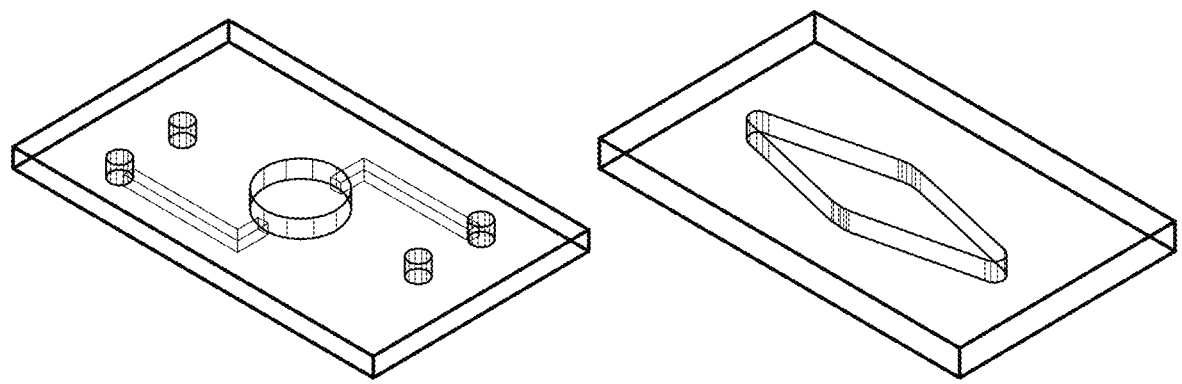
Figure 1:
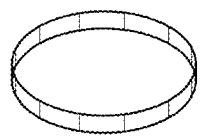
Figure 1:

In the following Detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated and made part of the disclosure herein.

In a general embodiment, the microfluidic open-channel device comprising a porous polymer membrane fixed between an upper piece and a lower piece and an IR transparent window. The lower piece having a media channel or reservoir. The upper piece having a viewing window capable of forming a cell chamber when sealed against the porous membrane, and the upper piece featuring inlet and outlet ports capable of connecting to the media channel. The upper piece may also have a channel leading to the cell chamber with accompanying inlet and outlet ports.

The porous polymer membrane can be comprised of any material that can be treated with a reflective substance for IR spectroscopy. Porous membranes are permeable and allow cells to uptake and secrete molecules and carry out other metabolic activities as they would in their natural environment. Thus, cell attachment and proliferation is enhanced with a porous membrane compared to impermeable membranes. The pores are formed by any means known in the art, including but not limited to, etching, photolithography, or laser processing. In one embodiment, the pores are formed by etching. In some embodiments, the pores can be 200-1000 nm in size. In a preferred embodiment, the pores are 400 nm in size. In another preferred embodiment, the membrane is made of polyester and features micrometers-deep pores etched into the membrane, whereby the pores allow attachment of cells while enabling liquid to flow through the pores.

In some embodiments, the membrane is patterned with other shapes or patterns such as ridges, criss-cross patterns, pillars of nano- or micro-meter size, or any other three-dimensional pattern of nano- or micro-meter scale.

The membrane is treated with an IR reflective, absorption or transmittance substance to allow for continuous, uniform IR imaging of the cells. In a preferred embodiment the reflective substance comprises, but is not limited to, titanium, gold, platinum, silver, copper, or tungsten metal or any allow thereof. In a preferred embodiment, the reflective substance is a gold substance.

In a preferred embodiment, the reflective substance in coated onto the membrane. In another embodiment, the reflective substance can be coated. The reflective substance is preferably applied in a thin layer. In some embodiments, the thin layer can have a thickness of approximately 5-500 nm. In a preferred embodiment, the layer is about 15 nm thick.

Referring to FIG. 1, the upper and lower pieces can be comprised of any polymer capable of holding media. In a preferred embodiment, the upper and lower pieces comprise polycarbonate. In some embodiments, the pieces can be of equal or unequal, with a thickness range of 0.1-20.0 mm. In one embodiment, the upper piece can be thicker than the lower piece. In a preferred embodiment, the upper piece is about 1 mm thick and the lower piece is about 3 mm thick. The media channel, cell chamber, and inlet/outlet ports can be formed by any means known in the art, including but not limited to, milling, laser processing, micromachining, or 3D printing. In a preferred embodiment, the upper and lower pieces are made of polycarbonate and the media channel, cell chamber, and inlet/outlet ports are formed with a milling machine.

Figure 2:
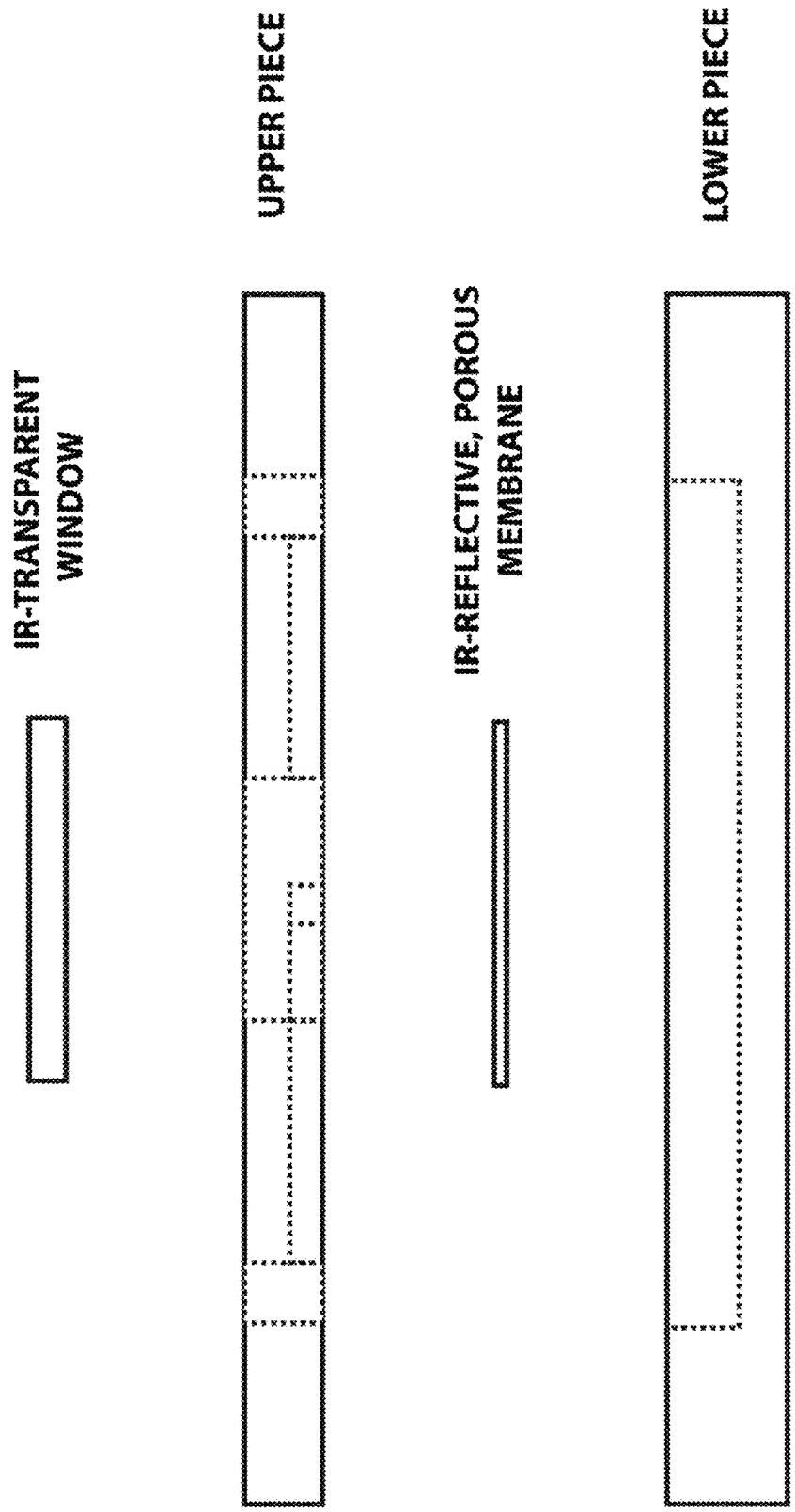
FIG. 2 is a schematic demonstrating the assembly of a device comprised of an IR transparent window, an upper piece, an IR reflective porous membrane, and a lower piece.

Referring to FIG. 2, the device can be assembled by affixing the membrane between the upper and lower pieces. In some embodiments, the membrane can be affixed between the upper piece and the lower piece with any substance capable of acting as an affixing agent known in the art. In a preferred embodiment, the device is assembled using medical-grade epoxy and then cured at 80° C. for 1 hour.

After device assembly, cells can be seeded on the membrane in the cell chamber using known techniques for any given cell type. In one embodiment, PC12 cells are seeded on the membrane in the cell chamber and then incubated at 37° C. for 2 hours to allow for cell attachment and then excess media is aspirated from the cell chamber. After cells have attached to the membrane in the cell chamber, the cell chamber is sealed with an IR transparent window (FIGS. 1 and 2). Sealing the cell chamber with an IR transparent allows for IR measurements to be taken while the cells remain in a controlled, humid environment. In one embodiment, the IR transparent window comprises any material that is transparent to IR frequencies. In a preferred embodiment, the IR transparent window comprises calcium fluoride material that is transparent over a broad range of frequencies, including IR frequencies. In some embodiments, the IR transparent window can be 0.1-1.0 mm thick. In a preferred embodiment, the IR transparent window is 0.3 mm thick.

In one embodiment, the cell chamber can be sealed by the IR transparent window via any means known in the art that allows for maintenance of a controlled, humid environment in the cell chamber. In a preferred embodiment, the IR transparent window is pressed onto a rubber gasket to maintain a humid environment in the cell chamber while allowing IR measurements.

Figure 3A:
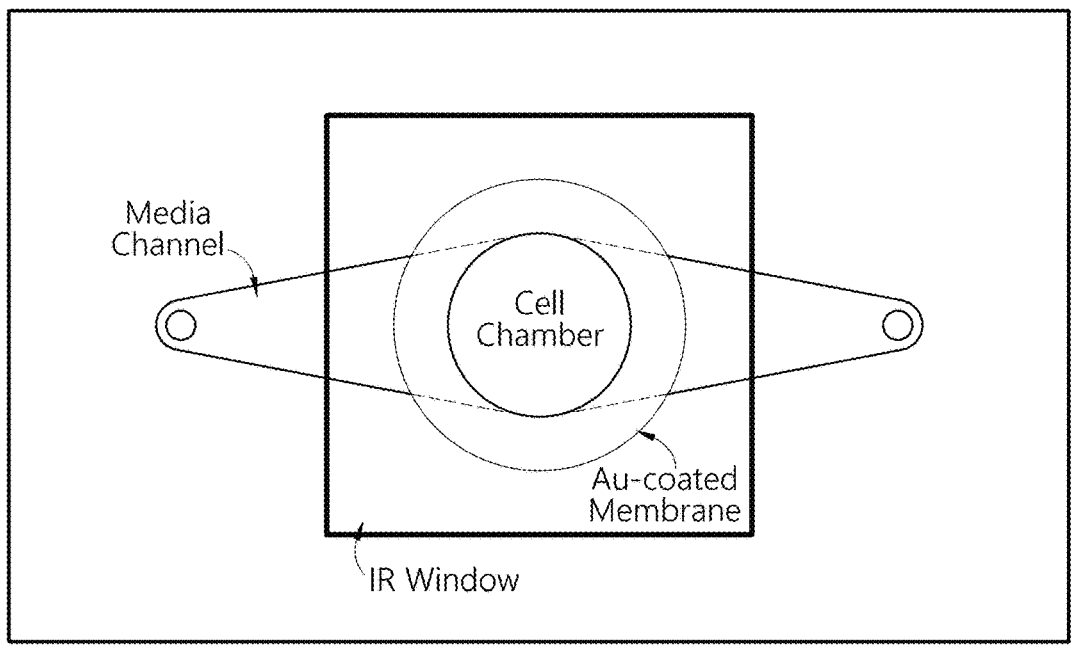
FIG. 3A is a schematic illustration of one embodiment of a system in which the device is composed of a gold-coated, porous membrane sandwiched between a media channel and a cell chamber milled out of polycarbonate.
Figure 3B:
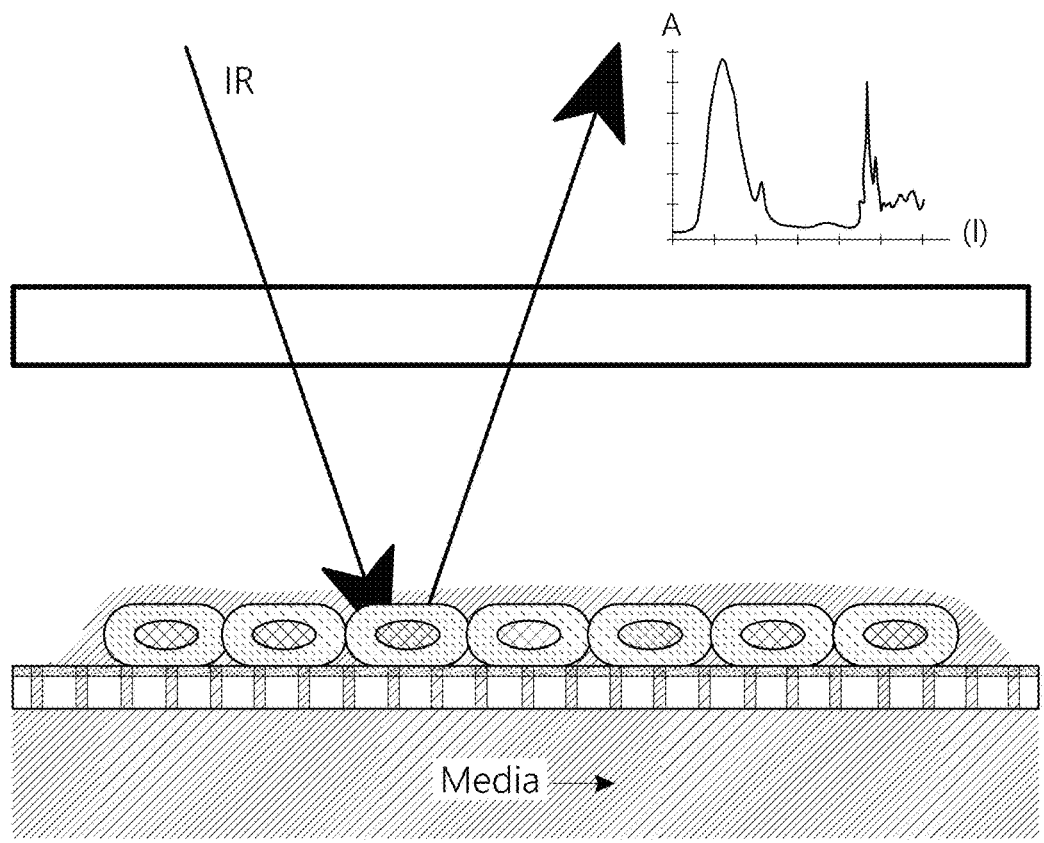
FIG. 3B is a schematic showing one embodiment of the device in which cells are maintained in thin film of fluid that allows probing with IR light.
Figure 3C:
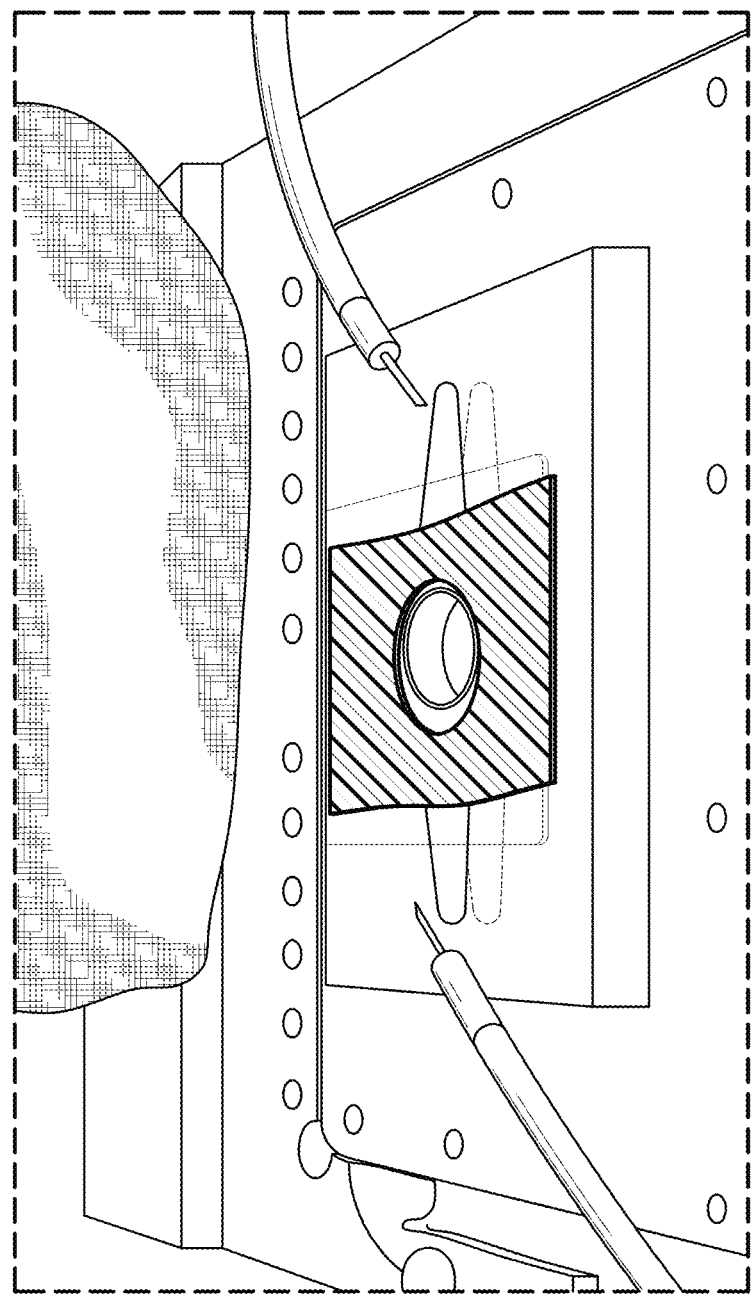
FIG. 3C is a photograph of the device mounted on a microscope with a heated stage objective.
Figure 3D:
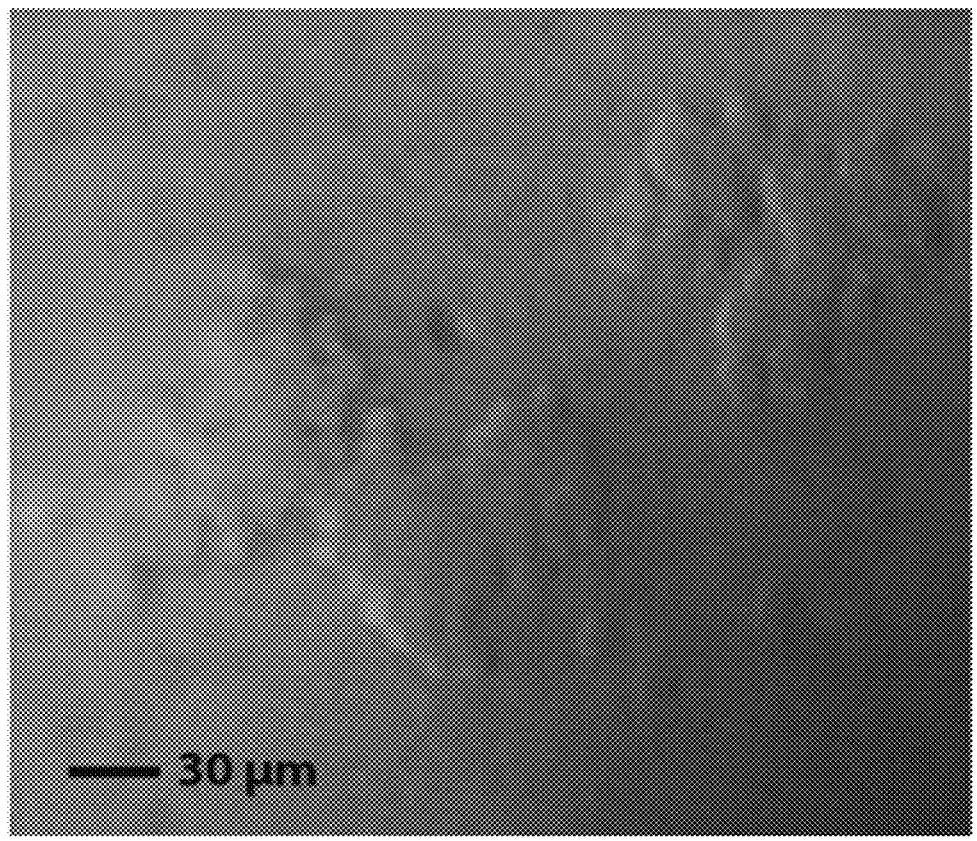
FIG. 3D is a bright-field image of PC12 cell colonies on the membrane.

Performing IR measurements on living cells is challenging due to water's strong IR absorption coupled with a need to provide nutrients in liquid. One approach to obtaining long-term IR data on cells is to reduce the thickness of an aqueous film in which the cells are sustained. To reduce the thickness of liquid over cells, life-sustaining media is media is flowed through the media channel in the lower piece, under the membrane, to provide nutrients to cells and remove waste products. In one embodiment, media continuously flows in the media channel. In another embodiment, the media flows periodically in the media channel. In some embodiments, the media can flow in the media channel at rates between 50-1000 nL/min. In a preferred embodiment, a continuous flow of media is maintained in the media channel at a rate of 100 nL/min. In some embodiments, the continuous flow of media is maintained by any means for pumping media known in the art. In a preferred embodiment, a continuous media flow is maintained via syringe pump (FIG. 3C).

Living cells need to be kept in an environment that has a temperature of about 37° C. in order to maintain viability. In some embodiments, any heating device can be used to maintain a temperature of about 37° C. In one embodiment, the heating device can be a water bath. In a preferred embodiment, the heating device is a heated microscope stage.

IR spectroscopy is a label-free, nondestructive, noninvasive analytical technique that can provide spatiotemporal chemical maps of chemical changes in living cells. IR spectroscopy can be used to measure the interaction of IR light with particular biomolecules. This can provide valuable data on changes in biomolecule functional groups in reaction to a given treatment.

An IR light source is provided. Any infrared photon source can be used in conjunction with the open-channel microfluidic devices described herein. In one embodiment the IR source can be a broadband synchrotron light source. In another embodiment, the IR source can be a thermal light source. In other embodiment, the IR source can be a free electron laser or a quantum cascade laser (QCL) system or an ultra-broadband infrared laser.

Attenuated total reflection (ATR)-FTIR imaging is a promising approach that allows cells to be maintained in a thicker layer of water (Kazarian S G and Chan K A Analyst 2013, 138, 1940-1951) but is limited to measuring only materials in close contact with crystal by the penetration depth of the evanescent wave (Holman H Y et al. Anal. Chem. 2009, 81, 8564-8570; Holman H Y et al. Anal. Chem. 2010, 82, 8757-8765).

In particular, synchrotron radiation-based FTIR (SR-FTIR) additionally allows probing the spatial variation in the chemical composition of single mammalian cells with a subcellular spatial resolution rapidly (Jamin N et al. P. Proc. Natl. Acad. Sci. U.S.A. 1998, 95, 4837-4840; Miller L M and Dumas P Biochim. Biophys. Acta, Biomembr. 2006, 1758, 846-857). Using a broadband, high-brightness synchrotron source instead of the standard thermal source gives diffraction-limited spatial resolution with ~200 times increase in signal-to-noise ratio that allows weak but biologically important signals from single mammalian cells to be resolved with shorter data acquisition time (~200 times faster). This superior resolution and speed allow for identification of important but subtle chemistry of variable responses within cells that is unavailable using a globar source.

This can also be accomplished by using a very bright infrared source such as a free electron laser or a quantum cascade laser (QCL) system or an ultra-broadband infrared laser.

The infrared detector can either be a single point element, or a linear array detector, a focal plane array detector, or a bolometer. A significant advantage of the array detector and the bolometer approach as compared to the point detector is the parallel infrared detection using a large number of pixels, which eliminate the need of using the significantly slower point-by-point mapping of the samples. This reduces the time of data acquisition further.

Closed Channel Designs for FTIR Spectroscopy of Live Cells

Closed channel designs for FTIR spectroscopy can be alternative architectures for the design of microfluidic devices, which can maintain cellular biological activities over an extended period of time while simultaneously allows for continuous IR spectroscopy/spectromicroscopy measurements.

Figure 12:
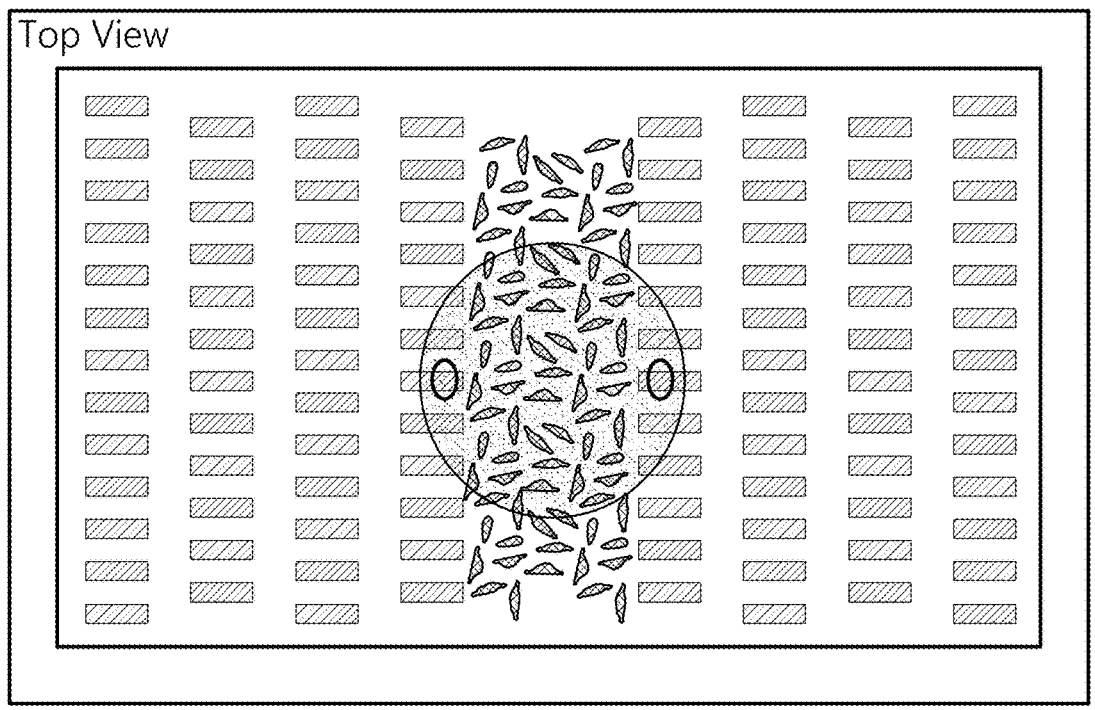
FIG. 12 is a schematic illustration of a microfabricated IR petri dish.
Figure 12:
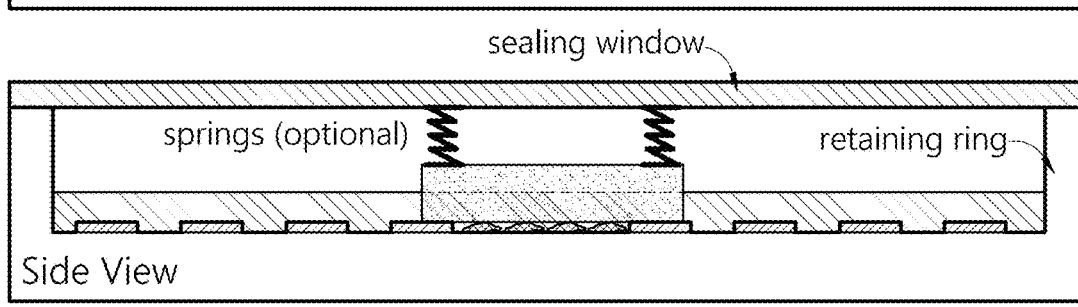
Figure 12:
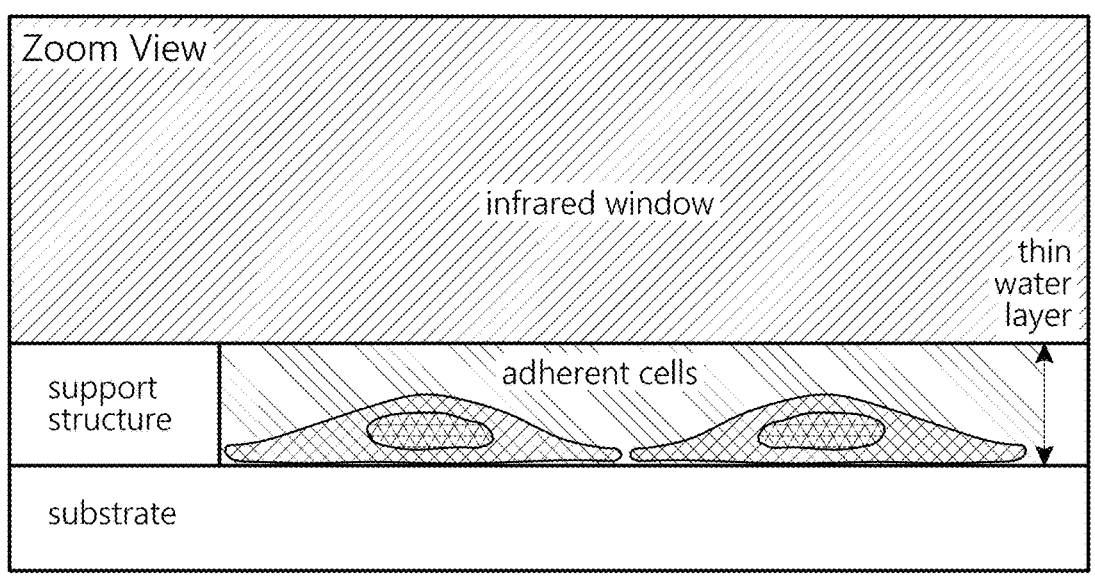

Referring now to FIG. 12, a cell measurement platform where support structures etched into or microfabricated of some other material on the base surface allow an infrared transparent window to be pressed into the structure to provide a thin layer of fluid for measurement while preventing the window from compressing cells. Fluid is maintained in the platform by a retaining ring and the assembly is sealed with a second IR transparent window. Springs or some other compressing material may be placed between the sealing window and the fluid displacing window to reduce the water thickness further. Assembly is held together with an external manifold. While cells are maintained in a thin layer of fluid during measurement, they remain in contact with a large media reservoir of the surrounding fluid, allowing media exchange by molecular diffusion.

SpecMetric

To examine the spatiotemporal chemical evolution of a colony of cells, spatial and temporal data collected from IR spectroscopy can be pooled and principal component analysis (PCA) of all pixels over time can be performed using the methods described herein and in Examples 6-7. In some embodiments, the methods are embodied in software or a programming language.

Figure 6:
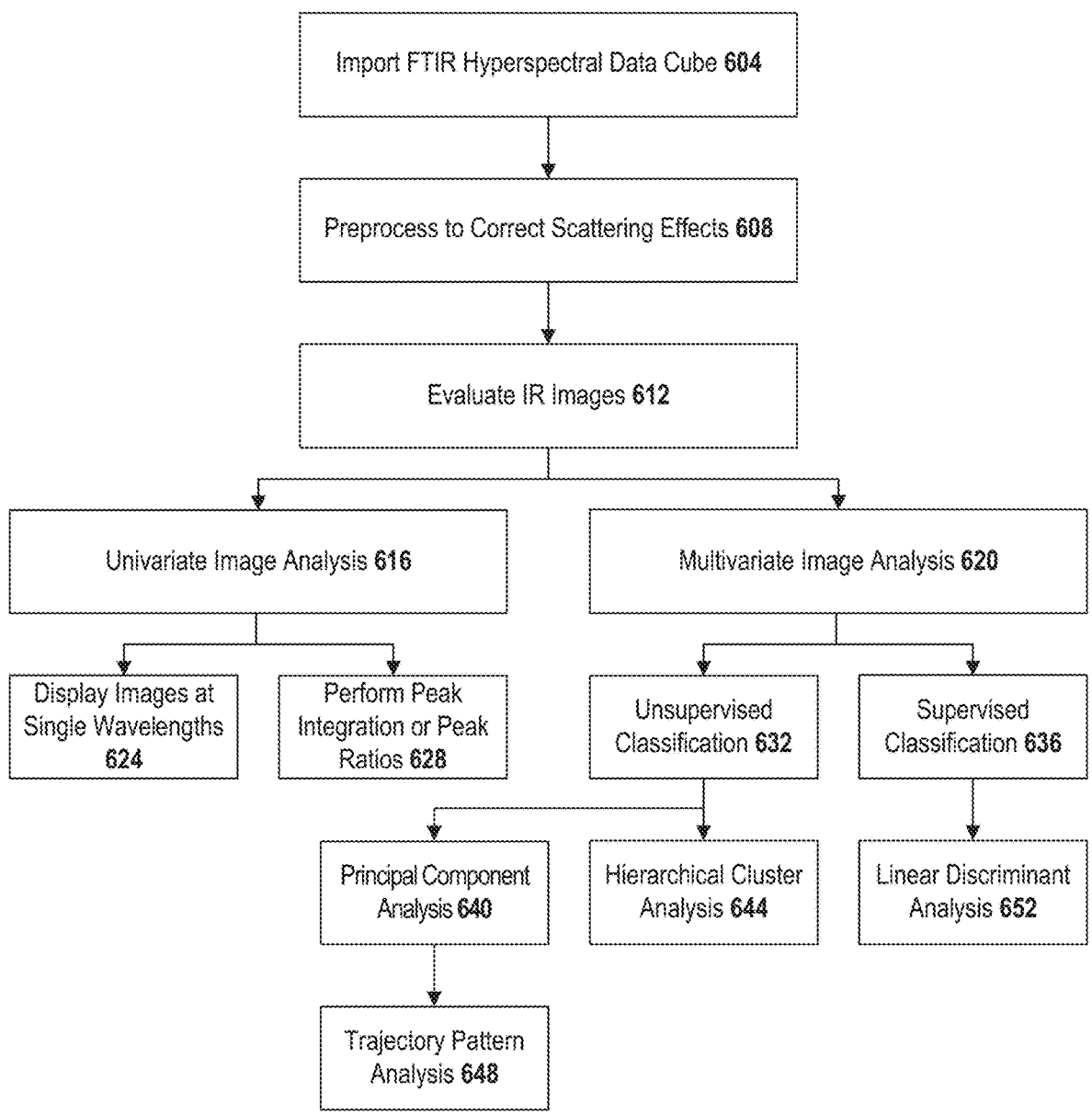
FIG. 6 illustrates a non-limiting embodiment of a chemometrics method for the analysis of infrared chemical mapping and imaging analysis.
Figure 7A:
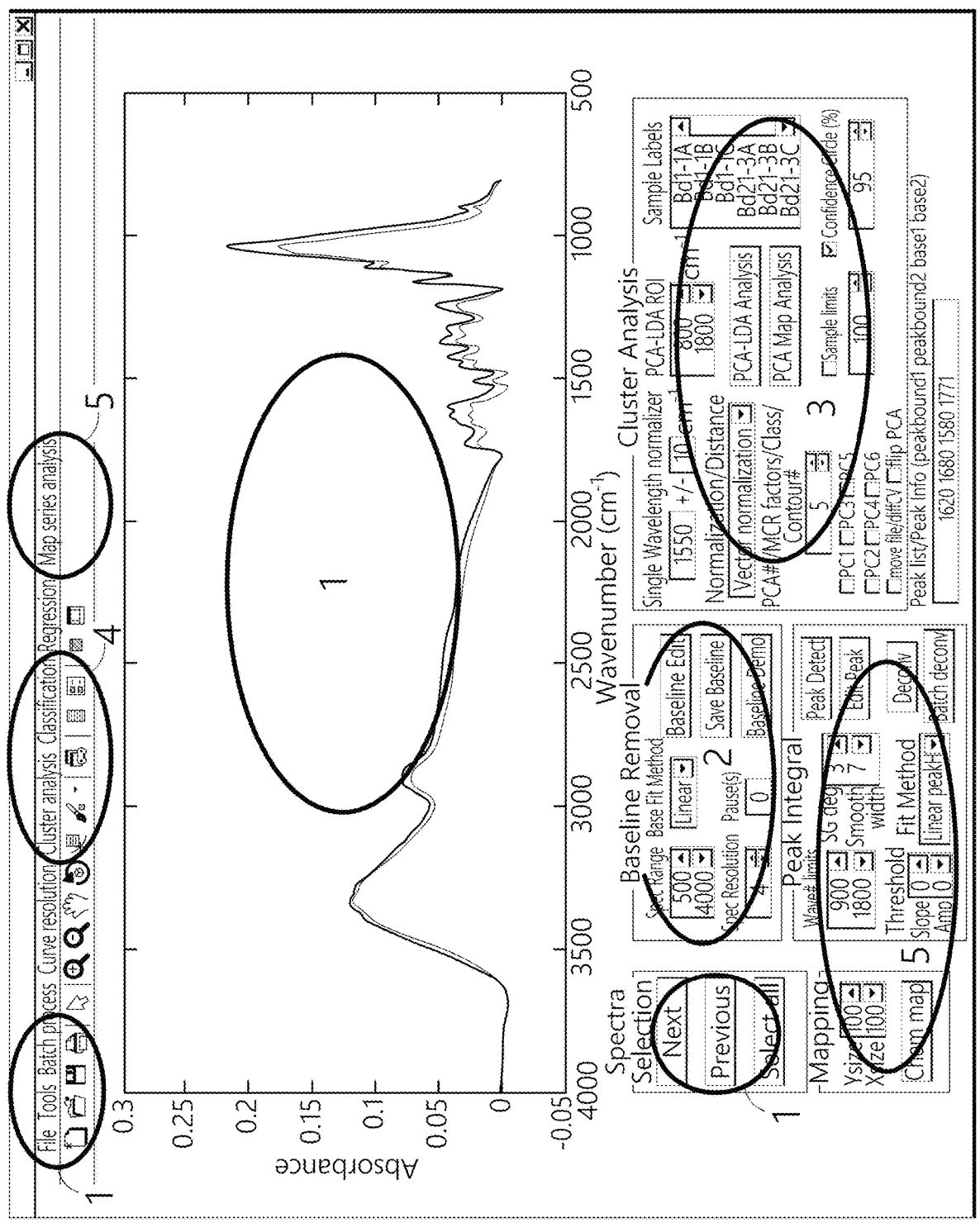
FIG. 7A depicts the SpecMetric graphical user interface which includes 5 modules: (1) spectra browser, (2) baseline correction, (3) Principal component-linear discriminant analysis (PC-LDA), (4) classification analysis, and (5) data visualization.

FIG. 6 illustrates an exemplary chemometrics method 600 for the analysis of infrared chemical mapping and imaging analysis. In some embodiments, using the Matlab programming language, the SpecMetric program can be custom-built for preliminary data processing and analysis. FIG. 7A depicts the SpecMetric graphical user interface which includes 5 modules: (1) spectra browser, (2) baseline correction, (3) Principal component-linear discriminant analysis (PC-LDA), (4) classification analysis, and (5) data visualization. There are 5 modules in this program: spectra browser (circled block 1 in FIG. 7A), baseline correction (circled block 2 in FIG. 7A), PC-LDA analysis (circled block 3 in FIG. 7A), classification analysis (circled block 4 in FIG. 7A) and data visualization (circled block 5 in FIG. 7A).

The spectra browser displays spectra in a single spectrum mode or a multiple spectra mode (5 spectra together) for the visual screening of spectral data and selection of anchoring points for baseline corrections. In some embodiments, one can browse through all spectra, e.g., in a folder using a browsing means such as a "Next" and "Previous" button. Each spectrum can be "selected" for manual filtering or selection. Common browsing tools such as zoom, data cursor and panning are listed under the tools menu.

The baseline correction module allows user to choose multiple points in one spectrum as the anchoring points for a baseline removal. A multi-segment line that connects all anchoring points is then automatically generated by the program. This multi-segment line is the baseline for the spectrum and is subtracted from it to obtain baseline corrected spectrum. To batch process a group of spectra with similar baseline features according to user input criteria, the program automatically search for new anchoring points for each new spectrum. The PC-LDA module quantitatively categorizes groups of spectra based on Principal Component (PC)-Linear Discriminant Analysis (LDA). This module requires users to input the number of different classes, the region of spectra, spectra normalization method, and the number of principal components. The program calculates the PCA and PC-LDA score for each spectrum, generates matrices of 2-D and 3-D score plots. The method provides for loading plots of all principal components, as well as confidence-ellipse for each group of spectra with user defined confidence level.

In the Classification module, users select a method to calculate a dissimilarity index between spectra. The program then classifies spectra based on the calculated index values. Spectra with high dissimilarity index values will be classified into different groups while those with low dissimilarity index values will be placed into the same group.

The visualization module spectrum and calculate band intensity and/or band peak position of user selected bands. In one embodiment, when a spectra map is fed into the program, the output is a pseudo-color map that is either based on calculated band intensity or band peak data. Users may need to manually enter the map size (length and width) and other parameters for peak detection.

FTIR hyperspectral data cube.

In FIG. 6, at block 604, raw data from the experiments, FTIR hyperspectral data cube, is to be imported to the SpecMetric program for further processing and analysis.

Preprocessing to correct scattering effects.

At block 608, raw data imported can be preprocessed to correct scattering effects. To correct for background scatterings and offsets, a multipoint piecewise linear baseline with anchoring points at minima is subtracted from the raw absorbance spectra. Typical minima points for IR spectra of mammalian cells are located around 800, 1800, 2450, 3800 and 4000 $cm^{-1}$ respectively. To batch process a group of spectra with similar but not identical baseline features, the SpecMetric program can automatically search and adjust for new anchoring points for each spectrum.

In some embodiments, spectral data can be normalized to the amide II band (located at 1550 $cm^{-1}$) to normalize spectra of samples with different total protein mass. In some embodiments, to filter out all blank pixels that do not contain cellular spectra, the SpecMetric program uses a user-set threshold of the amide II band strength and an acceptable range of amide II over amide I band (located at 1650 $cm^{-1}$) ratios for spectral screening.

Evaluation of IR images—Univariate Image Analysis and Multivariate Image Analysis.

At block 612, IR images can be evaluated. Evaluation of IR images can include two categories of evaluation or analysis methods: univariate image analysis at block 616 and multivariate image analysis at block 620. In some embodiments, the method 600 can include performing an univarirate analysis at block 616. In some embodiments, the method 600 can include performing a multivariate analysis at block 620. In other embodiments, the method 600 can include performing both an univariate analysis at block 616 and performing a multivariate image analysis at block 620.

Images at single wavelength.

Performing an univariate image analysis at block 612 can include optionally displaying a map of intensity distributions at a single wavelength at block 624.

Peak integration or peak ratios.

Performing an univariate image analysis at block 612 can include optionally performing peak integration or determining peak ratios at block 628. Peak integration can include displaying a map of intensity distributions after integrating a band of intensities at a specified wavelength range. Peak ratio determination can include displaying a map of intensity ratio distributions of two infrared absorption bands. In some embodiments, performing an univariate image analysis at block 612 includes displaying a map of intensity distribution at a single wavelength at block 624, and performing peak integration and determining peak ratios at block 628.

Unsupervised classification.

Performing multivariate image analysis at block 620 can include performing an unsupervised classification at block 632 or performing a supervised classification at block 636. Performing an unsupervised classification at block 632 can include determining inferences from datasets without a priori group labeling information. The inferences can be used for exploratory data analysis to find hidden structure or grouping in data. Performing an unsupervised classification at block 632 can include performing a principal component analysis at block 640, performing a hierarchical cluster analysis at block 644, and/or performing a trajectory pattern analysis at block 648.

Principal component analysis (PCA).

Performing an unsupervised classification at block 632 can include performing a principal component analysis (PCA) at block 640. A principal component analysis is a data analysis method that uses an orthonormal basis to factor a group of spectra consisting of correlated spectral features into a linear combination of a basis set of linearly uncorrelated "pseudo-spectra" components. A non-limiting exemplary procedure for performing a principal component analysis is as follows:

Step (1): Pooling all baseline corrected and normalized spectra within the wavenumber region of interest into a data matrix X.

Step (2): Determining the covariance matrix of the original data matrix $A=X^T X$, $X^T$ is the transpose of X.

Step (3): Determining the eigenvector and eigenvalue of the covariance matrix A using matrix eigenvalue decomposition.

Step (4): Sorting the eigenvectors in descending order according to their associated eigenvalue.

Step (5): Assigning the eigenvector with the highest eigenvalue to be the first principal component (PC); and Assigning the eigenvector with second highest eigenvalue to be the second PC and the rest of assignments follow suit.

Step (6): Generating the loading plot of a PC by drawing a curve connecting points of the PC in a 2 dimensional coordinate, where the values of x-axis are wavenumbers of interest and the values of y-axis are the component coefficients of the PC.

And step (7): Generating the scores plots are obtained by drawing a scatter plot of all data points using the projection coefficients of the data points onto the PCs.

Trajectory Pattern Analysis (TPA).

The method 600 can include performing a trajectory pattern analysis (TPA) at block 648. This novel data analysis procedure can be used to extract the direction, speed and dispersiveness information of the temporal changes of collective cellular biochemistry behavior, in order to diagnose the collective trend, velocity and heterogeneity of biochemical changes happening within a cluster of living cells in response to extracellular perturbation.

A trajectory pattern analysis can be based on PCA or PC-LDA score plots. The analysis can be used to extract the direction, speed and dispersiveness information of the temporal changes of collective cellular biochemistry behavior, in order to diagnose the collective trend, velocity and heterogeneity of biochemical changes happening within a cluster of living cells in response to extracellular perturbation. A non-limiting exemplary procedure for performing a trajectory pattern analysis is as follows:

Step (1): Performing the PCA on all spectra to calculate the loading vectors of principal components.

Step (2): Determining the scores for each spectrum using the loading vectors obtained in step (1).

Step (3): Generating 2D or 3D score plots for spectra from each time point using data from step (2).

Step (4): Generating a 2D confidence-ellipse (or 3D confidence-ellipsoid) for the corresponding scatter plot of scores for each time point. In some embodiments, the value of confidence level of the ellipsoid ranges from 90%-99%.

Step (5): Calculating the center of mass and the area of 2D confidence-ellipse (or the volume of the confidence-ellipsoid) from step (4).

Step (6): Linking the centroids of all 2D confidence-ellipse (or 3D confidence-ellipsoids) to form a trajectory in 2D or 3D PC spaces. This trajectory describes the direction and speed of the temporal changes of collective behavior of cellular chemistry in 2D or 3D PC spaces.

In some embodiments, all the volume of the confidence-ellipsoid shows the temporal changes of the scatterness of the collective behavior of cellular chemistry in 2D or 3D PC spaces.

And step (7): Extracting the information regarding the cellular chemistry and chemical abnormalities from the loading vectors of principal components.

Hierarchical Cluster Analysis (HCA).

Performing an unsupervised classification at block 632 can include optionally performing a hierarchical cluster analysis (HCA) at block 644. A hierarchical cluster analysis can be used to build a hierarchical tree of all samples. A hierarchical cluster analysis can start with each single object as an individual cluster, and then in each step merges two nearest clusters together to form a larger cluster based on an underlying distance measure, until all objects are in one single cluster. The final structure can be shown in a branching tree-like dendrogram. A non-limiting exemplary procedure for performing a hierarchical cluster analysis is as follows:

Step (1): Receiving a distance measure of spectra (for example, Euclidean distance, Cosine distance, or Pearson correlation distance).

Step (2): Receiving a linkage method of clusters (Nearest neighbor, Centroid, or Minimum variance).

And step (3) Linking all clusters together based on the chosen distance measure and linkage method to form the full dendrogram.

In some embodiments, the membership of n objects for specified k clusters can be determined by up-tracing the dendrogram until k main branches are present in the same height level.

In some embodiments, the centroid of the $k^{th}$ cluster is the mean spectrum of members in the $k^{th}$ cluster; the standard deviation spectrum of the $k^{th}$ cluster is the standard deviation spectrum of members in the $k^{th}$ cluster.

Supervised Classification.

Performing a supervised classification at block 636 can include using artificial intelligence algorithms to learn from a pre-labeled training dataset to extract features that could be used to distinguish samples from different groups or assign a group label to an unknown sample.

Linear Discriminant Analysis (LDA).

Performing a supervised classification at block 636 can include performing a linear discriminant analysis (LDA) at block 652. Linear discriminant analysis is a data analysis method that strives to find a linear combination of features, such that it maximizes the distances between samples from different groups while minimizes the distances of samples within the same group. When using this method, the group identity of samples has to be known a priori. Linear discriminant analysis can be used in combination with the PCA. An example procedure for performing a linear discriminant analysis is listed as follows:

(1) Choose the first n scores (from PCA) of each sample as new variables.

(2) Calculate the between-class covariance matrix $$S_B = \Sigma_{i=1}^c N_i (\mu_i - \mu)(\mu_i - \mu)^T, \qquad \text{Eq. [1]}$$

where c is the number of groups, $N_i$ is the number of samples in the $i^{th}$ group, $\alpha_i$ is the average spectrum of samples in the $i^{th}$ group, $\mu$ is the average spectrum of all samples.

(3) Calculate the within-class covariance matrix $$S_W = \Sigma_{i=1}^c \Sigma_{x_k \in X_i} (x_k - \mu_i)(x_k - \mu_i)^T, \qquad \text{Eq. [2]}$$

where $X_i$ is a label for the set of spectra in the $i^{th}$ group, $x_k$ is the member spectrum in the $i^{th}$ group $X_i$.

(4) Calculate the generalized eigenvector and eigenvalue of the matrix $S_B/S_W$, using matrix eigenvalue decomposition.

(5) The eigenvectors are sorted in descending order according to their associated eigenvalue.

(6) The eigenvector with the highest eigenvalue is assigned to be the first loading vector (LV). The eigenvector with second highest eigenvalue is assigned to be the second LV and the rest of assignments follow suit.

(7) The cluster vector (CV) is calculated by first multiplying the chosen PCA components with the LV coefficients, and then sums the multiplication results together.

(8) The loading plot of a CV is obtained by drawing a curve connecting points of the CV in a 2 dimensional coordinate, where the values of x-axis are wavenumbers of interest and the values of y-axis are the component coefficients of the CV.

(9) The LDA scores plots are obtained by drawing a scatter plot of all data points using the projection coefficients of the data points onto the CVs.

Figure 28:
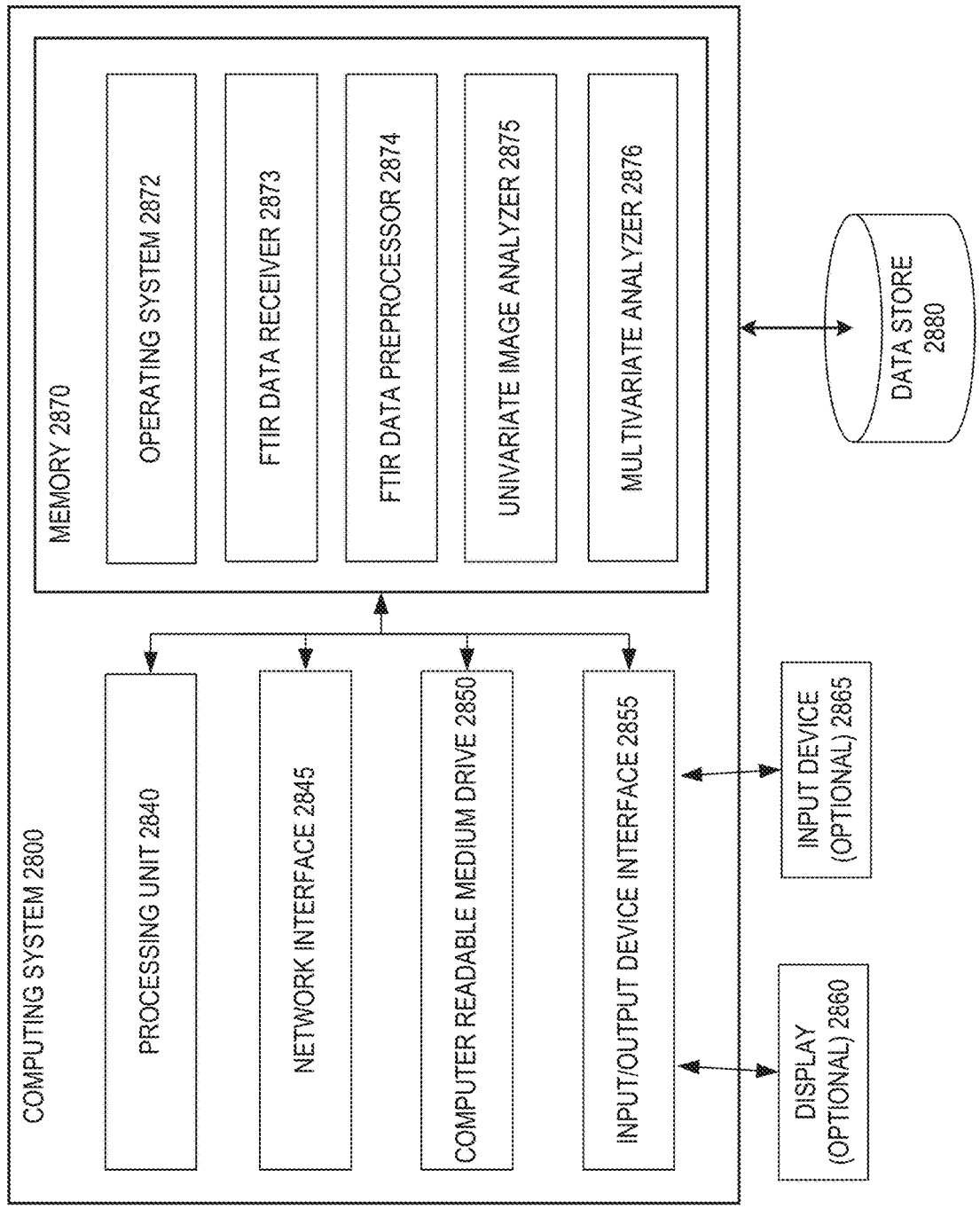
FIG. 28 depicts a general architecture of an exemplary computing device configured to perform analysis of spectral data.

FIG. 28 depicts a general architecture of an exemplary computing system 2800 configured to perform spectral analysis. The general architecture of the computing device 2800 depicted in FIG. 28 includes an arrangement of computer hardware and software components. The computing system 2800 may include many more (or fewer) elements than those shown in FIG. 28. It is not necessary, however, that all of these generally conventional elements be shown in order to provide an enabling disclosure. As illustrated, the computing system 2800 includes a processing unit 2840, a network interface 2845, a computer readable medium drive 2850, an input/output device interface 2855, a display 2860, and an input device 2865, all of which may communicate with one another by way of a communication bus. The network interface 2845 may provide connectivity to one or more networks or computing systems. The processing unit 2840 may thus receive information and instructions from other computing systems or services via a network. The processing unit 2840 may also communicate to and from memory 2870 and further provide output information for an optional display 2860 via the input/output device interface 2855. The input/output device interface 2855 may also accept input from the optional input device 2865, such as a keyboard, mouse, digital pen, microphone, touch screen, gesture recognition system, voice recognition system, gamepad, accelerometer, gyroscope, or other input device.

The memory 2870 may contain computer program instructions (grouped as modules or components in some embodiments) that the processing unit 2840 executes in order to implement one or more embodiments. The memory 2870 generally includes RAM, ROM and/or other persistent, auxiliary or non-transitory computer-readable media. The memory 2870 may store an operating system 2872 that provides computer program instructions for use by the processing unit 2840 in the general administration and operation of the computing device 2800. The memory 370 may further include computer program instructions and other information for implementing aspects of the present disclosure. For example, in one embodiment, the memory 2870 includes a FTIR data receiver 2873 for receiving FTIR data and a FTIR data preprocessor 2874 for correcting scattering effects. The memory 2870 can include an univariate image analyzer 2875 for performing an univariate analysis of FTIR data and a multivariate analyzer 2876 for performing a multivariate analysis of FTIR data. In addition, memory 2870 may include or communicate with data store 2880 and/or one or more other data stores that stores raw spectral data and analysis results.

EXAMPLES

Some aspects of the embodiments discussed above are disclosed in further detail in the following examples, which are not in any way intended to limit the scope of the present disclosure.

Example 1

Preparation of a Microfluidic Device

Figure 4:
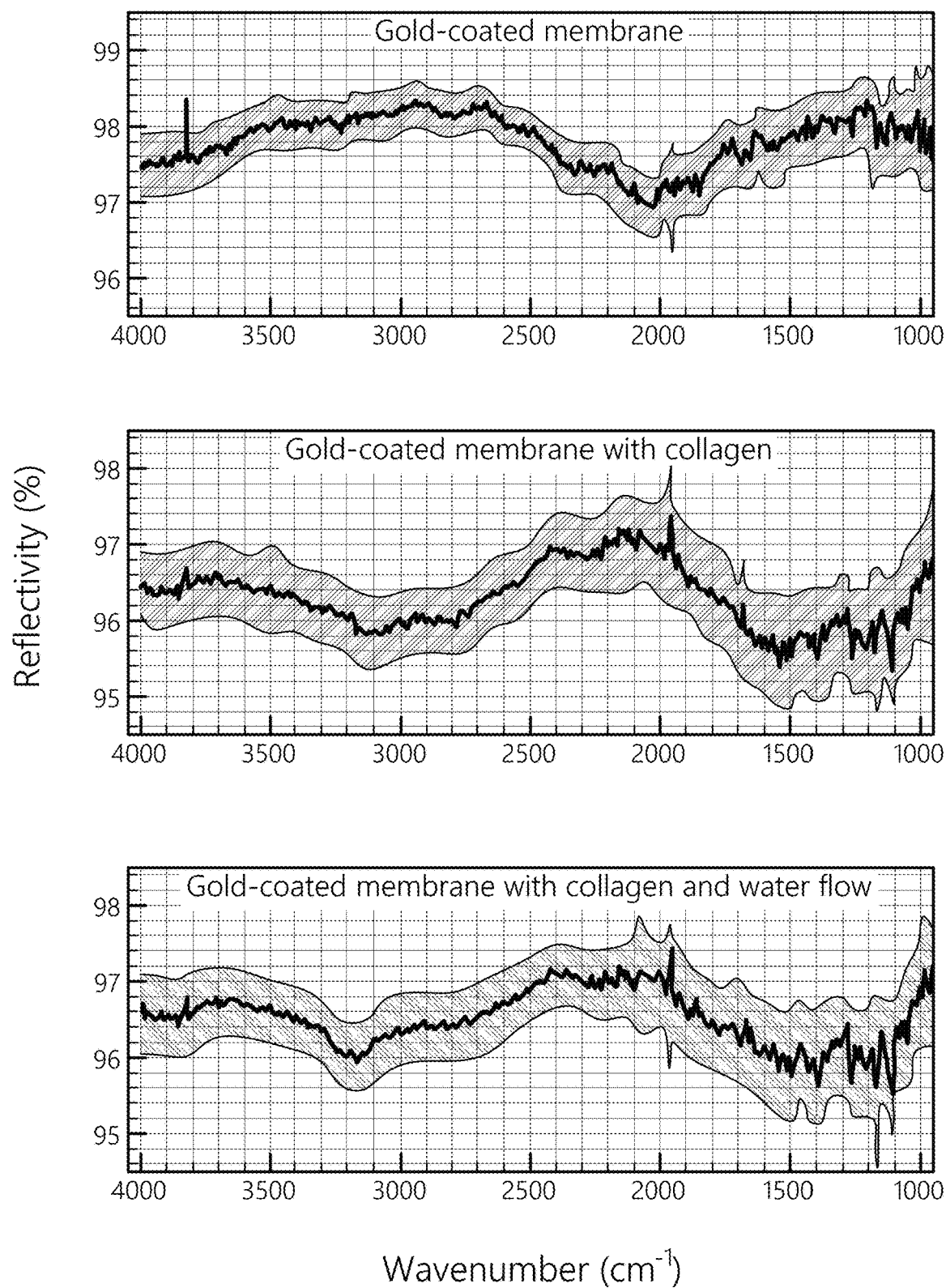
FIG. 4 contains graphs that show membrane reflectivity for a gold-coated polyester membrane, a gold-coated membrane with collagen, and a gold-coated membrane with collagen and water flow beneath the membrane.

Devices shown in FIGS. 1-3 are made of a gold-coated polyester membrane fixed between two pieces of milled polycarbonate. Track-etched polyester membranes with 400 nm pores are extracted from Transwell (Corning) membrane inserts after being coated with 15 nm of gold via e-beam evaporation. The pore size is small enough that the coated-membrane surface reflects IR illumination uniformly without any noticeable scattering. Synchrotron IR measurements in FIG. 4 shows that the reflectivity of the bare membrane is 97±1% compared to a mirrIR (Kevley Technologies) slide over the spectral range of 800-4000 $cm^{-1}$ under various conditions. The upper and lower pieces, shown in FIG. 1, are fabricated out of polycarbonate sheets using a Roland DG MDX-20 milling machine. The lower piece has a 2 mm deep channel that increases linearly in width from 2 mm at the inlet/outlet to 6 mm below the membrane milled into a 3 mm thick polycarbonate sheet. The upper piece is composed of a 6 mm circular viewing window that forms the cell chamber when sealed against the membrane and inlet/outlet ports to connect to the lower chamber milled into a 1 mm polycarbonate sheet. The device is assembled (FIG. 2) by gluing the membrane between upper and lower pieces using medical-grade epoxy (Loctite M-31CL) and curing at 80° C. for 1 h.

Example 2

Closed Channel Designs for FTIR Spectroscopy of Live Cells

Referring now to FIG. 12, a cell measurement platform where support structures etched into or microfabricated of some other material on the base surface allow an infrared transparent window to be pressed into the structure to provide a thin layer of fluid for measurement while preventing the window from compressing cells. Fluid is maintained in the platform by a retaining ring and the assembly is sealed with a second IR transparent window. Springs or some other compressing material may be placed between the sealing window and the fluid displacing window to reduce the water thickness further. Assembly is held together with an external manifold. While cells are maintained in a thin layer of fluid during measurement, they remain in contact with a large media reservoir of the surrounding fluid, allowing media exchange by molecular diffusion.

Figure 13A:
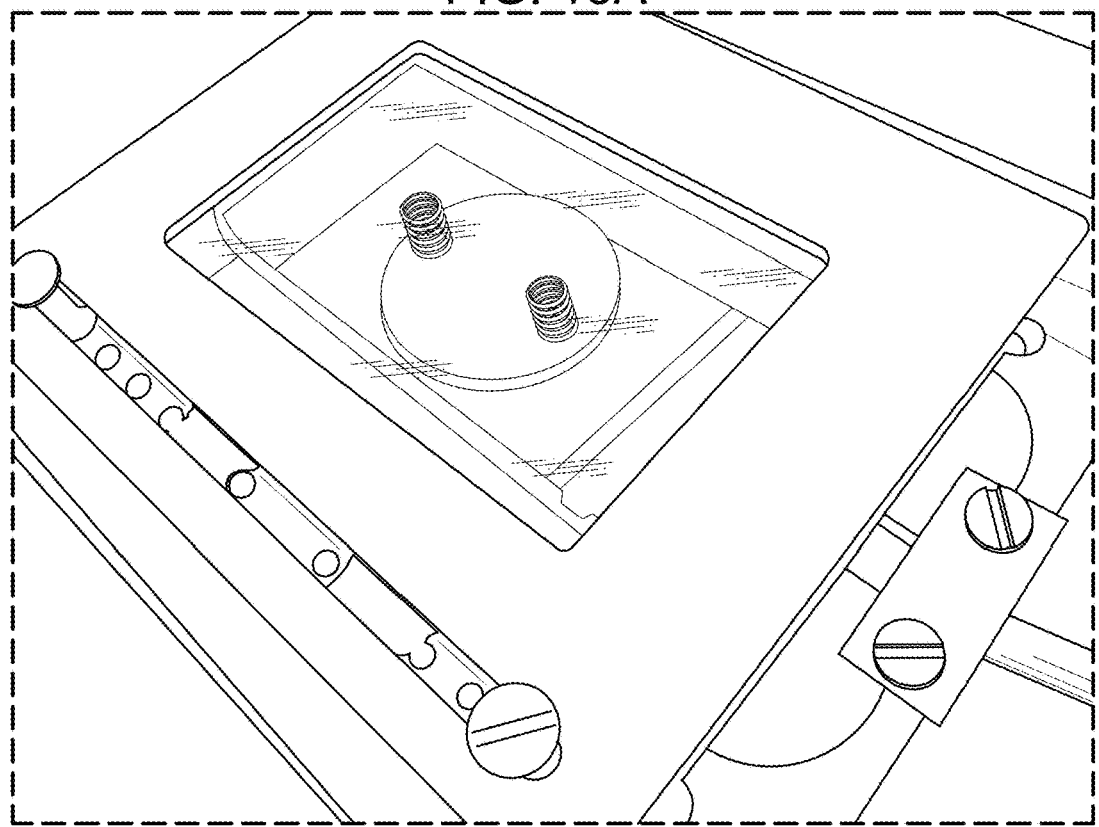
FIG. 13A is a photograph of a microfabricated petri dish device with support structures etched into a silicon base, PDMS retaining ring and zinc selenide windows. Held together by steel plate screwed into a heating stage.
Figure 13B:
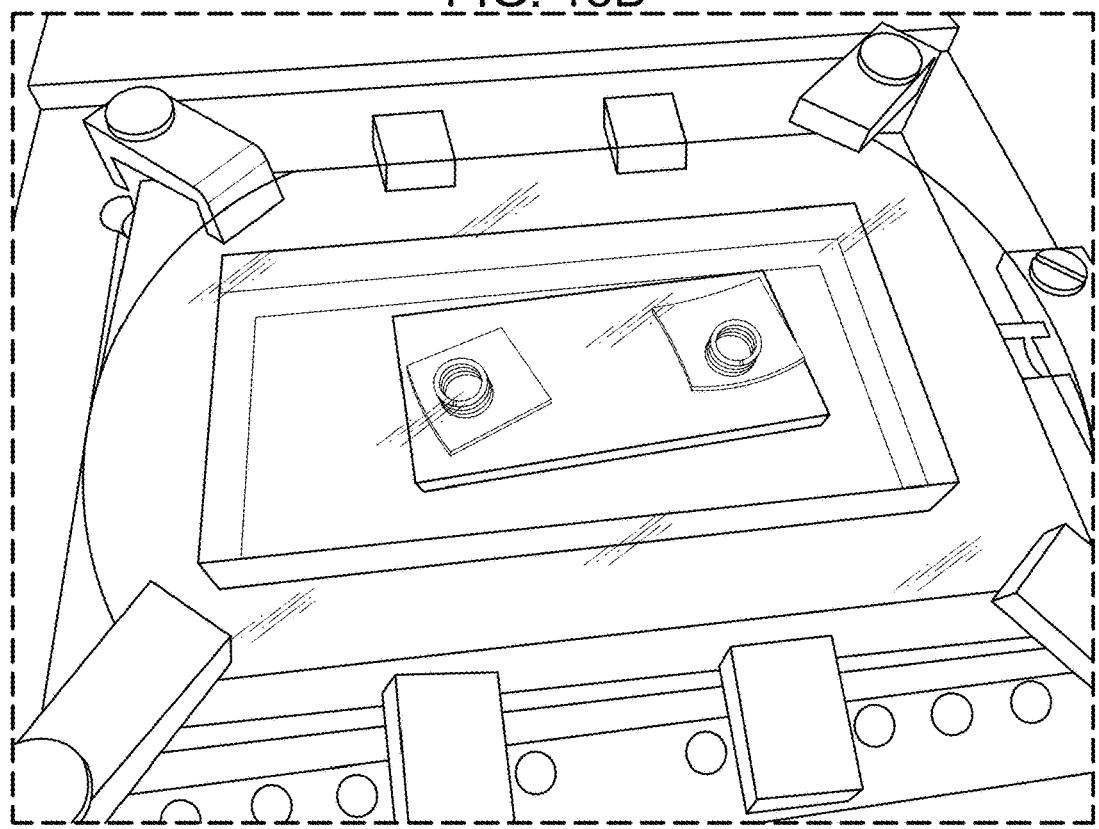
FIG. 13B is a photograph of a working petri dish device using calcium fluoride windows, support structures etched into a silicon base, PDMS retaining ring and held together with clips screwed into a heated stage. RPMI media (purplish red) fills the dish and is in contact with the thin fluid layer under the lower window.

FIG. 13A shows a microfabricated petri dish device with support structures etched into a silicon base, PDMS retaining ring and zinc selenide windows. Held together by steel plate screwed into a heating stage. FIG. 13B shows a working petri dish device using calcium fluoride windows, support structures etched into a silicon base, PDMS retaining ring and held together with clips screwed into a heated stage. RPMI media (purplish red) fills the dish and is in contact with the thin fluid layer under the lower window.

Figure 14:
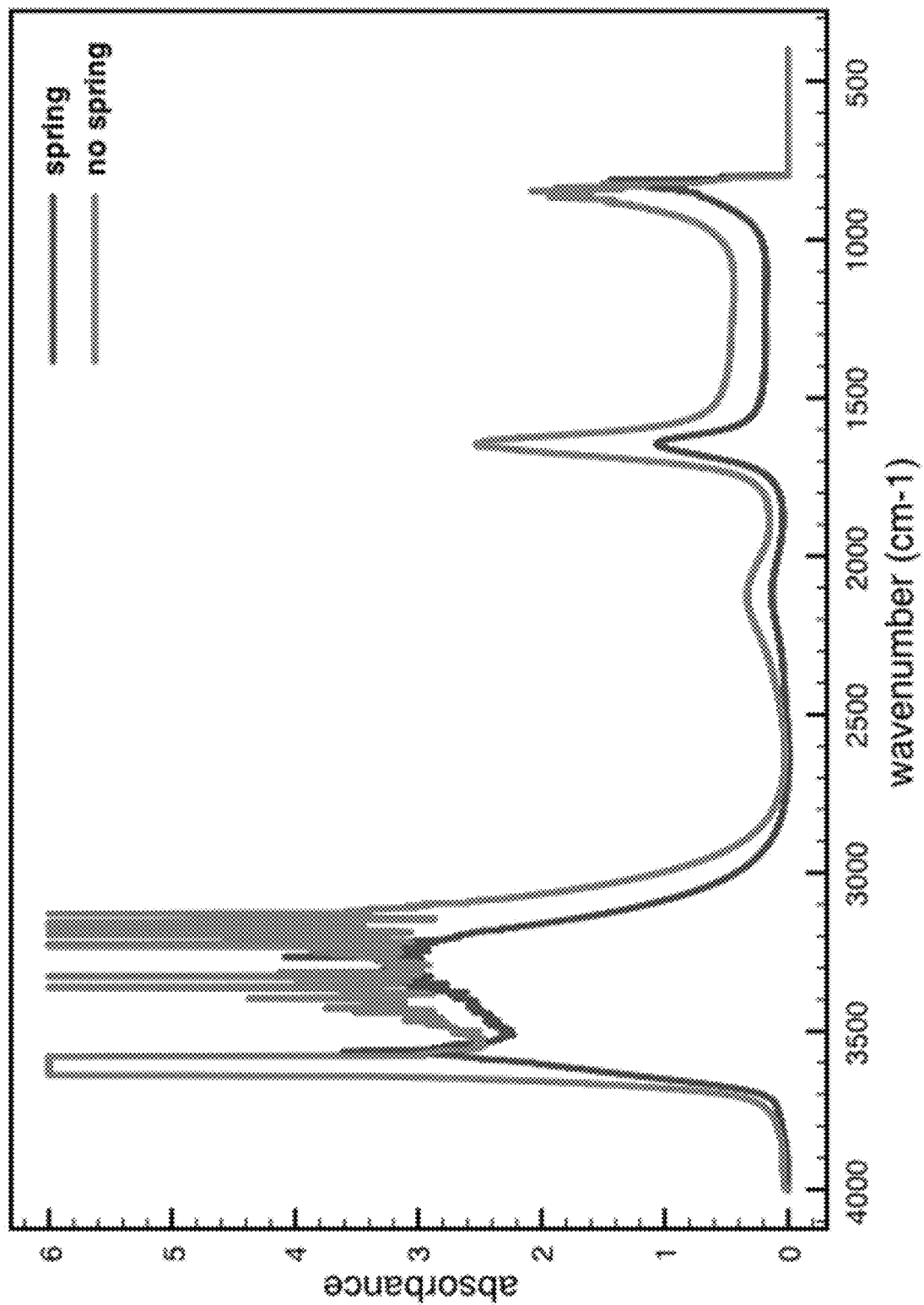
FIG. 14 is a graph that shows utility of springs/compression between sealing and viewing window: IR absorption from water is much lower when springs are used in between sealing and viewing windows. This allows spectral features of cells to be seen with less fluid background.

FIG. 14 shows that utilization of springs/compression between sealing and viewing window can affect spectral detection. IR absorption from water is much lower when springs are used in between sealing and viewing windows. This allows spectral features of cells to be seen with less fluid background.

Figure 15:
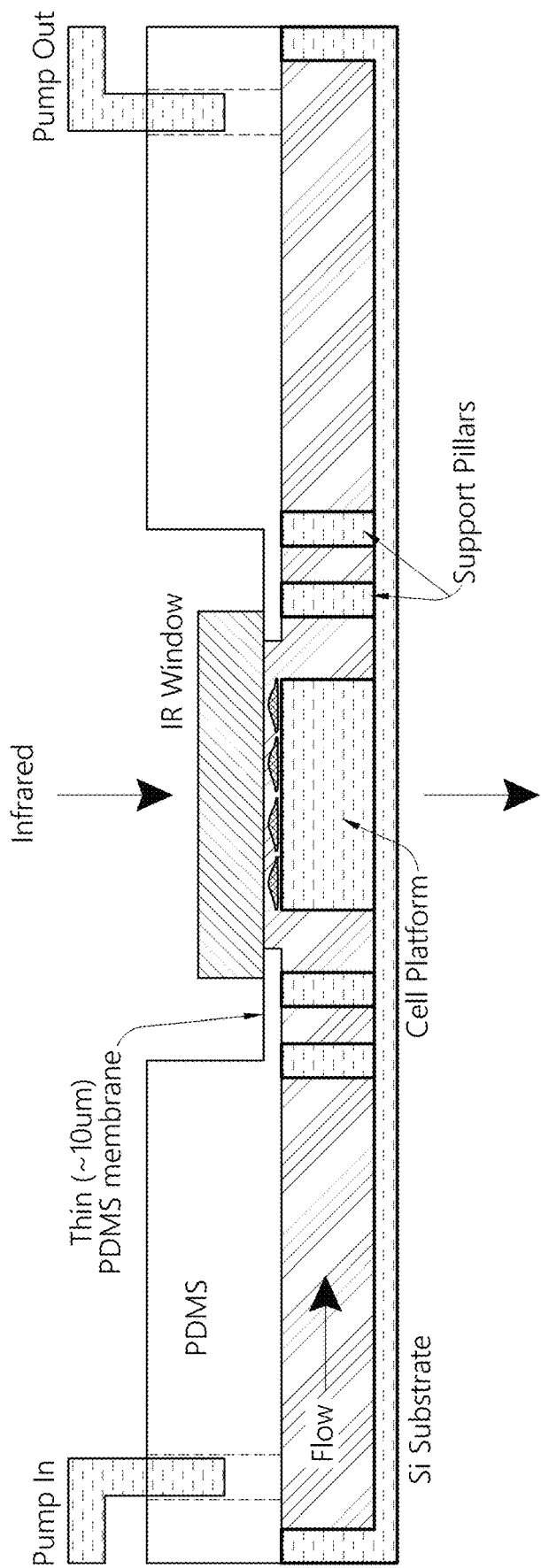
FIG. 15 is a schematic illustration of another example of a cell platform.

Referring now to FIG. 15, in some embodiments, a cell platform etched deep (>100 um) into a silicon wafer or fabricated on top of a substrate with a thin polymer (PDMS) layer surrounded by a thicker support layer acting as the spacer to prevent cell compression. This is similar in function to the previous version shown in FIG. 12 except input and output holes within the support layer allow flow in the media reservoir. This allows media composition (for example, adding stressors or treatment) to be changed during measurement without disturbing cells or windows.

Example 3

A Versatile Electrochemical Impedance Spectroscopy Platform in Parallel with Full-Field Infrared Imaging for Simultaneously Monitoring of Membrane Electrochemical and Transport Properties of Cells In Situ This example demonstrates an electrochemical impedance spectroscopy platform in parallel with full-field infrared imaging for simultaneously monitoring of membrane electrochemical and transport properties of cells in situ.

Figure 16:
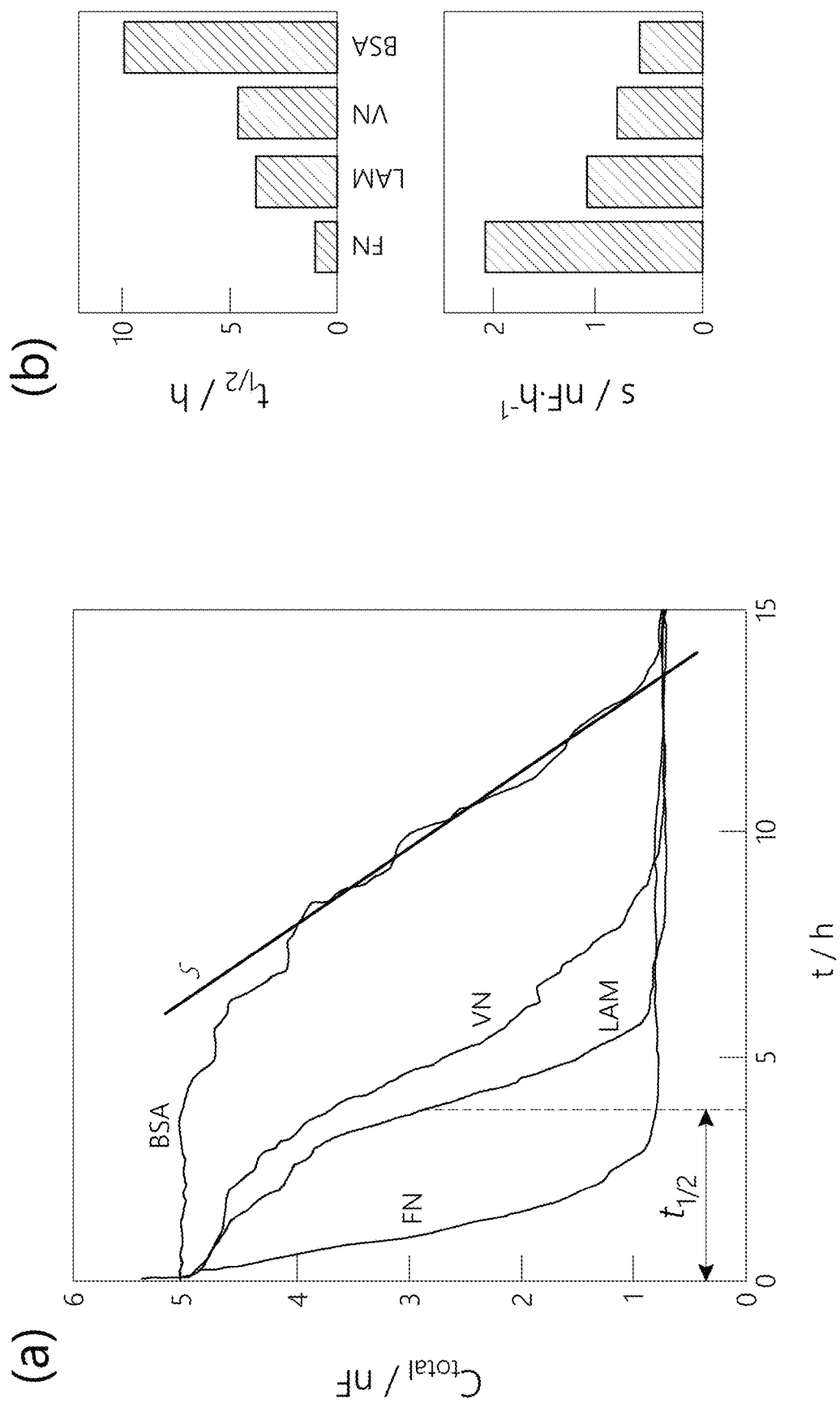
FIG. 16, panel (a) shows a time courses of the capacitance measured at 40 kHz when MDCK cells were seeded into ECIS arrays whose electrodes were coated with different ECM proteins: fibronectin (FN); laminin (LAM); vitronectin (VN); bovine serum albumin (BSA). Cell spreading on a particular protein are characterized by two parameters: $t_{1/2}$ denotes the time necessary to achieve half-maximum capacitance drop as it is indicated in the figure for the laminin-coated electrode. The slope of the curve is between C=4 nF and C=2 nF—equivalent to the apparent rate of spreading—was extracted from this data range by linear regression as shown for the BSA-coated electrode.

Real-time microfluidic synchrotron infrared (SIR) spectromicroscopy offers chemical information during live cellular responses to environmental perturbations in a completely label-free and non-invasive manner. However, SIR data may not provide information on the structural and functional properties of cell membrane which is often considered important. All cells acquire the needed molecules and ions from their surrounding environments. The membrane controls ion and molecule selection as well as active and passive transport into and out of the cytosol; notably also serves to physically separate and protect the cell from its surrounding. From this biological perspective, being able to monitor the cell membrane properties can be important to future full-field imaging SIR experiments. The emerging non-invasive and very versatile approach based on electrochemical impedance analysis named electric cell-substrate impedance sensing (ECIS) can fill this experimental and information gap. In this approach, the initially suspended cells are seeded on an electric cell-substrate impedance sensing (ECIS) electrode, allowed to attach, spread and migrate on the electrode surface to obtain time-resolved impedance readings caused by the gradual constriction of current flow. Once the cells form a confluent monolayer the impedance readings become stable as long as the cells do not change their shapes. FIG. 16 demonstrates how the principle of ECIS leads to a powerful analytical tool for revealing the kinetics of cell spreading.

Approach

Figure 17:
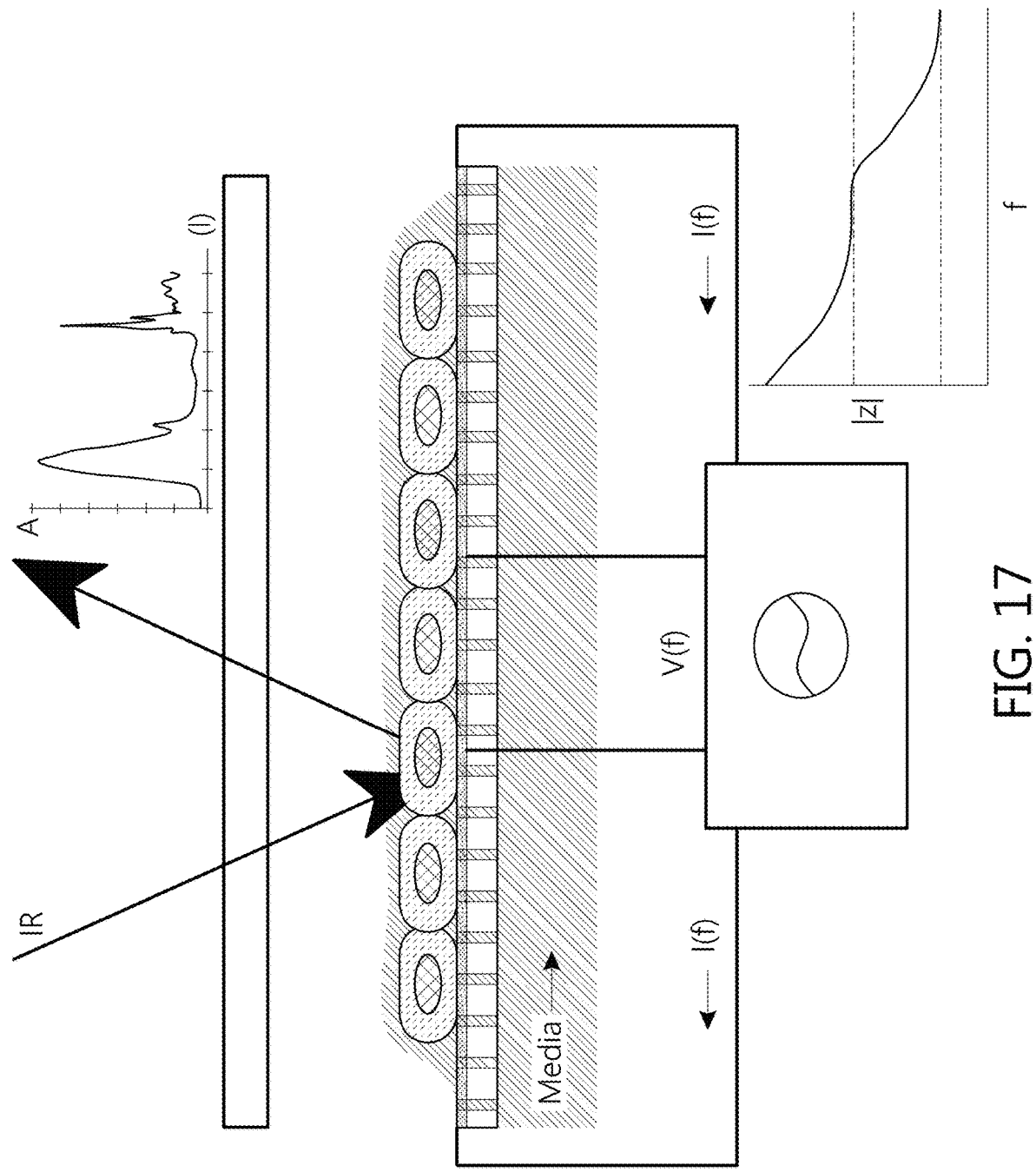
FIG. 17 shows a schematic illustration of a membrane microfluidic full-field Imaging synchrotron infrared (SIR) integrated with TEER for simultaneous measurements of cellular chemistry and membrane properties.

A filter-membrane based microfluidic SIR platform can be combined with ECIS into a more straight-forward method called transendothelial or transepithelial electrical resistance (TEER) spectroscopy. FIG. 17 shows a schematic illustration of the membrane microfluidic full-field imaging SIR integrated with TEER for simultaneous measurements of cellular chemistry and membrane properties. TEER can be applied to interrogate blood-brain barrier integrity, impacts of extracellular matrix (ECM) proteins on cell attachment, wounding and healing, and bacteria and inflammation effects on lung functions.

Figure 18:
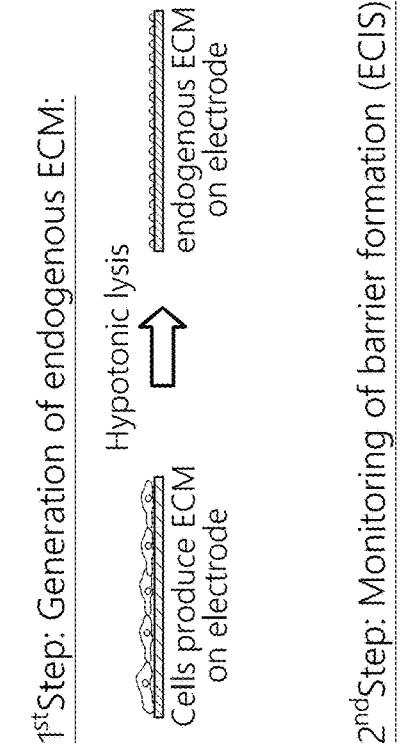
FIG. 18, panels (a)-(c), show a non-limiting embodiment in the application of TEER to characterize how ECM affects the transport property/integrity of brain capillary endothelial cells (PBCEC).

FIG. 18, panels (a)-(c) show a non-limiting embodiment in the application of TEER to characterize how ECM affects the transport property/integrity of brain capillary endothelial cells (PBCEC). FIG. 18, panel (a) shows establishment of endogenous extracellular matrices derived from astrocytes, pericytes, aorta (PAEC) and cerebral endothelial cells (PBCEC) on the ECIS electrode surfaces (1st step). Seeding of PBCEC on ECIS electrodes that had been pre-coated with endogenous extracellular matrices. Monitoring the progression of the barrier formation of PBCEC on different matrices (2nd step) by ECIS technique. FIG. 18, panels (b)-(c) show analyses of the impact of extracellular matrices on the barrier integrity on PBCECs. Time course of the resistance measured at a sampling frequency of 400 Hz. FIG. 18, panel (b) shows a comparison between astrocyte, pericyte and PCBEC derived endogenous extracellular (as control) matrix on the integrity of PBCEC. FIG. 18, panel (c) represents the relation between aorta derived matrices to endothelial derived matrices (control). Each data point represents the mean±SD.

Design and Methods

A platform consists of two technological components: A membrane-based open channel microfluidic device for long term SIR spectromicroscopy of live adherent cells, and the electrical circuit and electrodes for TEER impedance spectroscopy.

Membrane-Based Microfluidics.

Figure 19:
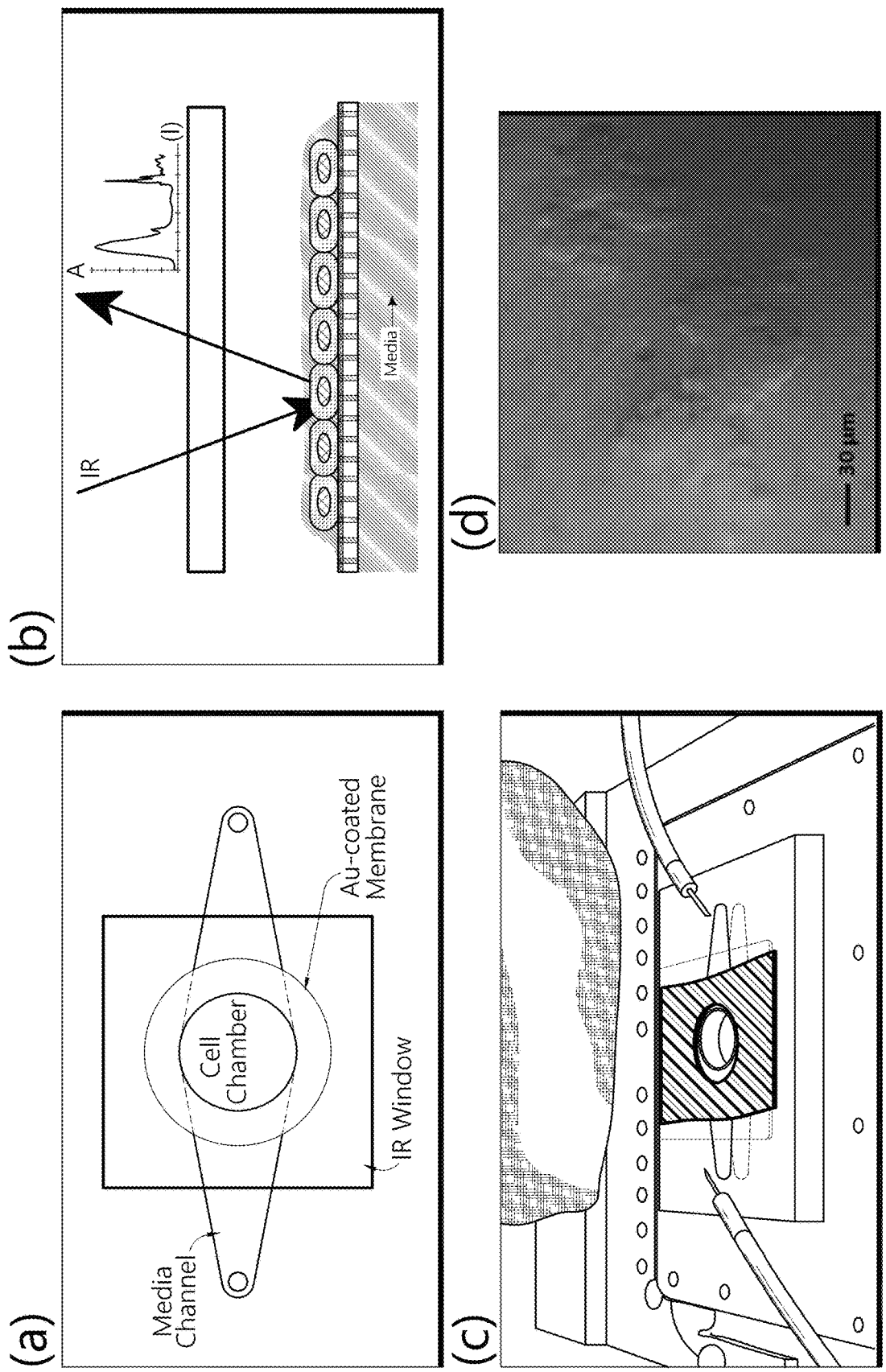
FIG. 19, panels (a)-(d) show a schematic illustration of a membrane-based open channel device and the use thereof for monitoring and analyzing live cells.

The membrane-based open channel device can allow long-term continuous IR measurement of live adherent mammalian cells. Shown in FIG. 19, the device includes a gold-coated porous membrane between a feeding channel and a viewing window milled in polycarbonate. Cells are maintained on the upper membrane surface in a thin layer of fluid while media is replenished from the feeding channel below. The upper chamber is sealed with a rubber gasket and IR-transparent window to maintain a humid environment while allowing continuous transflection measurement of adherent mammalian cells using the gold-coated membrane as a reflective surface. FIG. 19, panel (a) shows a vertical layout. FIG. 19, panel (b) shows a side view illustrating membrane feeding. FIG. 19, panel (c) shows a fabricated device on IR microscope. FIG. 19, panel (d) shows a brightfield image of cells on membrane.

Integrated Trans-Epithelial Electronic Resistance (TEER) Impedance Spectroscopy.

A characteristic feature of epithelial cell layers is the formation of a tight cellular barrier that controls transport across the cell layer. Impedance spectroscopy is a technique to measure the trans-epithelial electrical resistance (TEER) in addition to the capacitance of the cell layer by measuring the impedance across the cell layer while an AC voltage is swept in frequency. This non-invasive method can be applied to living cells without markers and allows them to be monitored during growth and differentiation. By modifying the current design to have patterned electrodes on the membrane instead of a uniform coating, impedance spectroscopy and SR-FTIR measurements can be performed simultaneously. This can allow precise measurement of the cell junction integrity in response to environmental stress to be correlated to chemical information from the FTIR measurements.

Figure 20:
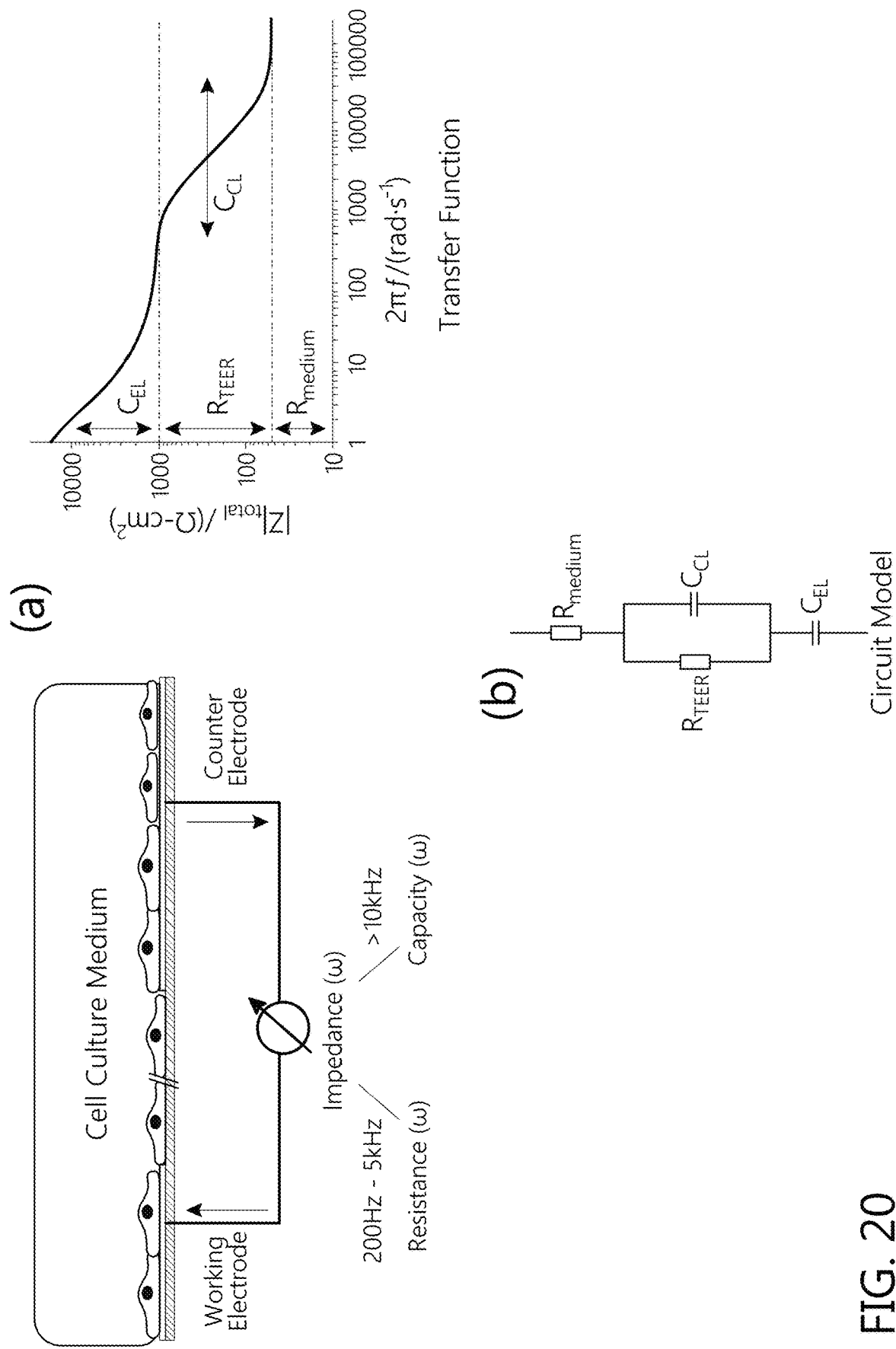
FIG. 20, panels (a)-(b) shows impedance spectroscopy data of epithelial cells on membrane.

FIG. 20 shows impedance spectroscopy data of epithelial cells on membrane. Patterned electrodes on the membrane allow 4-probe measurement of the transfer function of the cell junctions using an AC sweep. The cells can be modeled as a circuit where the transepithelial resistance (TEER) and cell junction capacitance are parameters that are readily extracted from a measured transfer function.

Benefits of the Membrane-Based Open Channel Microfluidic Device

Air-Liquid Tissue Culture.

The platform is well suited for cell-types capable of growing at an air-to-liquid interface such as epithelial cell lines of the lung, skin, and eyes. The platform can be used as tissue-on-a-chip by layering endothelial and epithelial layers together. This provides a more representative structure to the human body (i.e., alveolar-capillary barrier) and can be pursued for epithelial cell culture.

Reflective Membrane.

The pore size on the membrane is small enough that the gold-coated membrane surface reflects IR illumination without noticeable scattering. Measurements showed that the reflectivity of the bare membrane is 97±1% compared to a mirrIR (Kevley Technologies) slide over the spectral range of 800-4000 $cm^{-1}$. This allows cells to maintained on top of membrane in a thin liquid film with a large media reservoir below. Because of the variation in sample thickness and the differences in the refractive index between cells and growth media are small, the electric standing wave artifacts are absent.

Advanced I/O.

Figure 21:
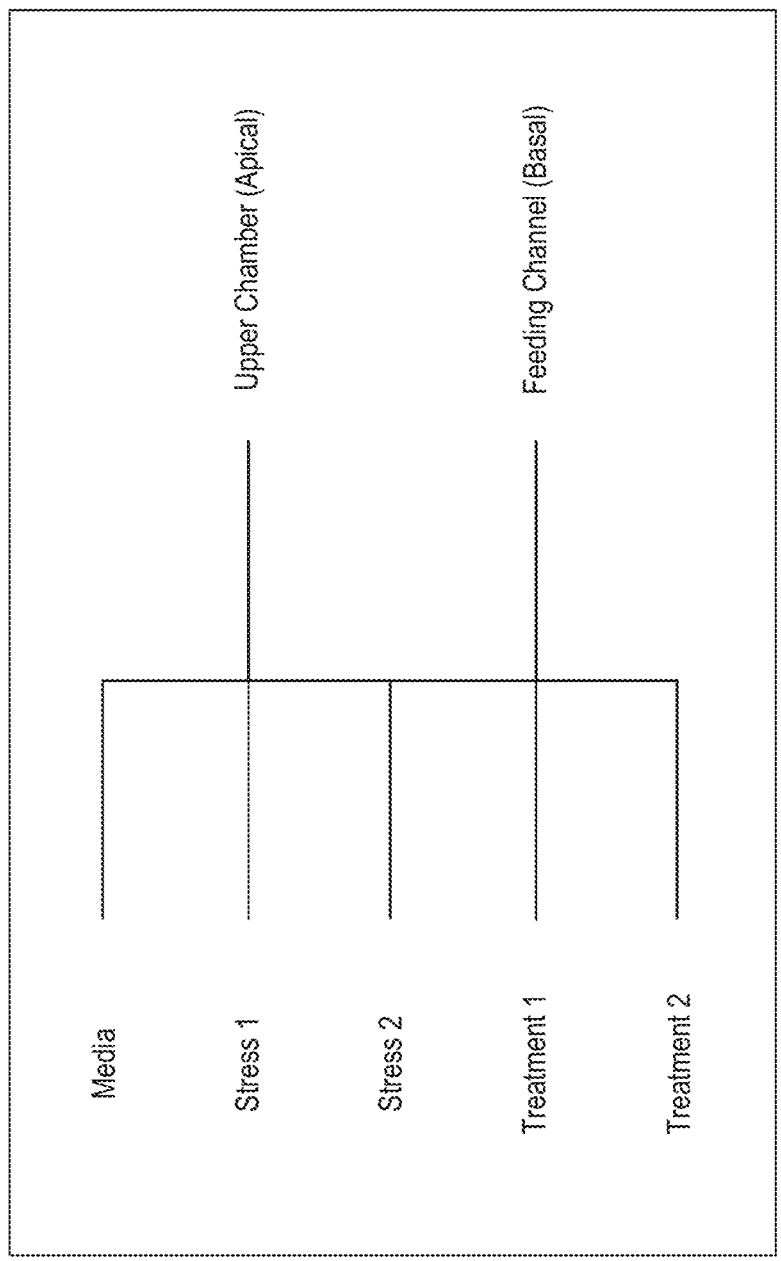
FIG. 21 shows a schematic illustration of routing of a feeding device with soft lithography I/O.

Using PDMS soft lithography, a feeding system can be used to introduce many possible stressors and treatments that can be individually routed to the upper or lower chamber of the array. FIG. 21 shows a schematic illustration of routing with soft lithography I/O. Any Input or combination can be routed to the upper chamber (apical membrane) or feeding channel (basal membrane).

This can give precise temporal control of dosing and enable complex, multi-stage, combinatorial experiments involving both stressors and treatments.

Benefits of TEER Impedance Spectroscopy

Impedance spectroscopy is a highly reliable technique to measure the transendothelial or transepithelial electrical resistance (TEER), revealing the cell-cell contacts as well as the transport properties and cell membrane integrity. In impedance spectroscopy the frequency of an applied AC voltage is swept while measuring the amplitude and the phase of the resulting AC current. The resulting total impedance, Z, contains information from which the capacitance of the cell layer can be extracted and provided as a readout parameter. This non-invasive method can be applied to living cells without markers and allows them to be monitored during growth and differentiation. Additionally, because of the non-invasive nature of the method, the barrier properties can be characterized before using the cultures in subsequent experiments.

Altogether, these data illustrates design and benefits of a platform that includes a membrane-based open channel microfluidic device for long term SIR spectromicroscopy of live and the electrical circuit and electrodes for TEER impedance spectroscopy.

Example 4

Using a Closed Channel IR Transparent Microfluidic Device for Studying Migrating Cells in Physiologically Relevant Electric Fields (EFs)

This example demonstrates using a closed channel IR transparent microfluidic device for studying the chemistry and behavior of migrating cells in physiologically relevant electric fields.

Figure 22:
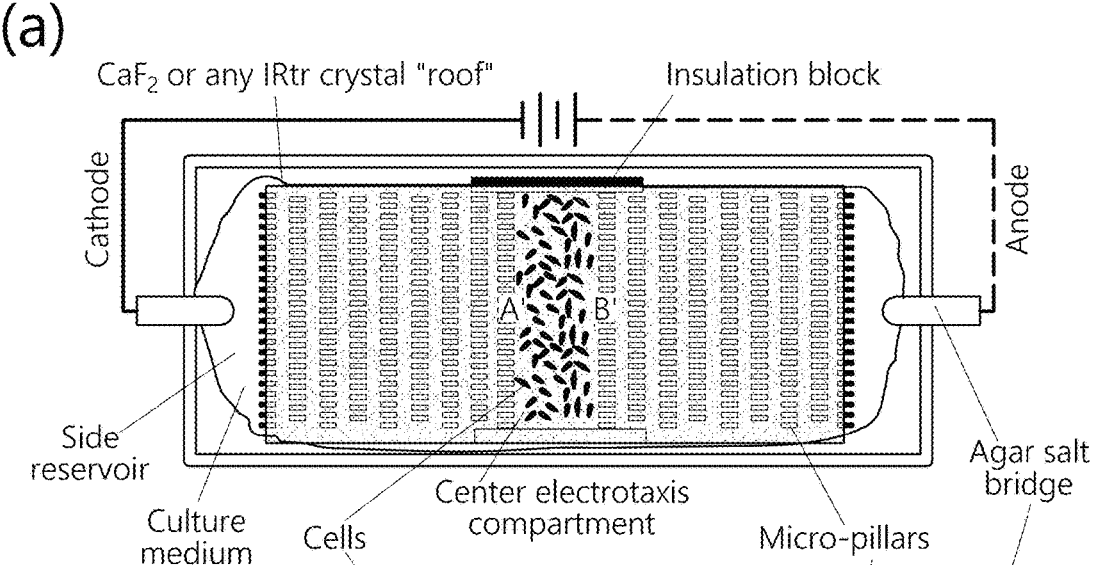
FIG. 22, panels (a)-(b) show an exemplary overview of an IR transparent (IRtr) design and assembly for studying signaling and biochemical behavior of migrating cells in electric field (electrotaxis).
Figure 22:
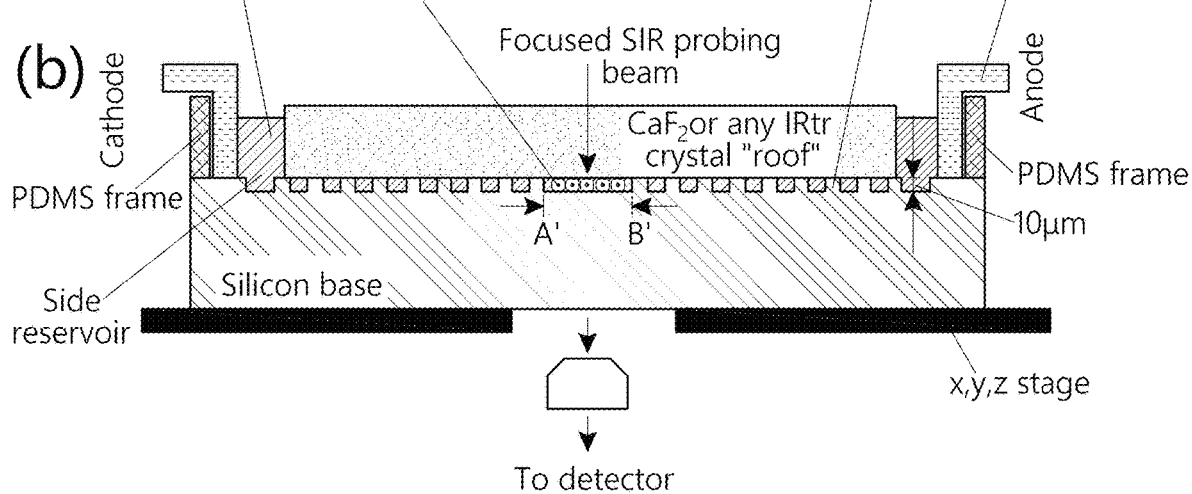
Figure 23:
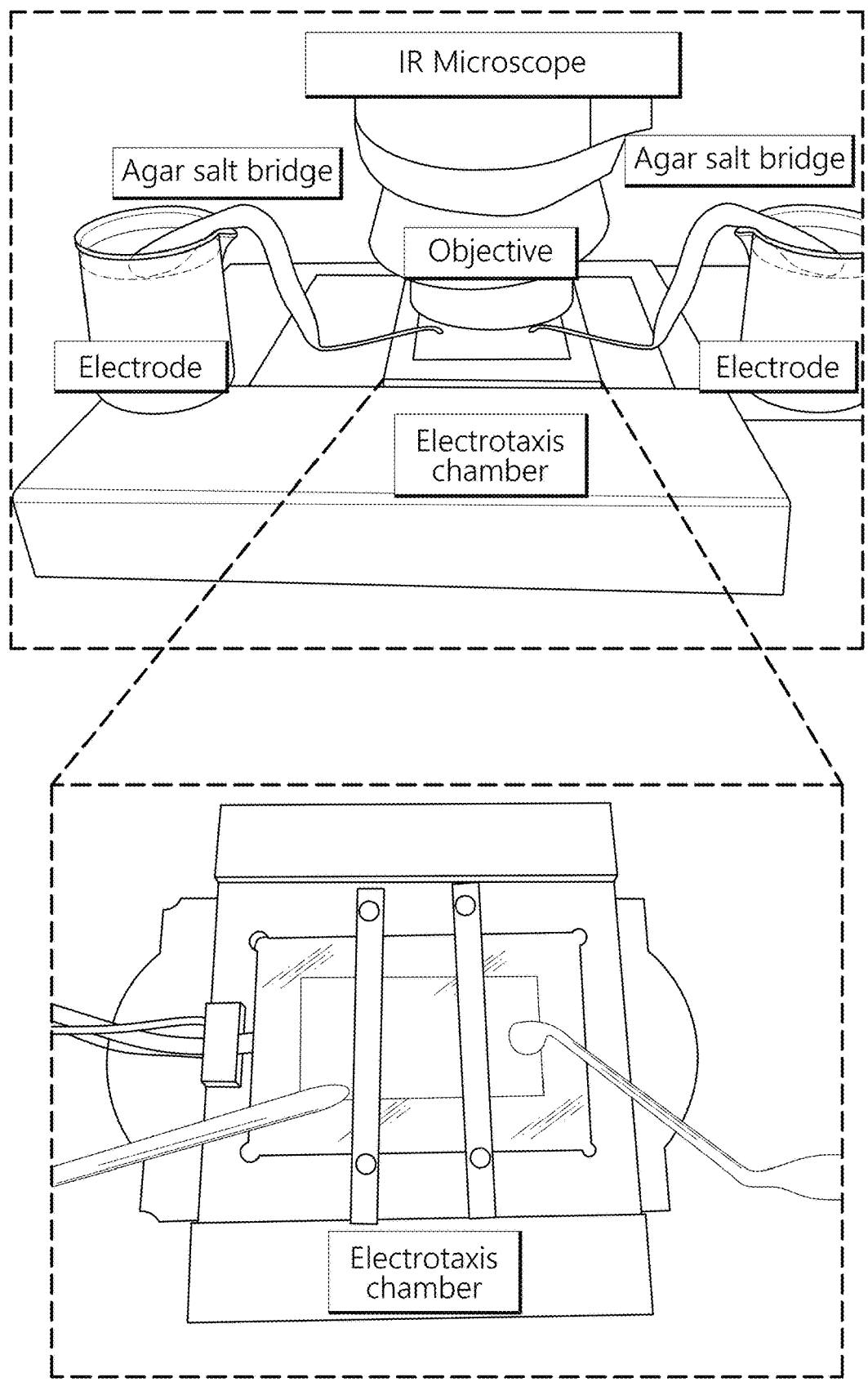
FIG. 23 shows photographs of the set IRtr experimental setup for FTIR electrotaxis study.

FIG. 22 shows an exemplary overview of using a closed channel infrared transparent (IRtr) microfluidic device (e.g., the closed channel IRtr microfluidic device shown in Example 2 and FIGS. 12-13) for studying the chemistry and behavior of migrating cells in physiologically relevant electric fields (EFs), such as those associated with wound healing, cancer metastasis, cell/organ development or differentiation. This involved integrating the IRtr microfluidics with an existing device that can generate well-controlled electric fields. A photo of the setup is shown in FIG. 23.

This integrated system enabled using infrared spectroscopy to measure signaling and biochemistry behavior of migrating cells in physiological electric fields in situ and in real time. The common practice unit device become an electrotaxis compartment, also consisting of two arrays of micro-pillars with height of 10 μm etched into a 500-μm thick silicon base and a PDMS frame. The micropillars again functioned as structural spacers to maintain precise thickness of the culture medium beneath the spring-pressed infrared transparent (IRtr) crystal (CaF2) "roof". The two side-reservoirs of the IRtr unit housed the agar salt bridges to complete the electric circuit. A well-controlled stable EF was applied to cells plated in the center electrotaxis compartment through the two agar salt bridges and the current-conducting cell culture media.

Figure 24:
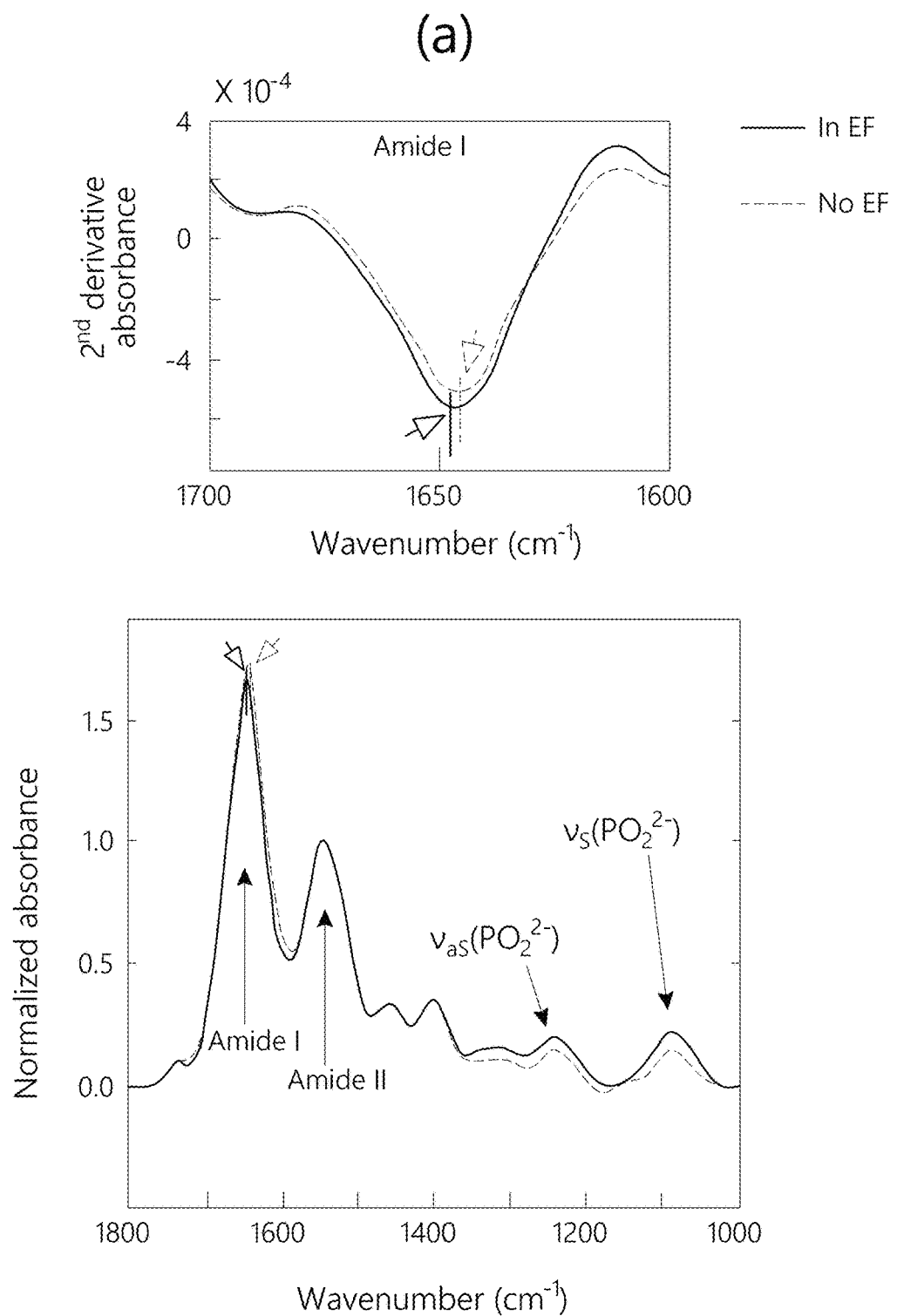
FIG. 24, panels (a)-(b) show mean FTIR absorption spectra and the corresponding $2^{nd}$ derivative spectra.
Figure 24:
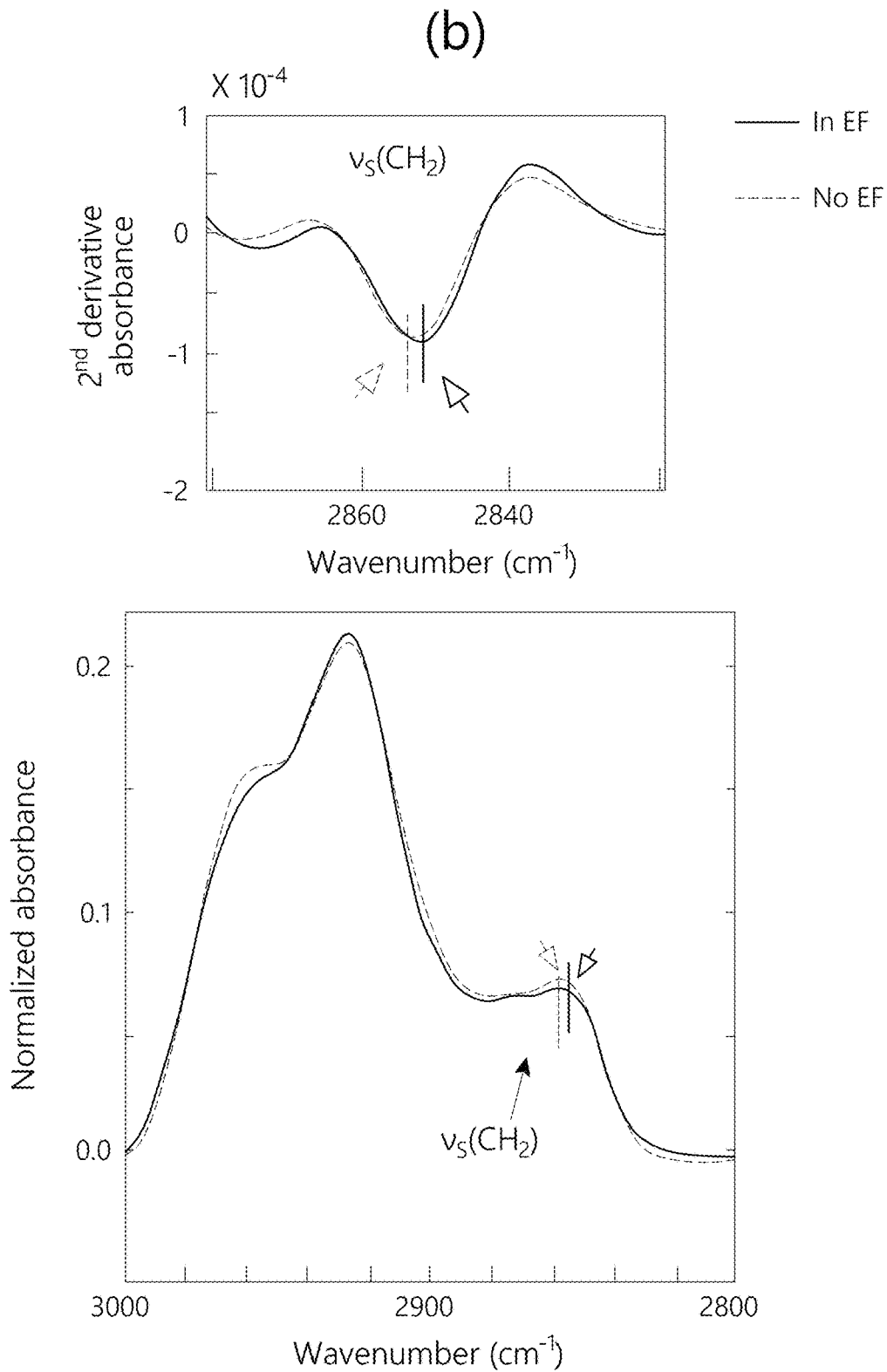

FIG. 24, panels (a)-(b) show overall diagnostic infrared spectral changes of human corneal epithelial (HCE) cells before and after they were in a stable and homogeneous EF of 200 mV/mm for 30 minutes. Here the EF strength is in the range of the EF strength in wound healing. All infrared spectra of shared characteristic absorption bands dominated by the vibrations of the phosphoryl groups ($v_{as}(PO_2)^{2-}$, $v_s(PO_2)^{2-}$), the amide I ($v(C=O)$) and amide II ($v(C-N)$) peptide bonds (see FIG. 24, panel (a)), and the methylene group ($v_s(CH_2)$) of the fatty acid chains of the membrane lipids (see FIG. 24, panel (b)) before the EF stimulation. During EF stimulations, the phosphoryl signal intensity increased in concert with a blue shift in the amide I peak, known spectral markers for protein phosphorylation. Meanwhile, the red shift of the $v_s(CH_2)$ peak to a lower frequency implies a change in membrane architecture to, with special emphasis on the lipid organization and domain formation, a more ordered gel-state bilayer.

Figure 25:
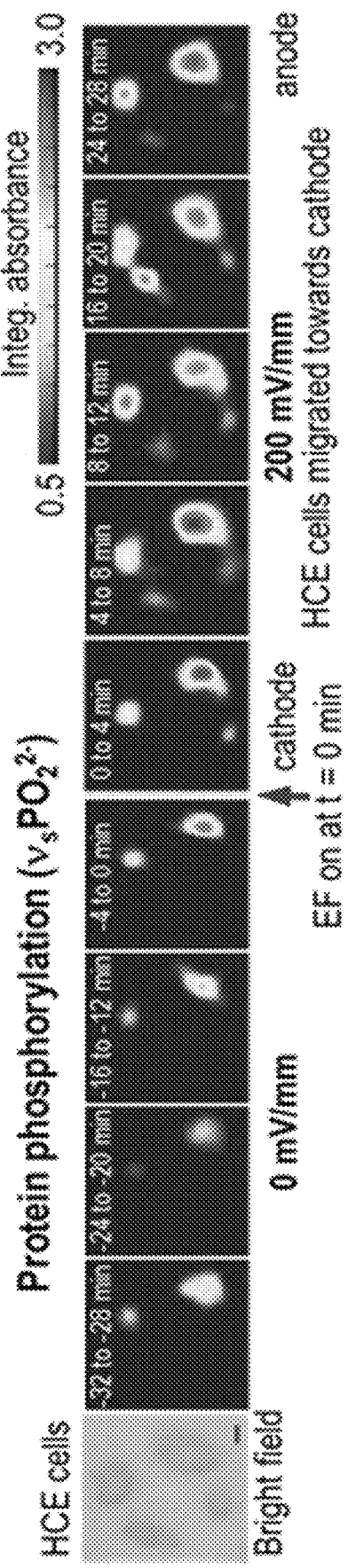
FIG. 25, panels (a)-(b) show SR-FTIR spectromicroscopy analysis of the spatiotemporal dynamics of protein phosphorylation during development of cell electrotaxis. All bright field images were acquired during SR-FTIR spectral imaging.
Figure 25:
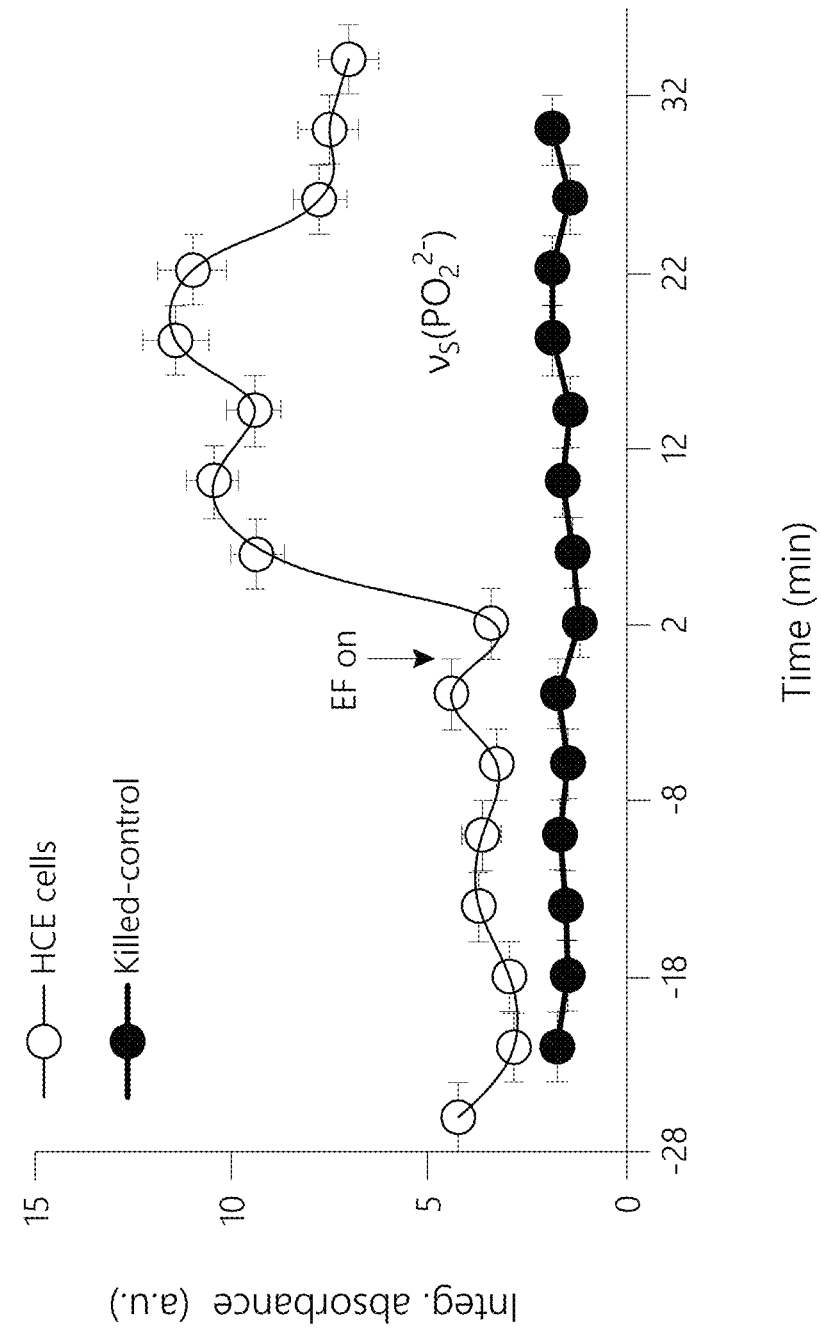

In FIG. 25, panel (a) shows visualization of the space and time resolving individual infrared spectra in the phosphorylation region for individual HEC. The corresponding time-course plots in FIG. 25, panel (b) revealed gradations of asymmetric patterns of protein phosphorylation that exhibited two striking phenomena: all cells initiated protein phosphorylation almost immediately, and the overall phosphorylation-dephosphorylation level exhibited a bi-modal-like temporal behavior. Upon applying the EF on cells, the $v_{total}(PO_2^{2-})$ intensity per cell increased rapidly at a rate of ~0.54 a.u./minute for ~4 minutes, at which point the intensity was ~216% above its pre-EF level. For the next 4 minutes, it continued to increase at a rate of ~0.083 a.u./min, at which point the intensity was 250% above its pre-EF level. The intensity dropped slightly before climbing slowly at a rate of ~0.19a.u./minute until t=~16 minutes, at which point the $v_{total}(PO_2^{2-})$ intensity was ~292% of its pre-EF level. Thereafter the $v_{total}(PO_2^{2-})$ intensity precipitated at a slightly slower rate of ~0.15 a.u./minute until t=~24 minutes, at which point the intensity was 166% of its pre-EF level. It leveled off for the remaining experimental duration; at this point the $v_{total}(PO_2^{2-})$ intensity was approximately at a midpoint between its pre-EF and peak intensity.

Figure 26:
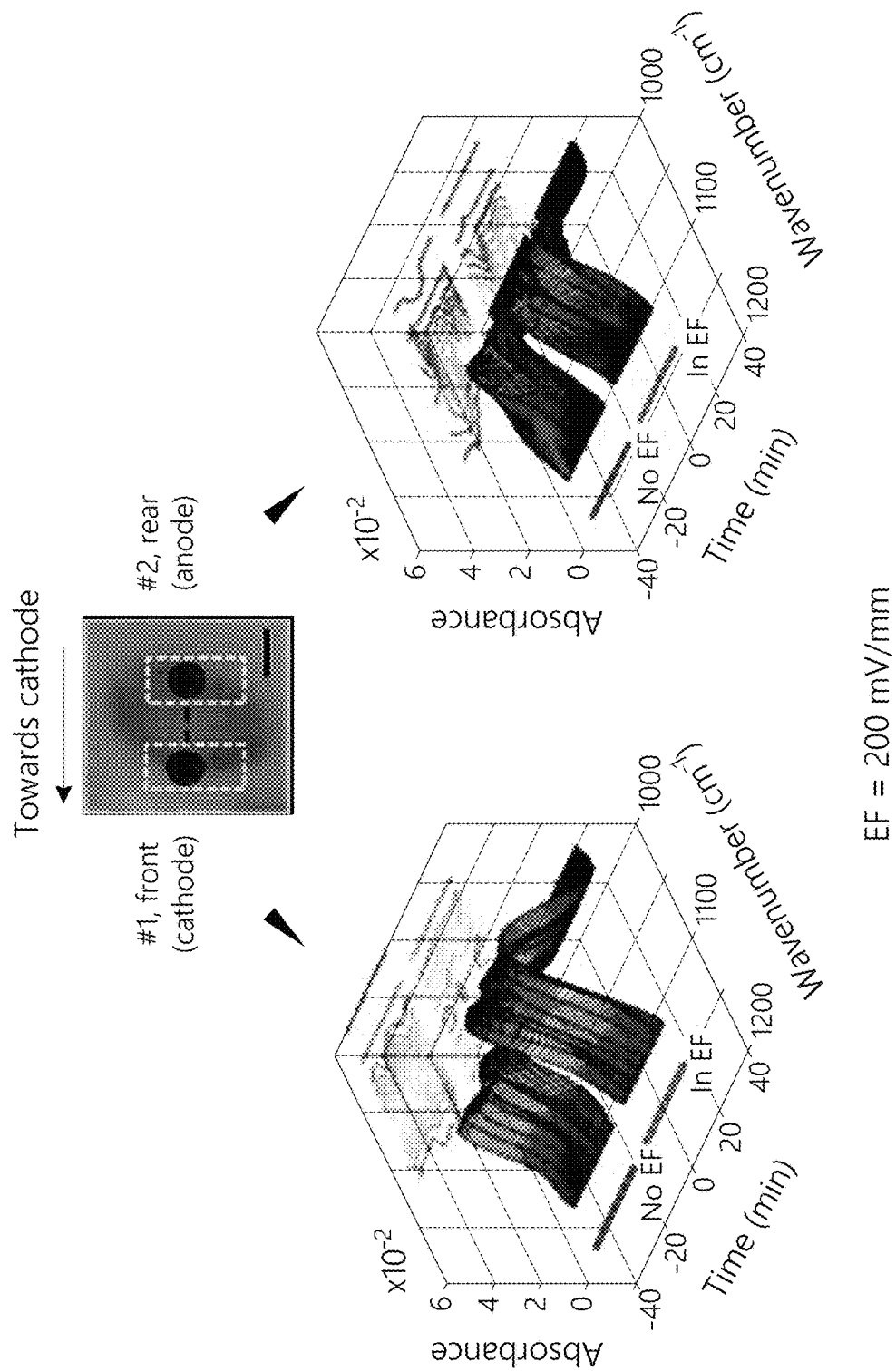
FIG. 26, panels (a) and (b), show high resolution SR-FTIR spectromicroscopy analysis of the spatiotemporal dynamics of protein phosphorylation during development of cell electrotaxis.
Figure 26:
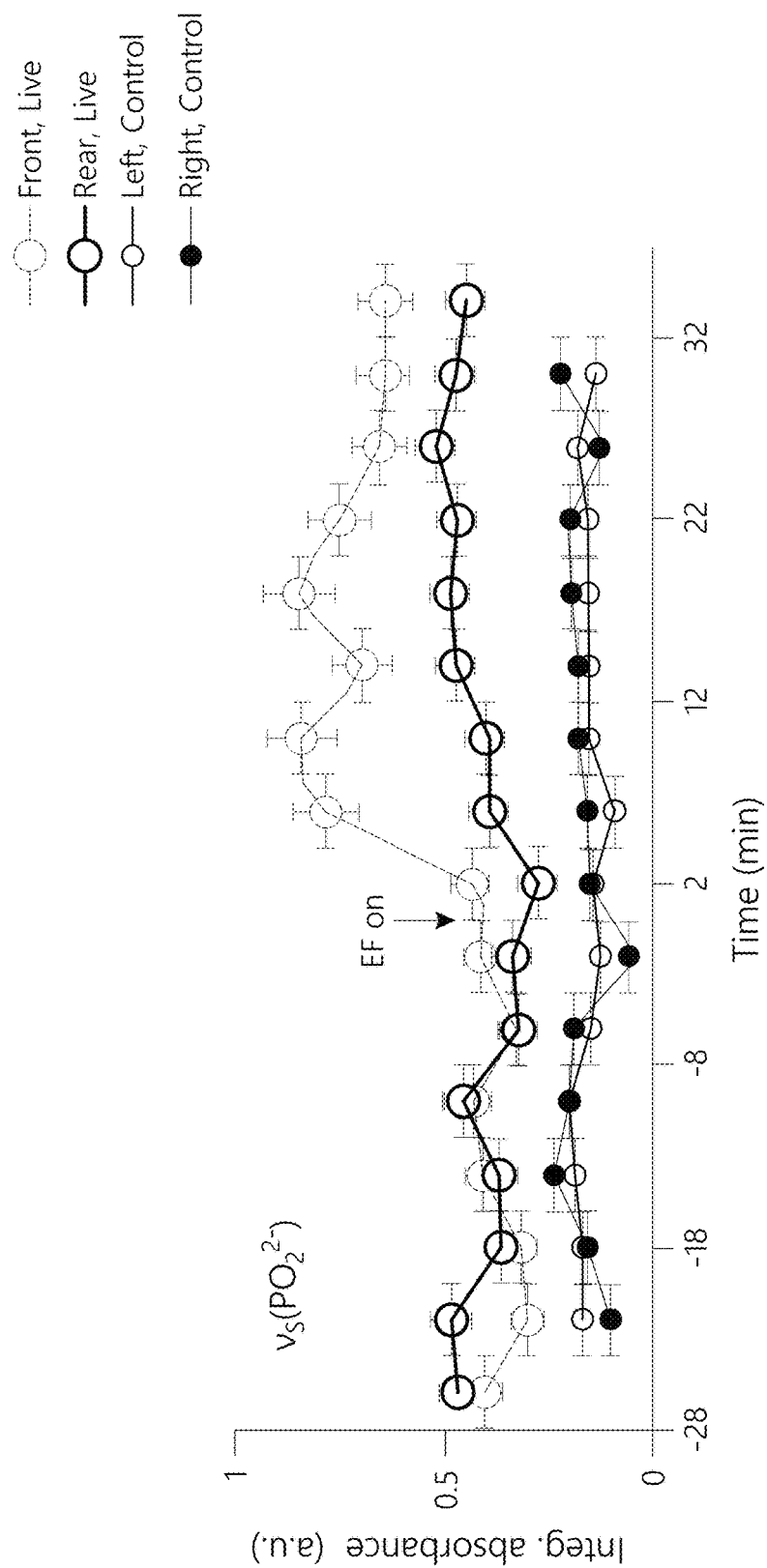

Taking advantage of the superior spatial resolution of synchrotron FTIR spectromicroscopy, the EF-induced protein phosphorylation at a sub-cellular level was examined. It was found that EF also promoted an asymmetric increase of phosphorylation of proteins in a cell (FIG. 26). A comparison of the 3-D time course of spectra at a protrusion point along the leading front close to the cathode (#1 in FIG. 26, panel (a)) versus the trailing rear close to the anode (#2 in FIG. 26, panel (a)) identified a much higher protein phosphorylation level at the frontal protrusion point than the rear. Of interest, the $\nu(PO_2^{2-})$ absorbance for all time points along the 10-μm wide leading front versus trailing edge was compared. The $\nu(PO_2^{2-})$ absorbance along the leading front was at least 45% higher than that along the trailing rear (FIG. 26, panel (b)). Dead cells did not show any of those changes.

Figure 27:
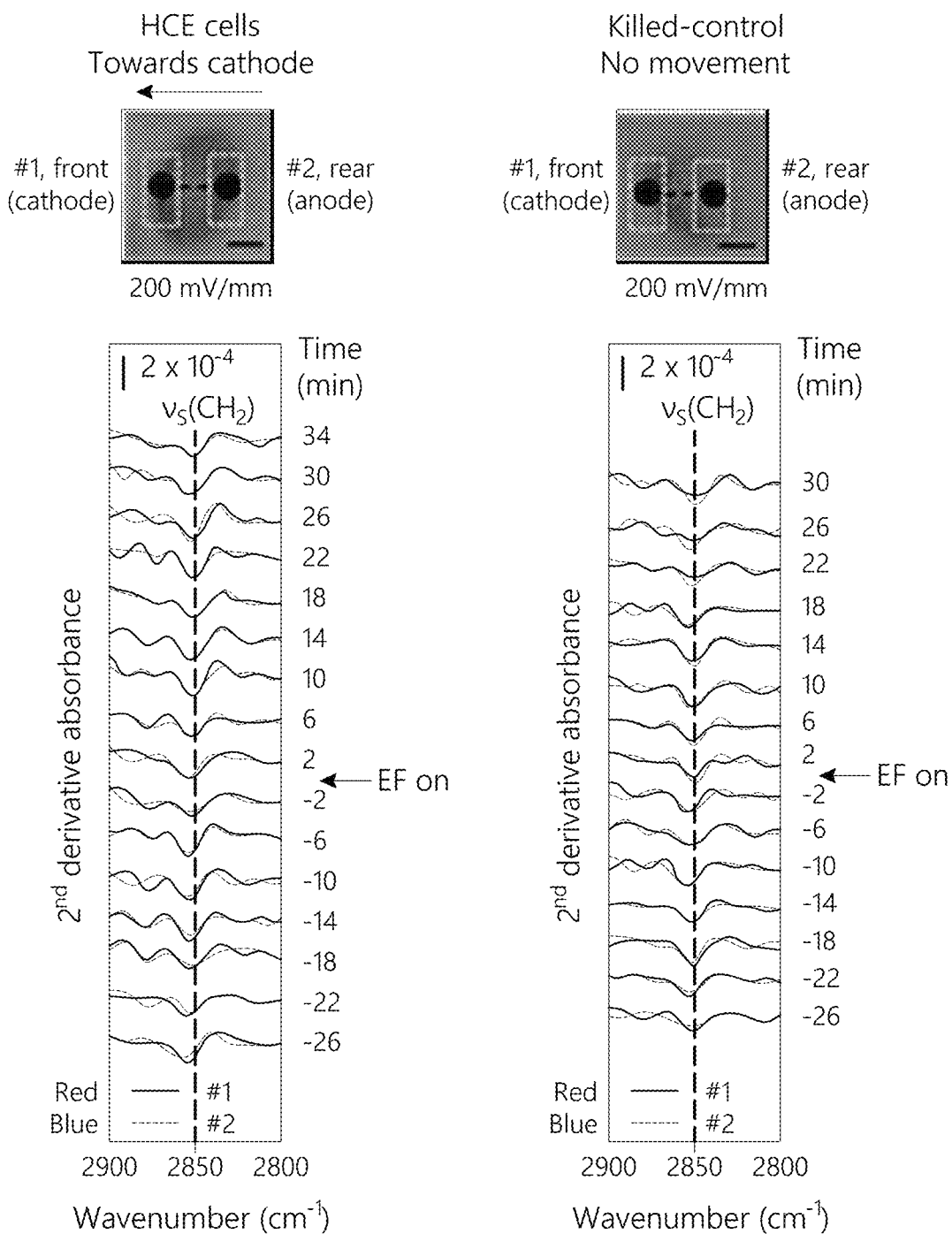
FIG. 27, panels (a) and (b), show SR-FTIR spectromicroscopy analysis of the spatiotemporal dynamics of membrane lipid phase transition of a single cathode-migrating cell (grey) during cell electrotaxis.
Figure 27:
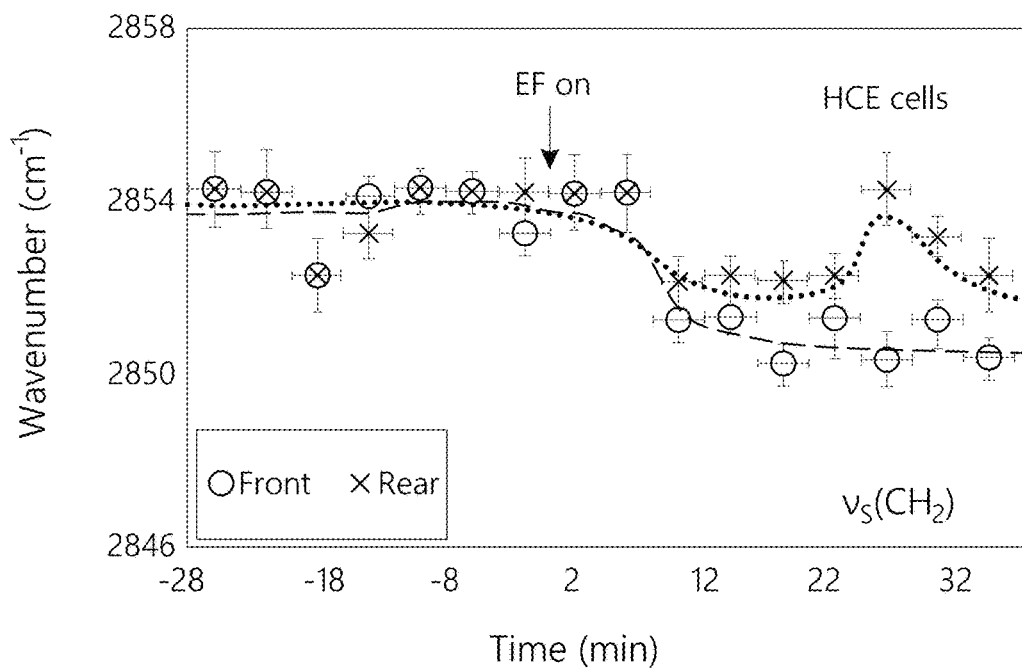
Figure 27:
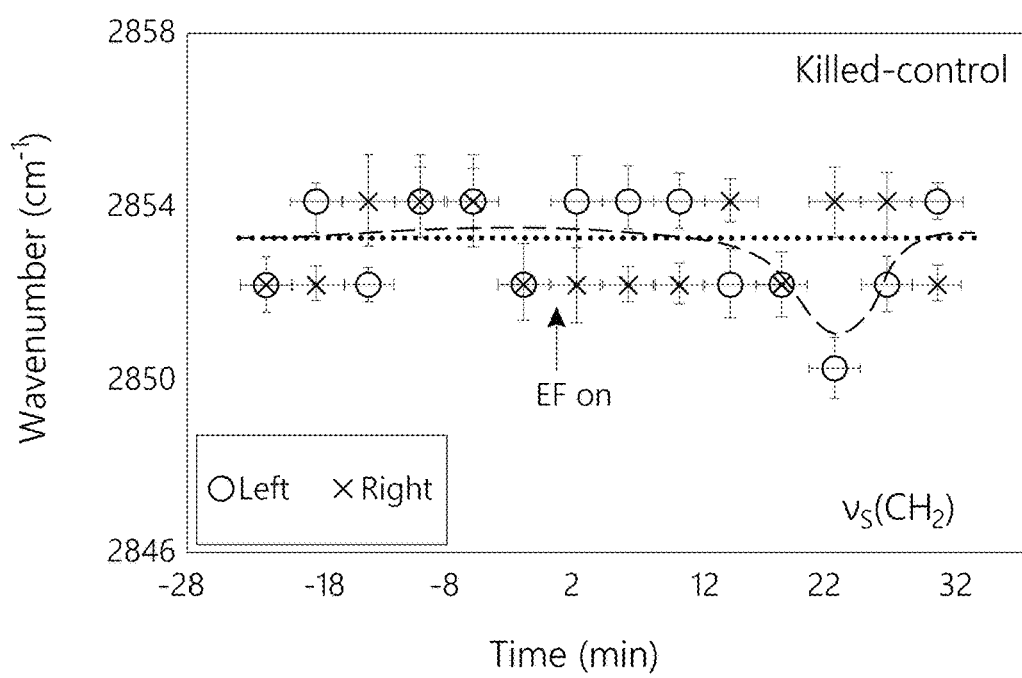

FIG. 27 show plots of EF-induced changes in the region dominated by signals from membrane lipids. An analysis of the $2^{nd}$ derivative spectra in the $\nu(CH_2)$ region (FIG. 27, panel (a)) indicated a red-shift of the $\nu_s(CH_2)$ frequency from 2854 $cm^{-1}$ to ~2851 $cm^{-1}$ with a lag time lag of ~4 to 8 minutes at the leading front (FIG. 27, panel (b)). This peak shift suggested a change of the membrane lipid bilayers to a more ordered gel-phase.

Altogether, these data indicate that a closed channel infrared transparent microfluidic device can be used for studying the chemistry and behavior of migrating cells in physiologically relevant electric fields.

Example 5

Globar and Synchrotron Infrared Spectromicroscopy Study of Spatiotemporal Chemical Changes in Living Colonies of PC12 Cells Using the Open-Channel Microfluidic Device and the SpecMetric Program After coating both sides of the membrane and the lower channel with collagen, the lower channel of the device was wet with CO2-independent media supplemented with 25 ng/mL NGF. PC12 cells are a neuronal development model cell line that differentiates into neuron-like cells when treated with NGF (Vaudry, D. et al., Science 2002, 296, 1648-1649). Previous studies of this system at isolated time points showed increasing protein phosphorylation associated with differentiation using FT-IR spectromicroscopy (Chen, L. et al., Anal. Chem. 2012, 84, 4118-4125). Approximately 20,000 cells were seeded onto the membrane in 20 μL of media. Cells were incubated at 37° C. for 2 h to attach to the membrane surface before excess media was aspirated from the upper chamber. The chamber was then sealed with a 0.3 mm thick CaF2 window pressed onto a rubber gasket to maintain a humid environment while allowing IR measurements. Continuous flow of media was maintained in the lower channel at a rate of 100 nL/min via syringe pump, and the device was mounted on a microscope stage heated to 36° C. Cells were observed with a 15× reflachromat objective heated to 38° C. to limit condensation on the window. Cell viability was tested using trypan blue vital staining after 3 days in a control experiment where cells were grown on a membrane device with identical experimental conditions in a 37° C. incubator. The staining indicated that the cells remained viable (data not shown). Continuous real-time measurements of live PC12 cells were performed using both globar and synchrotron-radiation infrared illumination at Beamline 1.4.3 of the Advanced Light Source at Lawrence Berkeley National Laboratory. Limited beamtime availability necessitated performing initial experiments using a globar source for 7 days followed by 4 days of beamtime with SIR illumination. In the first experiment, globar illumination was used to take 274 spectral maps of a colony of PC12 cells using a 4×4 grid with 100 μm step size and 30 min spacing for 1 week. In the second experiment, SIR illumination was used to take 76 spectral maps of a colony of PC12 cells using a 21×20 grid with 10 μm step size and 45 min spacing for 4.5 days. IR spectra were obtained using transflection measurement mode between 4000 and 800 $cm^{-1}$ at 4 $cm^{-1}$ spectral resolution and averaged with 16 coadded scans. Electric field standing wave effects (Filik, J. et al., Analyst 2012, 137, 853-861; Bassan, P. et al, Analyst 2013, 138, 144-157) are not expected to be significant because of variation in sample thickness, illumination coherence, and range of incidence angles from the 15× objective (Wrobel, T. P. et al., Vib. Spectrosc. 2013, 69, 84-92). After measurement, all spectra were baseline corrected without the need for bulk-water subtraction. Synchrotron mapping data were filtered by thresholding the amide II band (1580-1480 $cm^{-1}$) intensity at the mean value minus 1.0 standard deviation of all points to exclude blank pixels in each map.

Figure 5A:
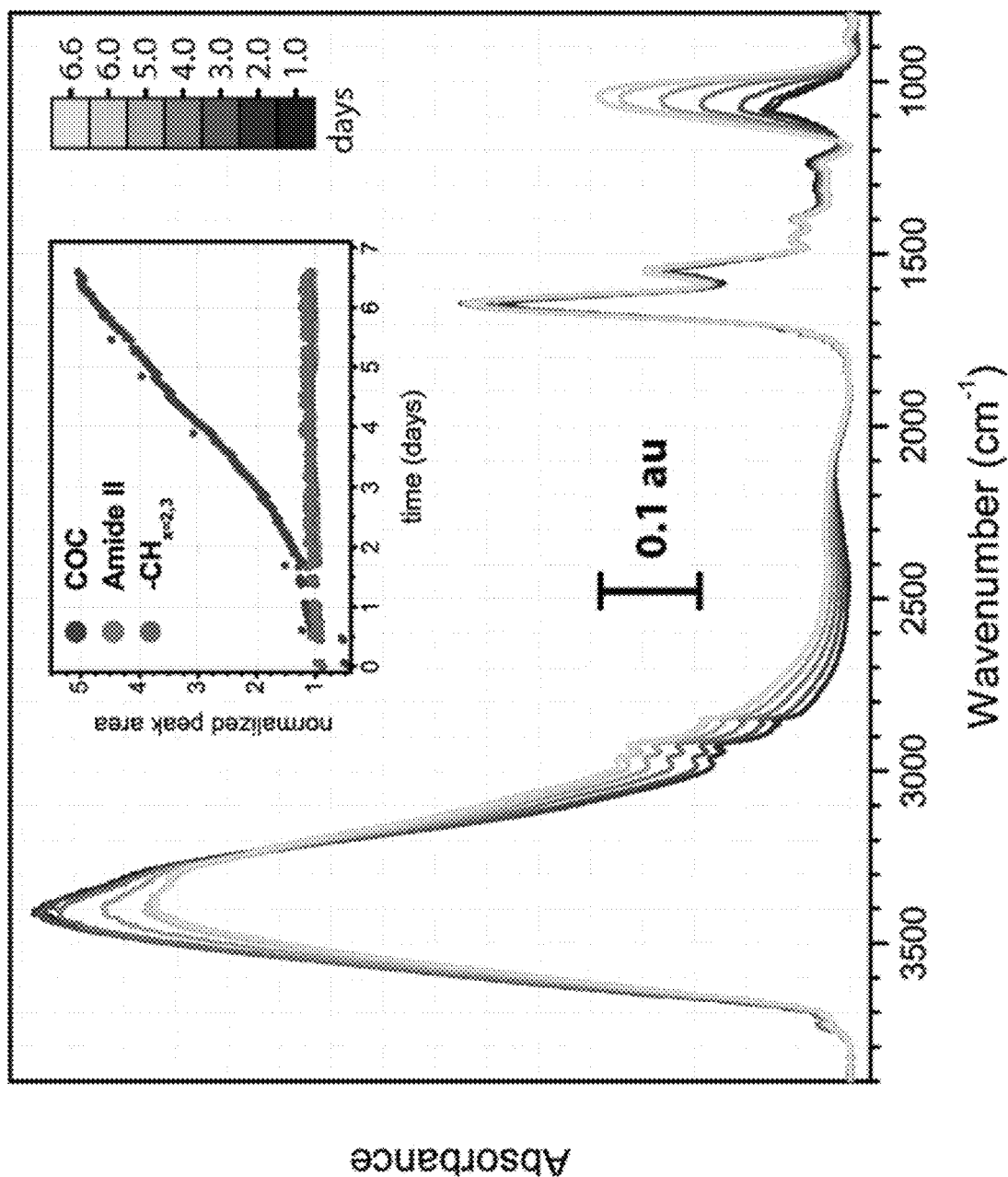
FIGS. 5A and 5B are graphs demonstrating multiday IR measurement of cells at the center and the edge of a colony of PC12 cells, respectively, using a globar IR source. Insets show the peak area of glycogen and glycoprotein, amide II, and —CH2, —CH3 bands normalized to t=0.
Figure 5B:
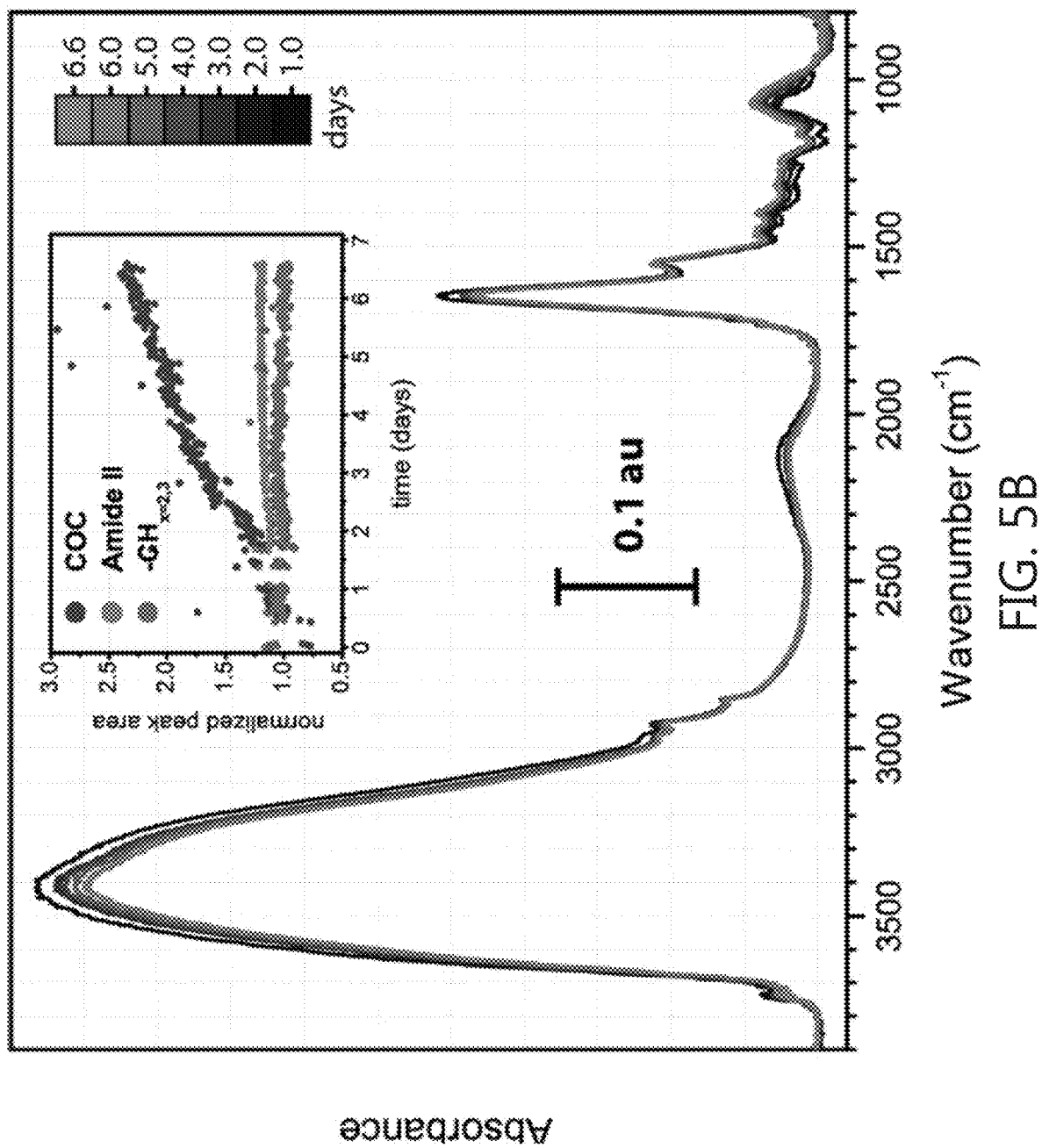

Using this device, spatiotemporal changes in chemical composition of a colony of PC12 cells over a period of 7 days were observed. The spectral progression is shown for two locations in the 4×4 globar map in FIG. 5 for the center (A) and edge (B) of the colony. The inset shows the peak area of the spectral regions between 1190 and 930 $cm^{-1}$ dominated by the vibrational modes of C—O—C, C—O—P, and C—O stretching of various glucose storage molecules called glycogen and glycoproteins; between 1580 and 1480 $cm^{-1}$ covering the protein amide II band; and between 3000 and 2800 $cm^{-1}$ covering the C—H vibrations of the —CH3 and >CH2 functional groups of fatty acid chains. The changes in spectral intensity with respect to time shown in FIG. 5 insets indicate that the cells remained metabolically active during the 7 day measurement window. The dominant spectral changes in the pixel associated with the center of the colony are a 5× increase in the 1190-930 $cm^{-1}$ region associated with C—O—C, C—O—P, and C—O stretching in glycogen and glycoprotein (Wang, T. D. et al., Proc. Natl. Acad. Sci. U.S.A. 2007, 104, 15864-15869) and a redshift in the —OH band (3600-3000 $cm^{-1}$) that corresponds to changing structure of cellular water (Cooke, R. and Kuntz, I. Annu. Rev. Biophys. Bioeng. 1974, 3, 95-126). The pixel at the edge of the colony has an increase in the glycogen and glycoprotein band intensity of about 2.5× over the measurement period. The spectral changes could resemble a response to evaporative stress from growing at an air-liquid interface in contrast to those of protein phosphorylation previously observed for differentiating cells. This interpretation is based on the lack of neurite outgrowth that is characteristic of PC12 differentiation upon treatment with NGF and that an additional pathway activated by treatment with NGF is the excretion of glycoproteins (McGuire, J. et al., Cell 1978, 15, 357-365), a constituent component of mucus that is known to provide protection against evaporative stress (Boat, T. and Cheng, P. W. Fed. Proc. 1980, 3067-3074).

Figure 8A:
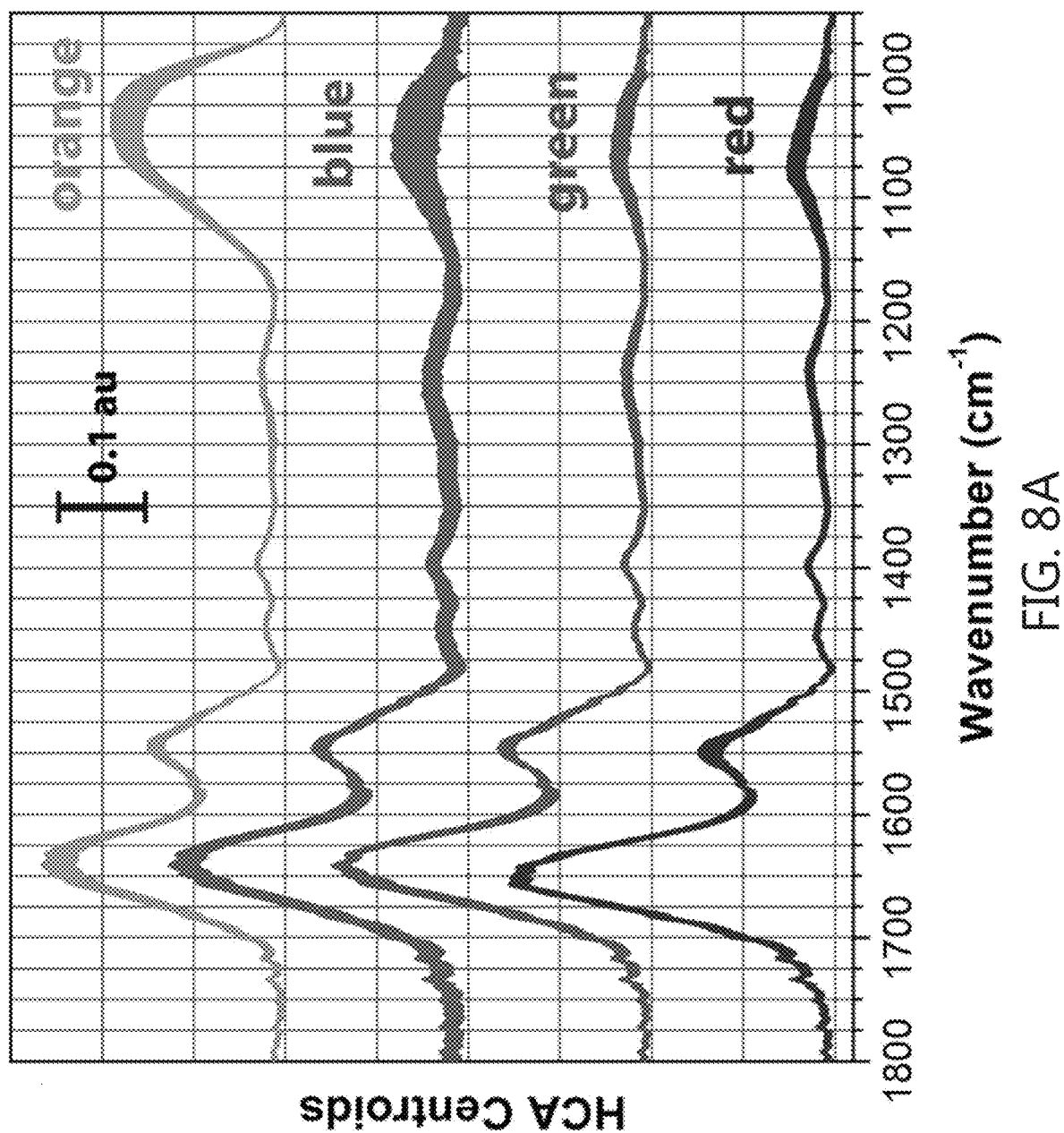
FIG. 8A is a graph demonstrating multiday synchrotron IR measurements of cells. Hierarchical cluster analysis (HCA) cluster centroids of the 1800-950 $cm^{-1}$ region for all spatial and time points categorized into four distinct groups are shown. The grouping (orange, blue, green, and red) was determined primarily by the intensity of glycogen peaks and the location of the amide I peak.
Figure 8B:
FIG. 8B is a collection of cluster maps for four time points between 2.0 and 4.5 days of a colony of PC12 cells with each pixel colored by the HCA cluster assignment.
Figure 8B:
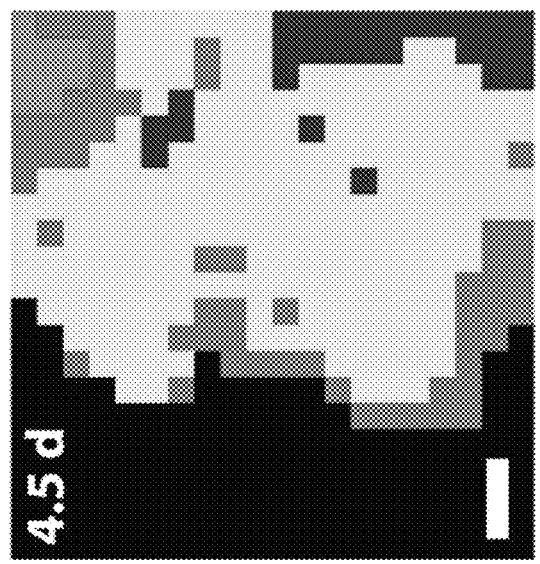
Figure 8B:
Figure 8B:
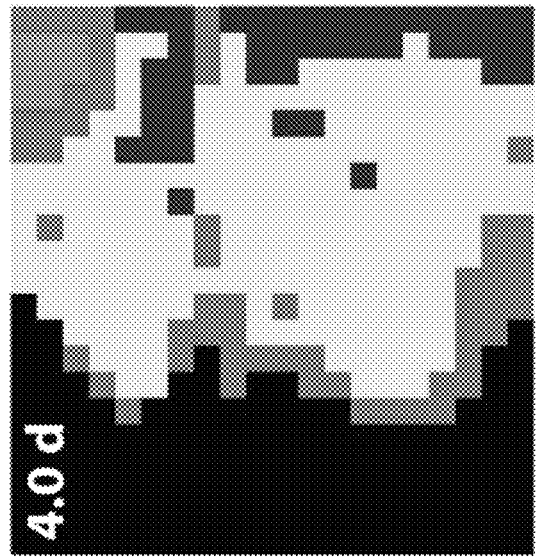
Figure 8B:
Figure 8B:
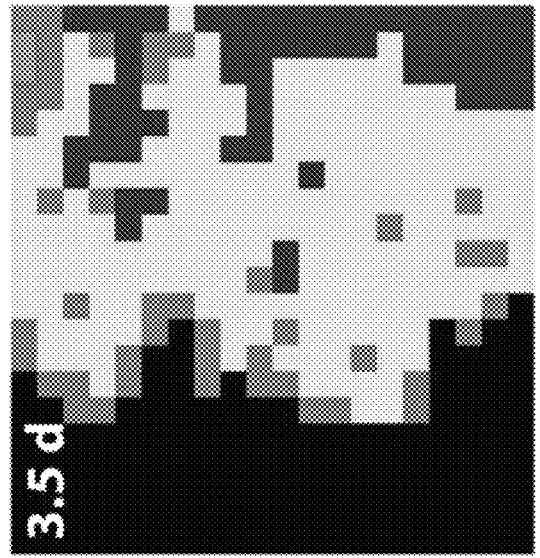

In a second experiment, a more in-depth understanding of the spatiotemporal dynamics of the system was gained using a high-resolution SIR source. Here, the same environmental conditions as above were used and the chemical dynamics of a colony of cells were monitored between 2.0 and 4.5 days after loading. A hierarchical cluster analysis (HCA) of the 1800-950 $cm^{-1}$ region for all spatial and time points was performed and the resultant four cluster centroids are shown in FIG. 8A along with cluster maps for six time points between 2.0 and 4.5 days in FIG. 8B. The maps show part of a colony of PC12 cells that continues out of the right of the frame with each pixel labeled with the HCA cluster assignment. The HCA cluster centroids are plotted with area filled between 1.0 standard deviation of the mean.

Figure 8C:
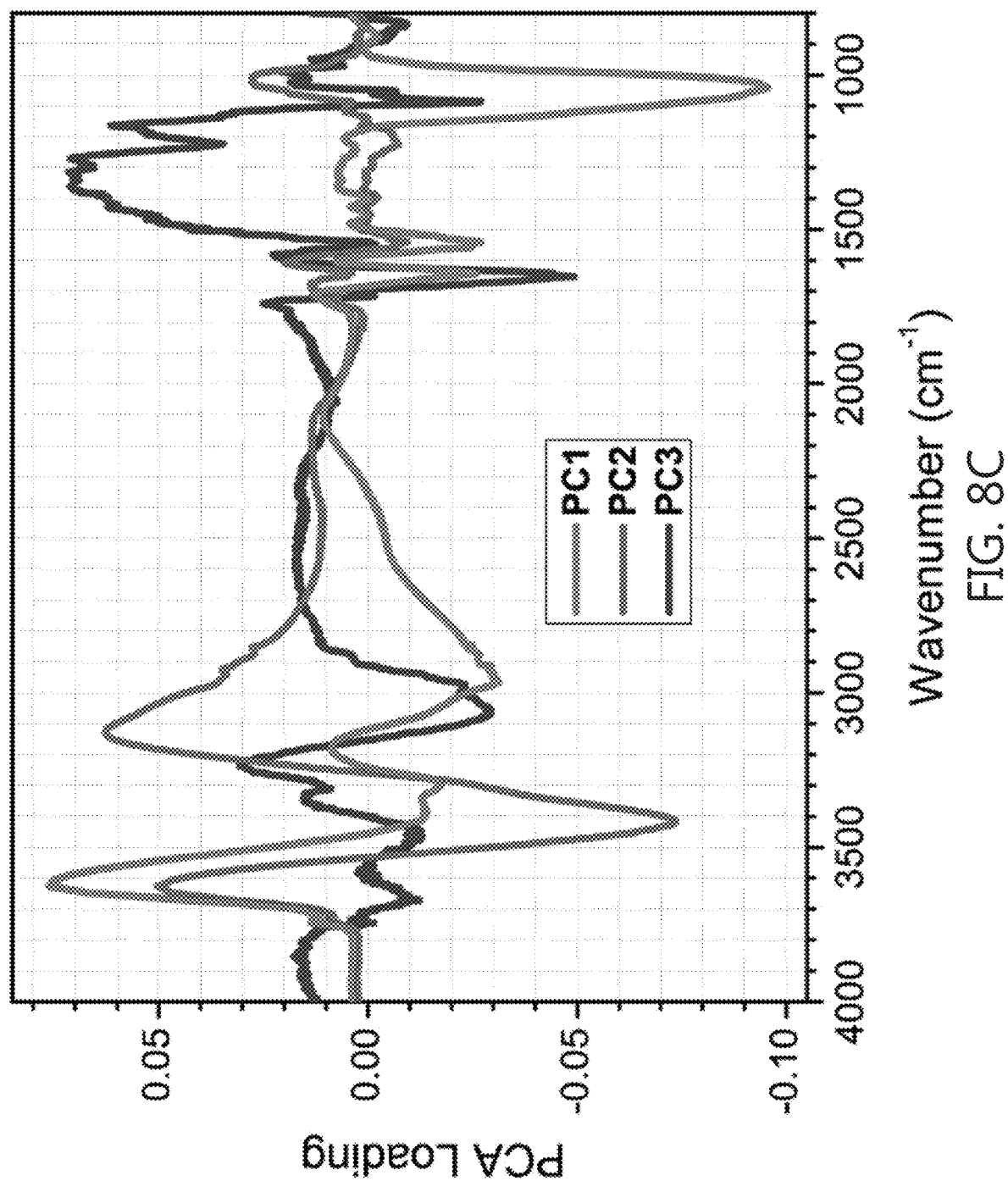
FIG. 8C shows PCA analysis of spectra of PC vectors.
Figure 8D:
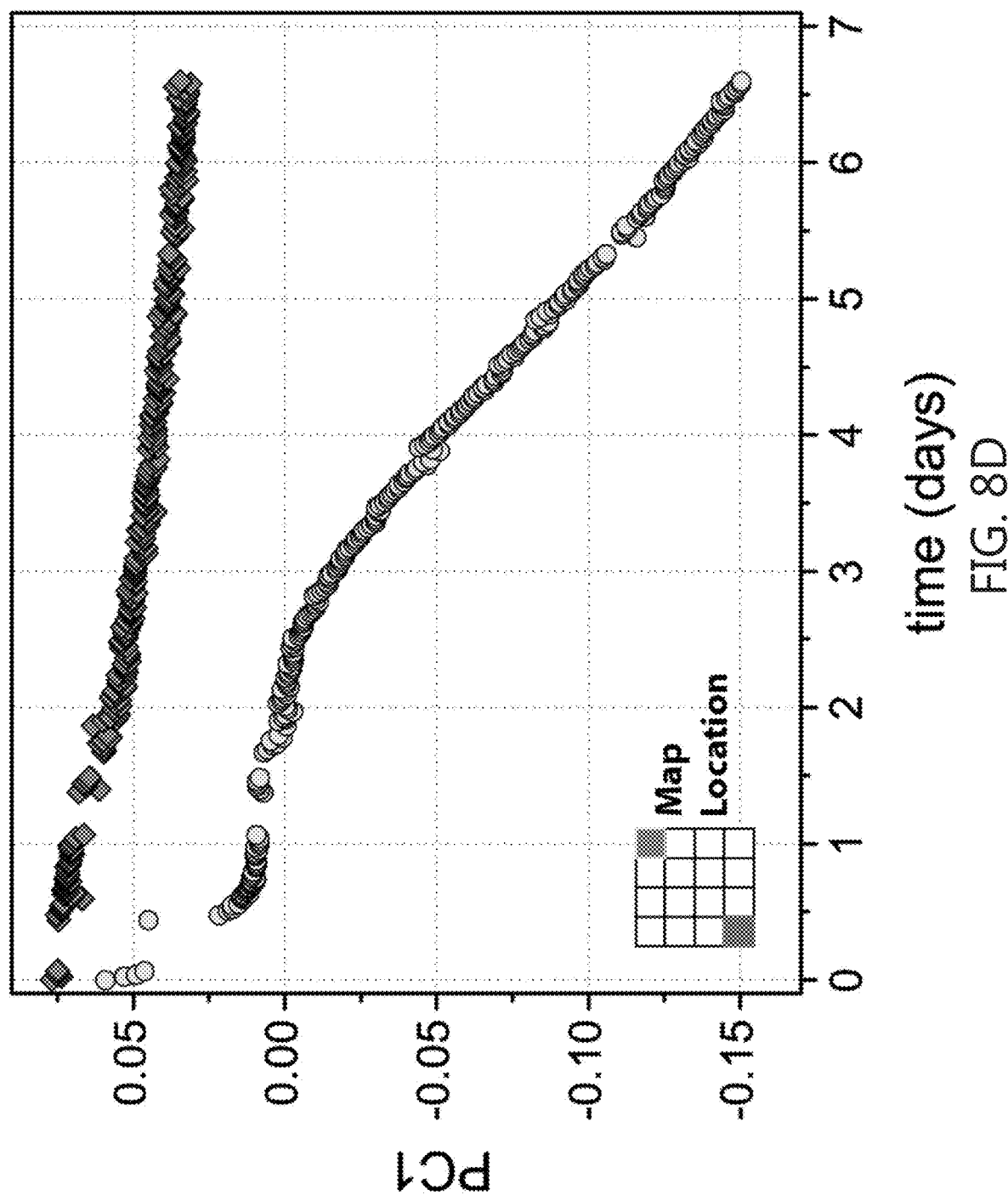
FIGS. 8D-8E are the graphs showing PC vector scores vs. time for center (green) and edge (red) of colony of PC12 cells.
Figure 8E:
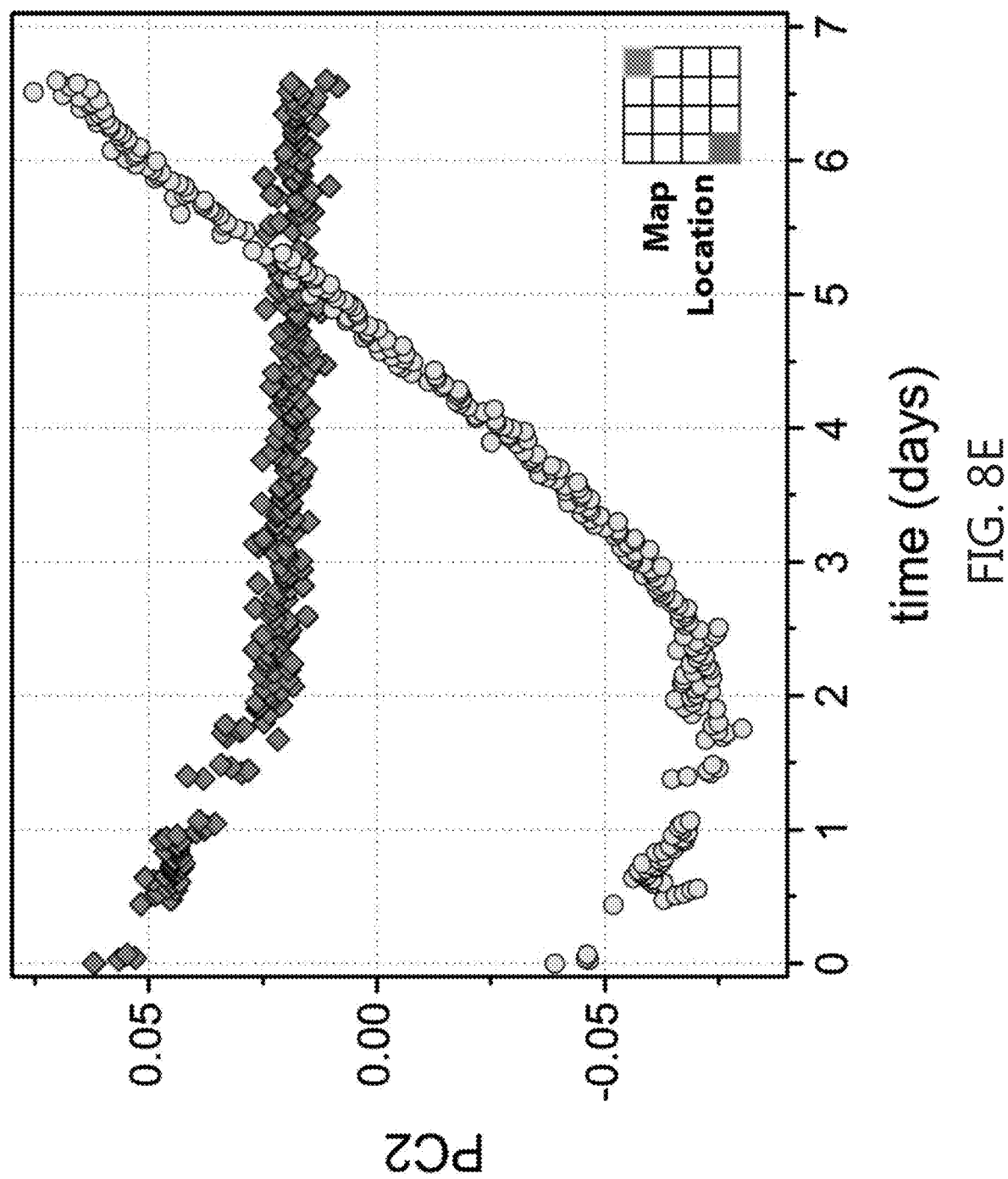

A principal component analysis (PCA) in FIGS. 8C, 8D and 8E shows the different evolution of cells in the center (green) and at the edge (red) of the colony. The dominant changes in the center of the colony are a strong accumulation (5× increase) in the 930-1190 $cm^{-1}$ region associated with COC bonds in carbohydrates and a redshift in —OH band (3600-3000 $cm^{-1}$) that corresponds to changing structure in cellular water. The edge of the colony shows less dramatic change, but has an increase in the COC band of about 2.5× over the measurement window. The spectral changes observed do not match with those of protein phosphorylation previously observed for differentiating cells; they are possibly a response to evaporative stress from growing at an air-liquid interface. An additional pathway activated by treatment with NGF is the excretion of glycoproteins, a constituent component of mucus that may provide protection against evaporative stress from the air-liquid interface.

The HCA spectral clusters are distinguished primarily by the intensity of the glycogen peak and the location of the amide I peak, which is particularly sensitive to protein secondary structure. The red cluster has an amide I peak location centered around 1653 $cm^{-1}$ and lower glycogen and can be found primarily in the center of the colony with patches near the colony edge that recede with time. Trypan blue vital staining indicates that cells away from the colony edges remain viable (FIGS. 8D and 8E). The majority of the pixels are assigned to the green cluster, which has a low amount of glycogen and amide I peak shifted to 1641 $cm^{-1}$, indicating increased prevalence of beta-sheet configuration of protein (Barth, A. and Zscherp, C. Q. Rev. Biophys. 2002, 35, 369-430). While the green cluster is interspersed with blue and red clusters in the earlier time points, it occupies most of the intermediate area between the edge and center of the colony by the fourth day.

While the globar data may suggest that the glycogen intensity increases are localized primarily in the center of a colony, the higher resolution available using the synchrotron source (100 μm vs 10 μm pixel size) shows that the high-glycogen intensity areas are localized in two distinct areas: at the edges of the colony (blue group) and a small region in the center of the colony (orange group). The blue cluster is characterized by stronger glycogen intensity and amide I peak at 1641 $cm^{-1}$. The blue cluster is initially distributed throughout the map but is primarily concentrated at the edge of the colony as time progresses. This distribution supports the interpretation that increase of glycogen and glycoprotein is associated with the higher surface stress at the colony edges. The orange cluster is characterized by a broad glycogen peak at 1038 $cm^{-1}$ and amide I peak at 1641 $cm^{-1}$. This group is very similar to what is observed in the globar experiment where there is strong glycogen production away from the colony edge. The physiological interpretation for this is uncertain, but this region continues to produce high amounts of glycogen and glycoprotein and increases in size throughout the experiment. In both cases, higher glycogen and glycoprotein production is associated with colony boundaries and a localized region in the center of the colony and that the spatial distribution of clusters while initially dispersive becomes more partitioned with time.

Figure 9:
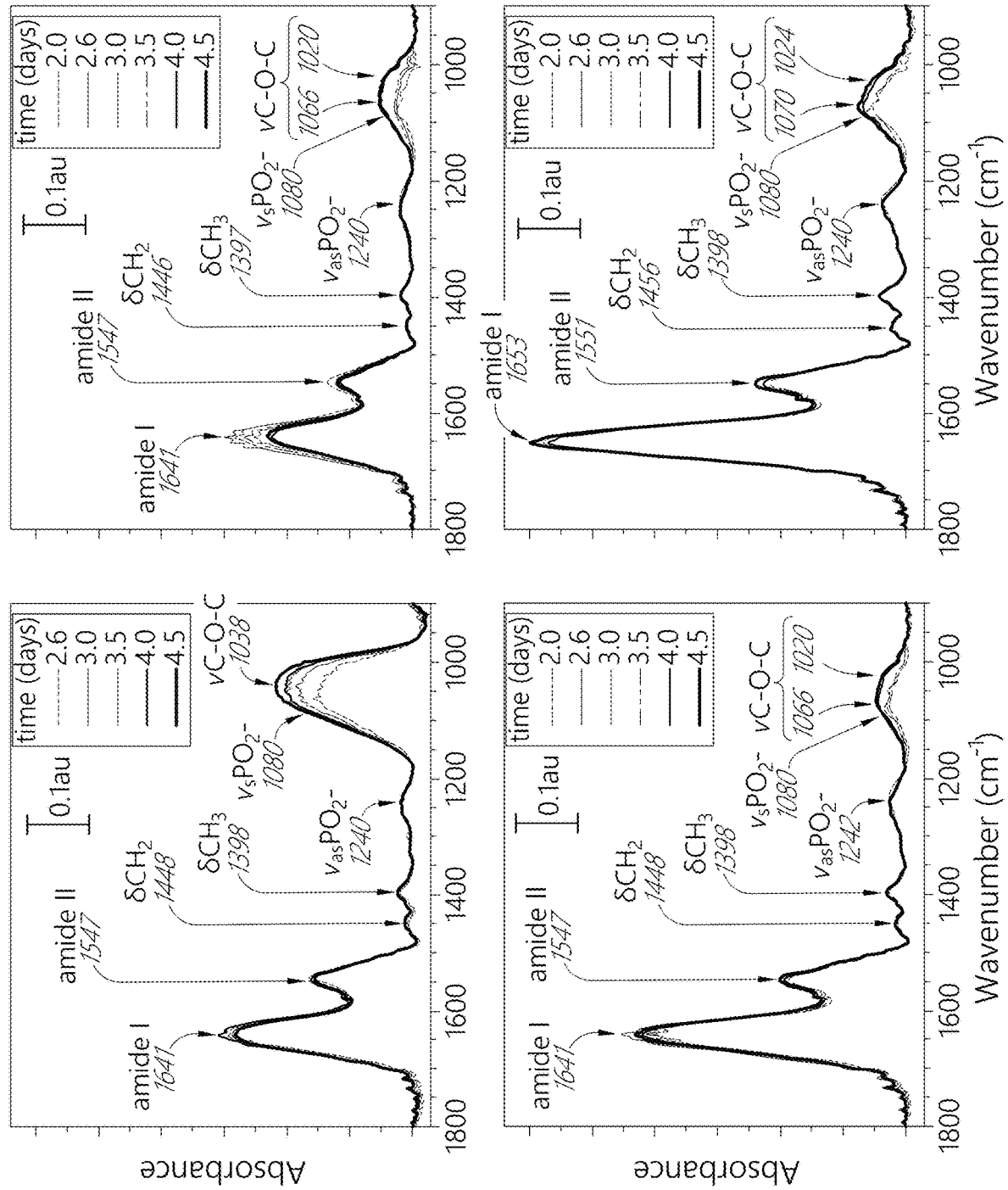
FIG. 9 contains graphs showing the mean spectra of HCA clusters at various time points.

FIG. 9 contains graphs showing the mean spectra of HCA clusters at various time points. Each panel shows mean spectra of all spectral points within each cluster with color assignment from FIG. 3 for the mapped time points in FIG. 3 with functional groups and peak locations labeled. Vertical scale is in absorbance units (au). All peak locations were determined using 2nd derivative spectra.

Figure 10A:
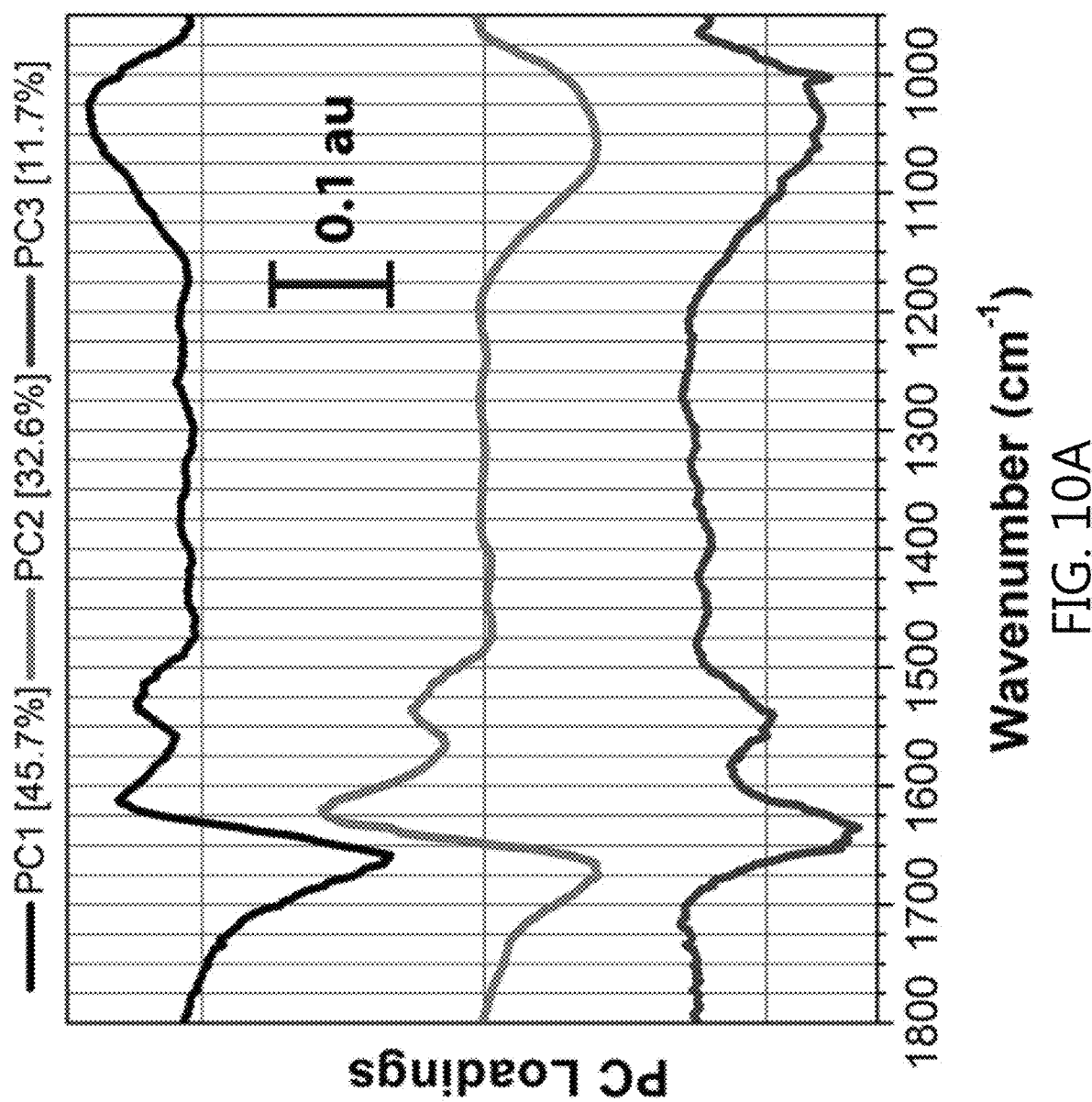

To examine the spatiotemporal chemical evolution of the colony, a principal component analysis of all pixels over time was performed. All spatial and temporal spectra were pooled and a principal component analysis was performed in the region of 1800-950 $cm^{-1}$. The principal component vector loadings in FIG. 10A indicate the major bands with correlational changes among those bands that contribute to differentiate the spectra in the four HCA clusters (FIG. 8A). Ten principal components were needed to account for 97% of the spectral variation across all spatiotemporal data points while the first three principal components account for 90% of the variation. The main features of PC1, which explains 45.7% of the total variance are a glycogen peak in the 900-1200 $cm^{-1}$ region with maximum at 1025 $cm^{-1}$, a protein (amide II) peak with maximum at 1540 $cm^{-1}$, and a zero-crossing at 1625 cm-1 in the amide I region which is interpreted as redshift toward more β-sheet protein structure. PC2 contains a similar structure but has a glycogen peak centered at 1060 $cm^{-1}$ that is anti-correlated with a redshift in the amide I region with a zero crossing at 1650 $cm^{-1}$. PC3 contains a glycogen peak with a maximum at 1030 cm-1 correlated with an amide I peak with a maximum at 1630 $cm^{-1}$.

Figure 10C:
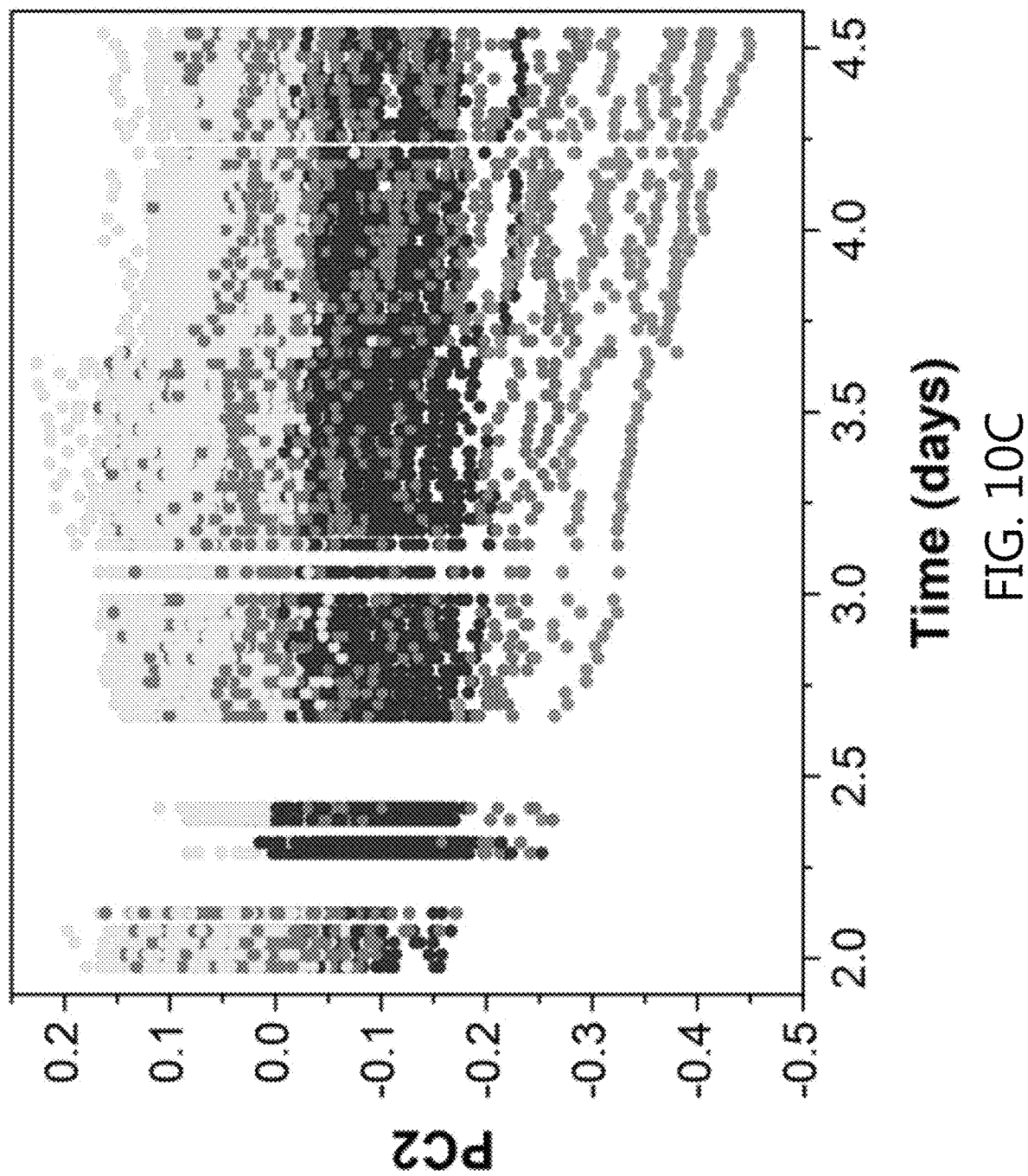

Chemical changes in the colony can be visualized by the temporal shifts in the mean and spread of the principal component scores between and within each HCA cluster. Clusters were distinguished by intensity of carbohydrate peak and intensity/location of amide I peak (water/protein conformation). Red centroid—amide I peak at 1650 cm-1, more water, less carbohydrates and can be found in the center of the colony with patches that recede with time. Green centroid—amide I peak at 1640 $cm^{-1}$ (β-sheet), more water, less carbohydrates and occupies most space near the colony edge. Blue centroid—amide I peak at 1640 cm-1, less water, more carbohydrates and can be found at the colony edge (highest surface stress). Orange centroid—amide I peak at 1640 cm-1, least water, most carbohydrates—small cluster increasing in size with time The principal component scores of each pixel for each time point are shown in FIGS. 10B-D with color assignment consistent with HCA clusters in FIG. 8A. The plot indicates a tendency of increasing PC1 scores across all groups, with the orange cluster (strong glycogen) having the highest score followed by the blue cluster (medium glycogen), green cluster (weak glycogen), and red cluster (cells in the center of the colony). This ordering (excluding the orange cluster) follows the spatial ordering from the edge to interior of the colony in the map and probably reflects the primary features of glycogen and glycoprotein production. The orange cluster shows increasing PC1 scores and decreasing PC2 scores that correspond to increasing glycogen intensity with time. The green and red clusters did not show much change except for a slight increase in PC1, which can be interpreted as glycogen and glycoprotein secretion. The behavior of the blue cluster is the most varied. While showing high and increasing PC1 scores, it had a large spread and slight decrease in PC2 scores, which has a similar loading to PC1 except the opposing sign of coefficients in the glycogen region. The lower group of the bimodal distribution in blue cluster in PC3 score vs time is likely due to assignment of pixels near the boundary of the high glycogen region (orange cluster) as medium glycogen (blue cluster). However, the overall trend is decreasing scores with time, with a large variance in the upper group diminishing after 3.5 days. The HCA group assignment can change for the same pixel in different time points, so it may be the case that the decrease in variance indicates reclassification of pixels from the blue cluster (medium glycogen) to the green cluster (low glycogen group), which is also indicated in HCA cluster maps. The synchrotron mapping data is invaluable in allowing us to differentiate the responses at a functional group level of different regions of the colony to the experimental conditions. These results tend to indicate that the cells respond to the liquid-air interface in the device by secreting glycogen and glycoprotein and that the distribution is concentrated at a localized region in the center of the colony and the edges of the colony where the evaporative stresses are highest.

This work demonstrates continuous FT-IR spectromicroscopy measurements of live adherent mammalian cells for up to 1 week with an open channel microfluidic device. This device allows long-term continuous high-resolution IR chemical imaging of live adherent mammalian cells. On the basis of a gold-coated porous plastic membrane, this device was used to spectroscopically measure living colonies of PC12 cells for several days using globar and synchrotron-based IR illumination. Increased signal intensity of glycogen was observed. This may be associated with secretion of glycoprotein to help cells hold moisture while growing at an air-liquid interface. Applying a combination of HCA and principal component analysis to the SIR mapping data, it was determined that the distribution of high glycogen and glycoprotein content regions is varied and biased toward the edges of the cell colonies where surface stresses are greatest and a localized region in the center of the colony. Furthermore, the spatial distribution of chemically similar clusters at a functional group level becomes more localized with time. The induction of a protective response rather than differentiation in PC12 cells suggest that future applications with this device are best suited toward cell lines that typically grow at an air-to-liquid interface such as epithelial cell lines derived from lung, skin, or eyes.

This work shows FTIR spectromicroscopy measurement of live adherent mammalian cells for several days. Using an open channel microfluidic device that allows long-term continuous high resolution IR chemical imaging of live adherent mammalian cells, increased production of carbohydrates in PC12 colonies was observed while growing at an air-liquid interface that is biased towards the edges of the cell colonies where surface stresses are greatest. Future applications will focus on cells that grow at an air-to-liquid interface (e.g., epithelial cells from lung, skin, eyes).

Example 6

SpecMetric for Performing Analysis of FTIR Spectra

Figure 7B:
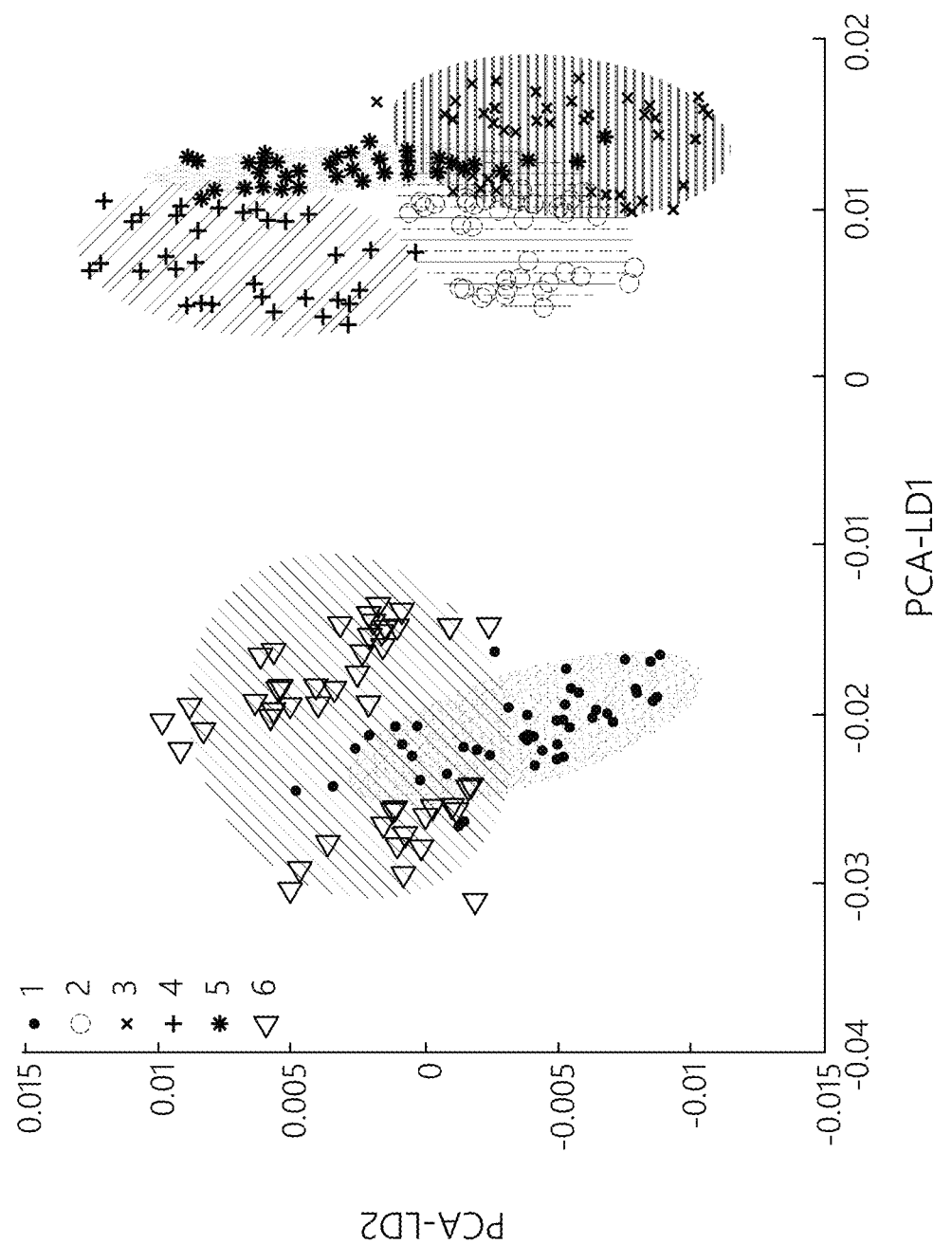
FIG. 7B is a sample output showing a graph of the PCA-LDA score plots.

The SpecMetric program was used to analyze a set of FTIR spectra obtained from a cell sample. 45 spectra are collected from the six types of sample. Spectra data were collected from 600 $cm^{-1}$ to 4000 $cm^{-1}$. For PCA-LDA analysis, the spectral data between 800 $cm^{-1}$ and 1200 $cm^{-1}$ is used and vector normalized. 5 PCA components of each sample spectrum were used for LDA. A sample PCA-LDA score plot is shown in FIG. 7B. The spectral score from Samples 1 and 6, for example, were clearly separated from the other 4 groups of samples.

A cross section of the organism tissue can be structurally and chemically heterogeneous. Therefore, a characteristic band may shift a few wavenumbers away from the "normal" position in spectra from different parts of the organism. To take this complexity into consideration, the SpecMetric program was used to automatically detect "band drifts" in a FTIR map of an organism cross. Indeed, the program can detect 5 different peak positions at a specific wavenumber. In addition, the geometrical distribution and the number of each peak position are also calculated by the program.

Example 7

SpecMetric for Performing Trajectory Pattern Analysis to Mine the Collective Temporal Behavior of Cellular Chemistry and Chemical Abnormalities To examine the temporal chemical evolution of a population of cells, trajectory pattern analysis was performed using the following procedures:

(1) Use the SpecMetric program to perform the PCA on all spectra to calculate the loading vectors of principal components.

(2) Calculate the scores for each spectrum using the loading vectors obtained in step (1).

(3) Data from step (2) are used to generate 2D or 3D score plots for spectra from each time point.

(4) A 2D confidence-ellipse (or 3D confidence-ellipsoid) is generated for the corresponding scatter plot of scores for each time point. The typical value of confidence level of the ellipsoid ranges from 90%-99%.

(5) The center of mass and the area of 2D confidence-ellipse (or the volume of the confidence-ellipsoid) from step (4) are calculated.

(6) The centroids of all 2D confidence-ellipse (or 3D confidence-ellipsoids) are linked to form a trajectory in 2D or 3D PC spaces. This trajectory describes the direction and speed of the temporal changes of collective behavior of cellular chemistry in 2D or 3D PC spaces.

(7) All the volume of the confidence-ellipsoid shows the temporal changes of the scatterness of the collective behavior of cellular chemistry in 2D or 3D PC spaces.

(8) The information regarding the cellular chemistry and chemical abnormalities are extracted from the loading vectors of principal components.

Figure 11:
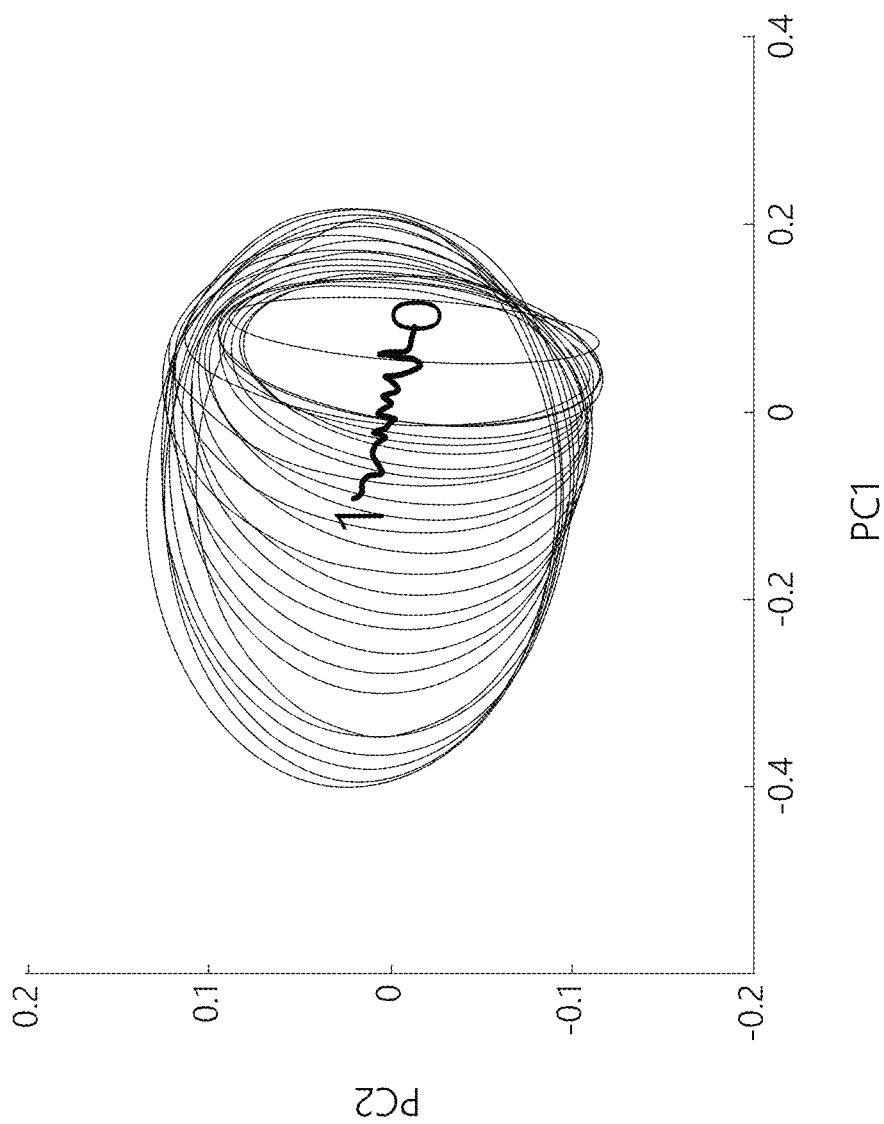
FIG. 11 summarizes the trajectory pattern analysis of the time evolution of the collective behavior of cellular chemistry in PC spaces.

An example plot of trajectory pattern analysis is shown in FIG. 11.

The above examples are provided to illustrate the invention but not to limit its scope. Other variants of the invention will be readily apparent to one of ordinary skill in the art and are encompassed by the appended claims. All publications, databases, and patents cited herein are hereby incorporated by reference for all purposes.

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for infrared chemical mapping, comprising:
   receiving Fourier Transform Infrared Spectroscopy (FTIR) data comprising FTIR spectra of samples collected over a time duration;
   correcting scattering effects in the FTIR data; and
   evaluating the FTIR spectra by performing an univariate analysis of the FTIR spectra or performing a multivariate analysis, comprising an unsupervised classification or a supervised classification, of the FTIR spectra,
   wherein performing the univariate analysis comprises:
      displaying a map of intensity distributions of the FTIR spectra at a single wavelength;
      performing peak integration of the FTIR spectra; or
      determining peak ratios of the FTIR spectra.

2. The method of claim 1, wherein correcting the scattering effects in the FTIR data comprises:
   subtracting a multipoint piecewise linear baseline with anchoring points at minima from the FTIR spectra, wherein the minima are located around 800, 1800, 2450, 3800 or 4000 $cm^{-1}$;
   searching and adjusting new anchoring points for one of the FTIR spectra; or
   normalizing the FTIR spectra to an amide II band located around 1550 $cm^{-1}$ based on molecular weights of the samples comprising:
      receiving a user-set threshold of a strength of the amide II band; and
      normalizing the FTIR spectra to the amide II band located around 1550 $cm^{-1}$ based on the molecular weights of the samples using the user-set threshold for the strength of the amide II band and a range of the amide II band over an amide I band ratios, wherein the amide I band is located around 1650 $cm^{-1}$.

3. A system for infrared chemical mapping, comprising:
   (a) non-transitory computer storage configured to store evaluation records for objects; and
   (b) a hardware processor in communication with the non-transitory computer storage, the hardware processor programmed to:
      receive Fourier Transform Infrared Spectroscopy (FTIR) data comprising FTIR spectra of samples collected over a time duration;
      correct scattering effects in the FTIR data;
      evaluate the FTIR spectra by performing an univariate analysis of the FTIR spectra or performing a multivariate analysis, comprising an unsupervised classification or a supervised classification, of the FTIR spectra, wherein to perform the unsupervised classification of the FTIR spectra, the processor is programmed to:
perform a trajectory pattern analysis (TPA) of the FTIR spectra; or
perform a hierarchical cluster analysis (HCA) of the FTIR spectra.

4. The system of claim 3, wherein to receive the FTIR data, the processor is programmed to obtain the FTIR data using a microfluidic system, wherein the microfluidic system comprises:
(c) a platform comprising:
(i) a polymer membrane;
(ii) two polymer pieces comprising at least one fluid channel;
(iii) at least one inlet in fluid communication with the aqueous layer; and
(iv) at least one outlet in fluid communication with the aqueous layer,
wherein the platform is coupled with an electric cell-substrate impedance sensing (ECIS) electrode, and
wherein the platform is coupled with electronics for generating physiologically relevant electric fields; and
(d) an aqueous layer in fluid contact with the polymer membrane wherein the aqueous layer comprises a fluid that flows beneath the polymer membrane, from the at least one inlet to the at least one outlet.

5. The system of claim 3, wherein to perform the multivariate analysis of the FTIR spectra, the processor is programmed to:
pool a plurality of wavenumbers of interest of the FTIR spectra into a data matrix;
determine a covariance matrix of the data matrix;
determine eigenvectors and corresponding eigenvalues of the covariance matrix using matrix eigenvalue decomposition;
sort the eigenvectors in descending order based on the corresponding eigenvalues;
assign an eigenvector of the eigenvectors with a highest eigenvalue of the corresponding eigenvalues to be a first principal component;
generate a loading plot of the first principal component;
assigning an eigenvector of the eigenvectors with a second highest eigenvalue of the corresponding eigenvalues to be a second principal component;
generate a loading plot of the second principal component; and
generate PCA score plot comprising a scatter plot using the coefficients of the first principal component and the coefficients of the second principal component.

6. The system of claim 5, wherein to generate the loading plot of the first principal component, the processor is programmed to:
determine a curve connecting points of the first principal component in a first x-y coordinate system, wherein the x coordinate of the first x-y coordinate system corresponds to the wavenumbers of interest, and wherein the y coordinate of the first x-y coordinate system corresponds to coefficients of the first principal component; or
determine a curve connecting points of the second principal component in a second x-y coordinate system, wherein the x coordinate of the second x-y coordinate system corresponds to the wavenumbers of interest, and wherein the y coordinate of the second x-y coordinate system corresponds to coefficients of the second principal component.

7. The system of claim 3, wherein to perform the trajectory pattern analysis of the FTIR spectra, the processor is programmed to:
perform a principal component analysis (PCA) of the FTIR spectra to determine loading vectors of principal components of the FTIR spectra;
determine scores of the FTIR spectra using the loading vectors;
generate score plots for the FTIR spectra for time points of the time duration;
generate 2D confidence-ellipses from the score plots using a predetermined confidence threshold;
determine centers of mass of the 2D confidence-ellipses; and
connect the centers of mass of the 2D confidence-ellipses to determine a trajectory pattern.

8. The system of claim 3, wherein to perform the hierarchical cluster analysis of the FTIR spectra, the processor is programmed to:
receive a distance measure of the FTIR spectra of the samples;
receive a linkage system of clusters; and
link clusters of spectra based on the distance measure and the linkage system to generate a dendrogram comprising a hierarchical tree of the samples.

9. The system of claim 8,
wherein the distance measure of the FTIR spectra comprises an Euclidean distance, a cosine distance, a Pearson correlation distance, or a combination thereof,
wherein the linkage system comprises a nearest neighbor linkage system, a centroid linkage system, a minimum variance linkage system, or a combination thereof, or
wherein the centroid of a cluster of the dendrogram comprises a mean spectrum of spectra of the cluster, and wherein a standard deviation spectrum of the cluster of the dendrogram comprises standard deviation spectra of the cluster.

10. The system of claim 3, wherein to perform the supervised classification of the FTIR spectra, the processor is programmed to:
perform a linear discriminant analysis (LDA) of the FTIR spectra.

11. The system of claim 10, wherein to perform the linear discriminant analysis of the FTIR spectra, the processor is programmed to:
perform a principal component analysis (PCA) of the FTIR spectra of the samples to determine principal components;
receive a number of scores from the principal component analysis of the FTIR spectra of the samples;
determine a between-class covariance matrix;
determine a within-class covariance matrix;
determine eigenvectors and corresponding eigenvalues of a matrix comprising the between-class covariance matrix and the within-class covariance matrix;
sort the eigenvectors in descending order based on the corresponding eigenvalues;
assign eigenvectors to be loading vectors based on the corresponding eigenvalues;
determine cluster vectors comprising multiplying the principal components with coefficients of the loading vectors;
generate loading plots of the cluster vectors, wherein a loading plot comprises a curve connecting points of the cluster vector in a x-y coordinate system, wherein the x coordinate of the x-y coordinate system corresponds to wavenumbers of interest, and wherein the y coordinate of the x-y coordinate system corresponds to coefficients of the cluster vector; and generate score plots of the linear discriminant analysis using projection coefficients of the loading plots onto the cluster vectors.

12. A microfluidic system comprising:
(a) a platform comprising:
  a polymer membrane comprising a coating;
  (ii) two polymer pieces, comprising at least one fluid channel in fluid communication with at least one fluid inlet and at least one fluid outlet, and a cell chamber, wherein the polymer membrane is between the two polymer pieces; and
(b) an aqueous layer in fluid contact with the polymer membrane, wherein the aqueous layer comprises a fluid that flows beneath the polymer membrane from the inlet to the outlet.

13. The system of claim 12, wherein the coating comprises a material selected from the group consisting of titanium, gold, platinum, silver, cooper, or tungsten metal, or any alloy thereof.

14. The system of claim 12, wherein a continuous flow of fluid is maintained through the fluid channel.

15. The system of claim 14, wherein the continuous flow of fluid is maintained via syringe pump at a rate of 50-1000 nl/min.

16. A method for continuous IR imaging of live cells using the system of claim 12,
  wherein the two polymer pieces comprise an upper piece and a lower piece,
  wherein the upper piece comprises at least one channel that forms the cell chamber when sealed against the polymer membrane, and
  wherein cells are plated onto the polymer membrane of the cell chamber and incubated to allow cells to attach to the polymer membrane.

17. The method of claim 16, wherein living cells are continuously imaged with an IR light source for at least 12-168 hours.

18. The method of claim 17 wherein the IR light source is a globar or a synchrotron-radiation IR illuminator.

* * * * *